United States Patent
Kuriakose et al.

(10) Patent No.: US 8,752,005 B2
(45) Date of Patent: Jun. 10, 2014

(54) CONCEPT-ORIENTED SOFTWARE ENGINEERING SYSTEM AND METHOD FOR IDENTIFYING, EXTRACTING, ORGANIZING, INFERRING AND QUERYING SOFTWARE SYSTEM FACTS

(75) Inventors: John Kuriakose, Pune (IN); Yogesh Sudhir Dandawate, Pune (IN); Manish Malhotra, Bhopal (IN); Kumar Manava Tiwari, Hardoi (IN)

(73) Assignee: Infosys Limited, Bangalore (IN)

( * ) Notice: Subject to any disclaimer, the term of this patent is extended or adjusted under 35 U.S.C. 154(b) by 1359 days.

(21) Appl. No.: 12/234,220

(22) Filed: Sep. 19, 2008

(65) Prior Publication Data

US 2009/0254877 A1 Oct. 8, 2009

(30) Foreign Application Priority Data

Apr. 4, 2008 (IN) .............................. 858/CHE/2008
Apr. 17, 2008 (IN) .............................. 959/CHE/2008

(51) Int. Cl.
*G06F 9/44* (2006.01)
(52) U.S. Cl.
CPC .................................... *G06F 8/35* (2013.01)
USPC .......................................................... 717/105
(58) Field of Classification Search
CPC .......................................................... G06F 8/35
USPC .......................................................... 717/105
See application file for complete search history.

(56) References Cited

U.S. PATENT DOCUMENTS

| | | | |
|---|---|---|---|
| 6,978,228 B1 | 12/2005 | Gordon | |
| 7,013,265 B2 | 3/2006 | Huang et al. | |
| 7,110,936 B2 | 9/2006 | Hiew et al. | |
| 7,174,348 B1 | 2/2007 | Sadhu et al. | |
| 7,177,852 B2 | 2/2007 | Cui et al. | |
| 7,194,475 B2 | 3/2007 | DelMonaco et al. | |
| 2003/0154462 A1 | 8/2003 | Kumagai | |
| 2003/0163450 A1* | 8/2003 | Borenstein et al. | 707/1 |
| 2003/0179228 A1 | 9/2003 | Schreiber et al. | |
| 2004/0093344 A1* | 5/2004 | Berger et al. | 707/102 |
| 2004/0117395 A1 | 6/2004 | Gong et al. | |
| 2005/0138151 A1 | 6/2005 | Lam et al. | |
| 2005/0160411 A1 | 7/2005 | Sangal et al. | |
| 2005/0289167 A1 | 12/2005 | Haselden et al. | |
| 2007/0005343 A1 | 1/2007 | Sandor et al. | |

(Continued)

FOREIGN PATENT DOCUMENTS

WO WO 00/38051 6/2000

OTHER PUBLICATIONS

U.S. Appl. No. 12/234,185, filed Sep. 19, 2008, Kuriakose et al.

(Continued)

*Primary Examiner* — Wei Zhen
*Assistant Examiner* — Lanny Ung
(74) *Attorney, Agent, or Firm* — Klarquist Sparkman, LLP

(57) ABSTRACT

Software system facts comprising concepts, concept instances and relationships within the software system are identified and stored in a repository. The software system facts are extracted from artifacts comprising the software system or are provided through explicit definition. Architectures of the software system are recovered from the stored software system facts. Layered views of the recovered architectures are generated. The stored software system facts are checked against architectural rules to ensure architectural compliance of the software system. The impact of proposed changes to the software system is assessed by querying the identified software system facts.

30 Claims, 56 Drawing Sheets

(56) References Cited

U.S. PATENT DOCUMENTS

| | | |
|---|---|---|
| 2007/0050343 A1* | 3/2007 | Siddaramappa et al. ......... 707/3 |
| 2007/0055656 A1 | 3/2007 | Tunstall-Pedoe |
| 2007/0106520 A1 | 5/2007 | Akkiraju et al. |
| 2007/0143744 A1 | 6/2007 | Clemm et al. |
| 2008/0228812 A1* | 9/2008 | Oglesby et al. ........... 707/103 R |
| 2009/0254876 A1 | 10/2009 | Kuriakose et al. |

OTHER PUBLICATIONS

Amyot et al., "On the Extension of UML with Use Case Maps Concepts," *The Unified Modeling Language, Advancing the Standard, Third International Conference*, York, UK, Oct. 2-6, 2000, 15 pages.

Baader et al., "The Description Logic Handbook: Theory, Implementation and Applications," *Cambridge University Press*, 2003, pp. 5-44, 40 pages.

Black, "Computing Ripple Effect for Software Maintenance," *Journal of Software Maintenance: Research and Practice*, vol. 13, No. 4, 2001, pp. 263-279, 17 pages.

Bohner et al., "An Introduction to Software Change Impact Analysis," *IEEE Computer Society Press*, Los Alamitos, CA, 1996, pp. 1-26, 26 pages.

Booch, "Software Components with Ada: Structures, Tools and Subsystems," 2nd Edition, *The Benjamin/Cummings Publishing Company*, Menlo Park, CA, 1986, pp. 338-345, 8 pages.

"Business Process Modeling Notation (BPMN)," Version 1.0, http://www.BPMI.org (visited Dec. 31, 2008), May 3, 2004, 296 pages.

Clements et al., "Documenting Software Architectures: Views and Beyond," *Addison Wesley*, 2002, pp. 53-101, 25 pages.

Compatangelo, "A Concept-Oriented Logical Framework for Domain Knowledge Modelling and Analysis in Computer-Based Systems Engineering," *IEEE Symposium and Workshop on Engineering of Computer Based Systems (ECBS '96)*, 1996, pp. 110-117, 8 pages.

Consens et al., "Visualizing and Querying Software Structures," *Proc. 14th Int'l Conf. on Software Engineering*, Melbourne, Australia, May 11-15, 1992, pp. 138-156, 19 pages.

"Datalog," *Wikipedia*, http://en.wikipedia.org/wiki/Datalog, (visited Apr. 18, 2008), 3 pages.

De Moor et al., "Object-Oriented Queries Over Software Systems (Abstract of Invited Talk)," *Proc. of the 2007 ACM SIGPLAN Symposium on Partial Evaluation and Semantics-Based Program Manipulation*, Nice, France, Jan. 15-16, 2007, 1 page.

Derrider, "A Concept-Oriented Approach to Support Software Maintenance and Reuse Activities," In 5th Joint Conference on Knowledge-Based Software Engineering (JCKBSE), IOS Press, 2002, 8 pages.

Devanbu et al., "LaSSIE: A Knowledge-Based Software Information System," *Communications of the ACM*, vol. 34, Issue 5, 1991, pp. 34-49, 15 pages.

Eichberg et al., "XIRC: A Kernel for Cross-Artifact Information Engineering in Software Development Environments," *Proc. 11th Working Conf. on Reverse Engineering (WCRE '04)*, Nov. 8-12, 2004, pp. 182-191, 10 pages.

Fahmy et al., "Wins and Losses of Algebraic Transformations of Software Architectures," *Proc. 16th IEEE Int'l Conf. on Automated Software Engineering (ASE 2001)*, Nov. 26-29, 2001, pp. 51-60, 10 pages.

Finnigan et al., "The Software Bookshelf," *IBM Systems Journal*, vol. 36, No. 4, 1997, pp. 564-593, 30 pages.

Greenfield et al., "Software Factories: Assembling Applications with Patterns, Models, Frameworks, and Tools," *Wiley Publishing, Inc.*, Indiana, 2004, pp. 35-85, 87-107, 193-229, 109 pages.

Happel et al., "Applications of Ontologies in Software Engineering," *Proc. of 2nd Int'l Workshop on Semantic Web Enabled Software Engineering (SWESE 2006)*, 2006, 14 pages.

Harris et al., "Reverse Engineering to the Architectural Level," *Proc. 17th Int'l Conf. on Software Engineering*, Seattle, WA, Apr. 24-28, 1995, pp. 186-195, 10 pages.

Ivkovic et al., "Architecture Recovery of Dynamically Linked Applications: A Case Study," *Proc. 10th Int'l Workshop on Program Comprehension 2002 (INPC 2002)*, pp. 178-182, 6 pages.

Kazman et al., "View Extraction and View Fusion in Architectural Understanding," *Proc. 5th Int'l Conf. on Software Reuse*, Jun. 2-5, 1998, pp. 290-299, 10 pages.

Kruchten, "Architectural Blueprints—The '4+1' View Model of Software Architecture," *IEEE Software*, vol. 12, No. 6, Nov. 1995, pp. 42-50, 15 pages.

Kuck et al., "On the Number of Operations Simultaneously Executable in Fortran-Like Programs and Their Resulting Speedup," *IEEE Trans. on Computers*, vol. c-21, No. 12, Dec. 1972, pp. 1293-1310, 18 pages.

Lague et al., "An Analysis Framework for Understanding Layered Software Architectures," *IWPC '98: Proceedings of the 6th Int'l Workshop on Program Comprehension*, Jun. 24-26, 1998, pp. 37-44, 8 pages.

Lakos, "Large-Scale C++ Software Design," *Addison-Wesley Publishing Company*, Reading, Massachusetts, 1996, pp. 3-5, 3 pages.

Loyall et al., "Using Dependence Analysis to Support the Software Maintenance Process," Proc. Conf. on Software Maintenance, *IEEE CS Press*, Los Alamitos, CA, 1993, 20 pages.

Mancoridis et al., "Bunch: A Clustering Tool for the Recovery and Maintenance of Software System Structures," *Proc. Int 'l Conf. of Software Maintenance (ICSM 1999)*, Aug. 30-Sep. 3, 1999, Oxford, England, pp. 50-59, 10 pages.

Maqbool et al., "Hierarchical Clustering for Software Architecture Recovery," *IEEE Trans. on Software Engineering*, vol. 33, No. 11, Nov. 2007, pp. 759-780, 22 pages.

Martin, "Design Principles and Design Patterns," *Object Mentor Inc.*, www.objectmentor.com/resources/articles/Principles_and_Patterns.PDF (last visited Oct. 30, 2008), 34 pages.

Martin, "Granularity, in 'The C++ Report'," http://www.objectmentor.com/resources/articles/granularity, (last visited Nov. 5, 2008), 12 pages.

Mens et al., "4th Workshop on Object-Oriented Architectural Evolution," *15th European Conference on Object-Oriented Programming (ECOOP 2001)*, Jun. 2001, Budapest, Hungary, pp. 150-164, 15 pages.

Minker, "An Experimental Relational Data Base System Based on Logic (Or Clause Encounters of a Logical Kind)," *Logic and Data Bases*, Plenum Press, New York, 1978, pp. 107-148, 42 pages.

Murphy et al., "Software Reflexion Models: Bridging the Gap between Design and Implementation," *IEEE Trans. on Software Engineering*, vol. 27, No. 4, Apr. 2001, pp. 364-380, 17 pages.

Murphy et al., "Software Reflexion Models: Bridging the Gap between Source and High-Level Models," *Proc. of the 3$^{rd}$ ACM SIGSOFT '95 Symposium on Foundations of Software Engineering*, 1995, pp. 18-28, 11 pages.

Nierstrasz et al., "Object-Oriented Reengineering Patterns—An Overview," In *Proc. of Generative Programming and Component Engineering (GPCE 2005)*, Eds: Robert Glück, Michael Lowry, vol. 3676, 2005, pp. 1-9, 9 pages.

Noll et al., "Enhancing Traceability Using Ontologies," *Proc. of the 2007 ACM Symposium on Applied Computing*, Mar. 11-15, 2007, Seoul, Korea, pp. 1496-1497, 2 pages.

Noy, "Semantic Integration: A Survey of Ontology-Based Approaches," *ACM SIGMOD Record Archive*, vol. 33, Issue 4, Dec. 2004, pp. 65-70, 6 pages.

"OMG Unified Modeling Language Specification," Version 1.5 http://www.omg.org/spec/UML/1.5/PDF, (visited Dec. 31, 2008), Mar. 2003, 736 pages.

Parnas, "On the Criteria to be Used in Decomposing Systems into Modules," *Communications of the ACM*, vol. 15, No. 12, Dec. 1972, pp. 1053-1058, 6 pages.

Parnas, "The Secret History of Information Hiding," *Software Pioneers: Contributions to Software Engineering*, Springer, 2002, pp. 399-409, 11 pages.

Patel et al., "Architecture Recovery as First Step in System Appreciation," *13th Working Conference on Reverse Engineering (WCRE 2006)*, Benevento, Italy, Oct. 23, 2006, 4 pages.

Perry, "Software Interconnection Models," *Proc. of the 9th Int'l Conference on Software Engineering*, 1987, pp. 61-69, 9 pages.

(56) References Cited

OTHER PUBLICATIONS

Postma et al., "Applying Relation Partition Algebra for Reverse Architecting," *In 1999 Workshop on Software Reengineering*, Bad Honnef, Germany, http://www.unikoblenz.de/~ist/RWS99/beitraege/Postma.pdf, (visited Oct. 31, 2008), 6 pages.

Resource Description Framework (RDF), http:www.w3.org/RDF, (visited Oct. 31, 2008), 10 pages.

Ren et al., "Chianti: A Tool for Change Impact Analysis of Java Program," *Proc. 19th Annual ACM SIGPLAN Conf. on Object-Oriented Programming, Systems, Languages and Applications (OOPSLA 2004)*, Vancouver, BC, Oct. 26-28, 2004, pp. 432-448, 15 pages.

Sangal et al., "Using Dependency Models to Manage Software Architecture," *Companion to the 20th Annual ACM SIGPLAN Conf. on Object-Oriented Programming, Systems, Languages, and Applications (OOPSLA '05)*, San Diego, CA, Oct. 16-20, 2005, 10 pages.

Sartipi, "Software Architecture Recovery Based on Pattern Matching," PhD Dissertation Synopsis, University of Waterloo, Waterloo, Ont. Canada, Oct. 2003, 5 pages.

"Semantics," *Wikipedia*, http://en.wikipedia.org/wiki/Semantic, (visited Apr. 18, 2008), 6 pages.

"Semantic Web," *Wikipedia*, http://en.wikipedia.org/wiki/Semantic_Web, (visited Apr. 18, 2008), 6 pages.

Storey et al., "RIGI: A Visualization Environment for Reverse Engineering," *Proc. 19th Int'l Conf. Software Engineering*, Boston, Massachusetts, May 17-23, 1997, pp. 606-607, 2 pages.

"Supply-Chain Operations Reference-Model," *SCOR* Version 6.1 Overview, http://www.supply-chain.org, Archived Oct. 11, 2004, 23 pages.

Tessier, "Dependency Finder User Manual Version 1.1.1," http://www.depfind.sourceforge.net/Manual.html, (last visited Nov. 20, 2008), 44 pages.

Tichelaar et al., "Architectural Extraction in Reverse Engineering by Prototyping: An Experiment," *Proc. of the ESEC-FFSE '97 Workshop on Object-Oriented Reengineering*, University of Vienna, 1997, 4 pages.

"TyRuBa," http://tyruba.sourceforge.net, (visited Nov. 20, 2008), 3 pages.

"Unified Modeling Language," *Wikipedia* http://en.wikipedia.org/wiki/Unified_Modelling_Language, (visited Dec. 31, 2008), 5 pages.

Uschold et al., "Ontologies: Principles, Methods and Applications," The University of Edinburgh, Feb. 1996, 69 pages.

"Use Case," *Wikipedia*, http://en.wikipedia.org/wiki/Use_Case, (visited Dec. 31, 2008), 6 pages.

van Deursen et al., "Software Architecture Reconstruction," *Proc. 26th Int'l Conf. on Software Engineering (ICSE '04)*, May 23-28, Edinburgh, Scotland, pp. 745-746, 2 pages.

van Deursen, "Software Architecture Recovery and Modelling [WCRE 2001 Discussion Forum Report]," *ACM SIGAPP Applied Computing Review*, vol. 10, No. 1, Spring 2002, pp. 4-7, 4 pages.

Wang, "Semantic Web and Formal Design Methods," PhD Thesis, National University of Singapore, 2004, 245 pages.

Witte et al., "Empowering Software Maintainers with Semantic Web Technologies," *4th European Semantic Web Conference (ESWC 2007)*, Innsbruck, Austria, Jun. 3-7, 2007, pp. 37-52, 15 pages.

"XML Schema," http://www.w3.org/XML/Schema.html, (visited Oct. 31, 2008), 28 pages.

\* cited by examiner

```
CREATE TABLE SCHEMA.CONCEPT_DEF
(
   CID              INTEGER        NOT NULL,
   CTYPE            VARCHAR(3),
   CONCEPT_NAME     VARCHAR(100)   NOT NULL,
   IS_SINGLETON     BOOLEAN,
   SYNONYMS         VARCHAR2(2048),
   LAST_UPDATE_DT   DATE
);
```
— 1710

```
CREATE TABLE SCHEMA.RELTYPE_DEF
(
   RDEF_ID          INTEGER        NOT NULL,
   RNAME            VARCHAR2(50)   NOT NULL,
   LAST_UPDATE_DT   DATE
);
```
— 1720

```
CREATE TABLE SCHEMA.CONCEPT_REL
(
    ID              INTEGER NOT NULL,
    RDEF_ID         INTEGER NOT NULL,
    SRC_CID         INTEGER NOT NULL,
    TAR_CID         INTEGER NOT NULL,
    LAST_UPDATE_DT  DATE
);
```
— 1730

```
CREATE TABLE SCHEMA.RELTYPE_REL
(
    ID              INTEGER NOT NULL,
    RDEF_ID         INTEGER NOT NULL,
    SRC_RTYPEID     INTEGER NOT NULL,
    TAR_RTYPEID     INTEGER NOT NULL,
    LAST_UPDATE_DT  DATE
);
```
— 1740

```
CREATE TABLE SCHEMA.ROLEDEF_REL
(
    ID              INTEGER NOT NULL,
    RDEF_ID         INTEGER NOT NULL
    T_RELTYPE_DEF   TABLE,
    SRC_ROLEID      INTEGER NOT NULL,
    TAR_ROLEID      INTEGER NOT NULL,
    LAST_UPDATE_DT  DATE
);
```
— 1750

FIG. 17

```
CREATE TABLE SCHEMA.ATTR_DEF
(
    ATTR_ID         INTEGER  NOT NULL
    DATA_TYPE_ID    INTEGER  NOT NULL,
    ATTR_NAME       VARCHAR(100)
);
```
— 1800

```
CREATE TABLE SCHEMA.MAP_ATTR_DEF
(
    AID             INTEGER  NOT NULL,
    ATTR_ID         INTEGER  NOT NULL,
    DATA_TYPE_ID    INTEGER  NOT NULL,
    DOMAIN_CID      INTEGER  DEFAULT -1,
    DOMAIN_RTYPE    INTEGER  DEFAULT -1,
    ROLE_ID         INTEGER  DEFAULT -1,
    RANGE_CID       INTEGER  DEFAULT -1
);
```
— 1810

```
CREATE TABLE SCHEMA.ELEMENT_ATTR_VALUE
(
    ID              INTEGER  NOT NULL,
    AID             INTEGER  NOT NULL,
    DATA_TYPE_ID    INTEGER  NOT NULL,
    ATTR_ID         INTEGER  NOT NULL,
    CID             INTEGER  NOT NULL,
    EID             INTEGER  NOT NULL,
    VID             INTEGER  NOT NULL
);
```
— 1820

```
CREATE TABLE SCHEMA.ATTR_STRING_VALUE
(
    VID             INTEGER  NOT NULL,
    DATA_TYPE_ID    INTEGER  NOT NULL,
    VALUE           VARCHAR2(500)
);
```
— 1830

```
CREATE TABLE SCHEMA.ATTR_BOOL_VALUE
(
    VID             INTEGER  NOT NULL,
    DATA_TYPE_ID    INTEGER  NOT NULL,
    VALUE           BOOLEAN,
    LAST_UPDATE_DT  DATE
);
```
— 1840

```
CREATE TABLE SCHEMA.ATTR_INT_VALUE
(
    VID             INTEGER  NOT NULL,
    DATA_TYPE_ID    INTEGER  NOT NULL,
    VALUE           INTEGER  NOT NULL,
    LAST_UPDATE_DT  DATE
);
```
— 1850

FIG. 18

```
CREATE TABLE SCHEMA.RELTYPE_DEF
(
   RTYPE_ID          INTEGER         NOT NULL,
   RNAME             VARCHAR(100)    NOT NULL,
   INVERSE_RNAME     VARCHAR(100)    NOT NULL,
   TRANSITIVE_RNAME  VARCHAR(100)    NOT NULL,
   SOURCE_ROLE       VARCHAR(100),
   TARGET_ROLE       VARCHAR(100),
   ARY               INTEGER,
   TRANSITIVE        BOOLEAN,
   SYMMETRIC         BOOLEAN,
   CYCLIC            BOOLEAN,
   SYNONYMS          VARCHAR(2048)
);
```
— 1910

```
CREATE TABLE SCHEMA.ROLE_DEF
(
   ROLE_ID    INTEGER         NOT NULL,
   RTYPE_ID   INTEGER         NOT NULL,
   INHERITED  BOOLEAN,
   ROLE_NAME  VARCHAR2(100)   NOT NULL,
   INDEX      INTEGER
);
```
— 1920

```
CREATE TABLE SCHEMA.RELATION_POLICY
(
   ID              INTEGER    NOT NULL,
   RTYPE_ID        INTEGER    NOT NULL,
   REL_POLICY_ID   INTEGER    NOT NULL,
   ROLE_POLICY_ID  INTEGER    NOT NULL
);
```
— 1930

```
CREATE TABLE SCHEMA.ROLE_POLICY
(
   POLICY_ID      INTEGER NOT NULL,
   ROLE_ID        INTEGER NOT NULL,
   RTYPE_ID       INTEGER NOT NULL,
   PERMITTED_CID  INTEGER NOT NULL,
   BANNED_CID     INTEGER NOT NULL DEFAULT -1,
   CARDINALITY    INTEGER NOT NULL DEFAULT -1,
   OPERATOR       CHAR(5)
);
```
— 1940

FIG. 19

```
CREATE TABLE SCHEMA.ELEMENT
(
   EID                INTEGER NOT NULL,
   CID                INTEGER NOT NULL,
   NAME               VARCHAR2(1000) NOT NULL,
   QNAME              VARCHAR2(1000) NOT NULL,
   PARENT_NAME        VARCHAR2(1000) NOT NULL,
   PARENT_ID          INTEGER,
   PARENT_CID         INTEGER,
   LINE_NO            INTEGER,
   OFFSET             INTEGER,
   FILE_ID            INTEGER,
   LAST_UPDATE_DT     DATE,
   LANG_CODE          VARCHAR2(15) ,
   CONTAINMENT_DEPTH  INTEGER,
   LAYER_INDEX        INTEGER
);
```
— 2010

```
CREATE TABLE SCHEMA.RELATION
(
    RIID         INTEGER NOT NULL,
    CORREL_ID    INTEGER,
    RTYPE_ID     INTEGER NOT NULL,
    SRC_ROLE_ID  INTEGER,
    SRC_EID      INTEGER NOT NULL,
    SRC_CID      INTEGER NOT NULL,
    SRC_NAME     VARCHAR(1000),
    SRC_QNAME    VARCHAR(1000),
    TAR_ROLE_ID  INTEGER,
    TAR_EID      INTEGER NOT NULL,
    TAR_CID      INTEGER NOT NULL,
    TAR_NAME     VARCHAR(1000) NOT NULL,
    TAR_QNAME    VARCHAR(1000) NOT NULL
);
```
— 2020

```
CREATE TABLE SCHEMA.AUX_RELATION
(
    RoID       INTEGER NOT NULL,
    CORREL_ID  INTEGER,
    RTYPE_ID   INTEGER NOT NULL,
    ROLE_ID    INTEGER,
    EID        INTEGER NOT NULL,
    CID        INTEGER NOT NULL,
    NAME       VARCHAR(1000),
    QNAME      VARCHAR(1000)
);
```
— 2030

FIG. 20

TABLE SCHEMA.RELTYPE_DEF

| RTYPE_ID | RNAME | INVERSE_RNAME | SOURCE_ROLE | TARGET_ROLE | ARY |
|---|---|---|---|---|---|
| 100 | REPRESENTS | REPRESENTEDBY | CONCEPT INSTANCE | DOMAIN CONCEPT | 2 |

— 2110

TABLE SCHEMA.ROLE_DEF

| ROLE_ID | RTYPE_ID | ROLE_NAME | INDEX |
|---|---|---|---|
| 110 | 100 | MODEL | 0 |
| 120 | 100 | MODELED_DOMAIN CONCEPT | 1 |

— 2120
— 2130

TABLE SCHEMA.ROLE_POLICY

| POLICY_ID | ROLE_ID | RTYPE_ID | PERMITTED_ID | BANNED_ID | OPERATOR | CARDINALITY |
|---|---|---|---|---|---|---|
| 201 | 110 | 100 | 1,2,3,4 | -1 | GT | 2 |
| 202 | 120 | 100 | 22,34,56,7,8 | -1 | GT | 2 |

```
<Define concept="StrutsAction"
extends="#Java_Class"
    selector="subTypeOf+('org.struts.Action')"
    lang="PredQL"/>
<Define concept="StrutsConfig"
extends="#XMLArtifact"/>
  <Has>
    <Define concept="ActionXML"
extends="#XMLElement"
        selector="/action-mapping/struts-action"
        lang="Xpath"/>
      <Has>
        <Attribute name="type">
          <Link><SourceDef><Attribute name="qname"
                concept="#StrutsAction"/></SourceDef>
          </Link>
        </Attribute>
        <Define concept="StrutsForward" selector="/
forward"
            queryLangue="Xpath">
          <Has>
            <Attribute name="path">
              <Link>
                <MatchOne>
                  <SourceDef>
                    <Attribute concept="#StrutsAction"
                        name="path"/>
                  </SourceDef>
                </MatchOne>
              </Link>
            </Attribute>
          </Has>
        </Define>
      </Has>
    </Define>
  </Has>
</Define>
```

- 2910: `<Define concept="StrutsAction" ...>` block
- 2920: `<Define concept="StrutsConfig" ...>` block
- 2930: `<Attribute name="type">` block
- 2940: `<Has>` block with `<Attribute name="path">`

```
CREATE TABLE SCHEMA.RELATION_CROSSREL
(
    ID                  INTEGER NOT NULL,
    RTYPE_ID            INTEGER NOT NULL,

SRC_ID              INTEGER NOT NULL,
    SRC_CID             INTEGER NOT NULL,
    SRC_NAME            VARCHAR(1000) NOT NULL,
    SRC_QNAME           VARCHAR(1000) NOT NULL,
    SRC_PARENT_CID      INTEGER,
    SRC_ATTRIBUTE       VARCHAR(1000) NOT NULL

TAR_ID              INTEGER NOT NULL,
    TAR_CID             INTEGER NOT NULL,
    TAR_NAME            VARCHAR(1000) NOT NULL,
    TAR_QNAME           VARCHAR(1000) NOT NULL,
    TAR_PARENT_CID      INTEGER,
    TAR_ATTRIBUTE       VARCHAR(1000) NOT NULL

SRC_ROLE_ID         INTEGER,
    TAR_ROLE_ID         INTEGER,
);
```
~ 3110

FIG. 31B

TABLE SCHEMA.RELATION_CROSSREL

| ID | RTYPE_ID | SRC_ID | SRC_CID | SRC_NAME | SRC_ATTR |
|---|---|---|---|---|---|
| 400 | CROSS-ARTIFACT RELATIONSHIP | 150 | 100 | ACTIONXML | PATH |

| TAR_ID | TAR_CID | TAR_NAME | TAR_ATTR | ... |
|---|---|---|---|---|
| 160 | 100 | STRUTSFORWARD | PATH | ... |

3120

3410

```
JUNIT_EXTENSION_MODULE= {
                        junit.extensions.ActiveTestSuite,
                        junit.extensions.ActiveTestSuite$1,
                        junit.extensions.ExceptionTestCase,
                        junit.extensions.RepeatedTest,
                        junit.extensions.TestDecorator,
                        junit.extensions.TestSetup,
                        junit.extensions.TestSetup$1
                        };
```

FIG. 34

CONCEPT-ORIENTED SOFTWARE ENGINEERING SYSTEM AND METHOD FOR IDENTIFYING, EXTRACTING, ORGANIZING, INFERRING AND QUERYING SOFTWARE SYSTEM FACTS

CROSS REFERENCE TO RELATED APPLICATIONS

The application claims priority from Indian Provisional Applications Nos. 858/CHE/2008, filed Apr. 4, 2008, and 959/CHE/2008, filed Apr. 17, 2008, which are both incorporated herein by reference.

TECHNICAL FIELD

This disclosure pertains to the design of a knowledge base, identification and extraction of knowledge within a software system, recovery and visualization of software system architectures, checking compliance of a software system with architectural constraints and assessing the impact of changes to a software system.

BACKGROUND

Recent trends in the development of large-scale enterprise software systems include dealing with systems of increasing size and scope that are written in multiple languages using a variety of platforms and frameworks by design teams that are becoming more broadly dispersed around the world. These trends place pressures on software engineers charged with maintaining such large and complex systems. Impact analysis of proposed system changes requires that the organization of the software system be sufficiently understood. This can be difficult for software engineers having no prior knowledge of the system, or for legacy systems that have been around for decades and for which formal documentation is sparse, or worse, completely unavailable.

Conventional methods of formally modeling the relationships within a software system exhibit many shortcomings and are typically able to model a small number of intra-system dependencies and interactions. This is either because existing modeling languages are able to capture only a small number of possible relationships within a software system or are generally unable to model relationships among software artifacts written in different programming languages.

SUMMARY

Described below are embodiments of a concept-oriented software engineering system and method for extracting, organizing, inferring and querying software system facts.

In some embodiments, a computer-implemented method comprises receiving a plurality of concept instances comprising a first concept instance extracted from a first software system artifact of a software system and a second concept instance extracted from a second software system artifact of a software system. The first software system artifact and the second software system artifact are associated with a first formal language and a second formal language respectively. The method further comprises identifying one or more relationships comprising a relationship between the first concept instance and the second concept instance or between at least one of the first concept instance or the second concept instance and at least one identified concept associated with the software system. The method further comprises storing the one or more relationships in one or more repositories.

The method can further identify the at least one concept associated with the software system, extract at least the first concept instance and the second concept instance from the first software system artifact and the second software system artifact, respectively, and store the at least one concept associated with the software system, the first concept instance and the second concept instance in the one or more repositories.

The plurality of concept instances can further comprise a third concept instance extracted from a third software system artifact associated with the first formal language and the one or more relationships can further comprise at least one relationship between the first concept instance and the third concept instance. The method can further comprise extracting at least the third concept instance from the third software system artifact and storing the third second concept instance in the one or more repositories.

The plurality of concept instances can further comprise a third concept instance extracted from the first software system artifact and the one or more relationships can further comprise at least one relationship between the first concept instance and the third concept instance. The method can further comprise extracting the third concept instance from the first software system artifact and storing the third second concept instance in the one or more repositories.

At least one of the relationships can have an associated relationship type. This relationship type can be selected from a group of base relationship types consisting of an instance relationship type, an extends relationship type, a member relationship type, a uses relationship type, a conforms relationship type, a represents relationship type, a realizes relationship type, a representational variant relationship type, a represented by relationship type and a realized relationship type. The relationship type can be selected from one or more extended relationship types defined as composites of relationship types within the group of base relationship types.

The relationship type can have one or more terms, with respective of the terms having an associated role indicating permissible concepts and/or concept instances that may be used for the respective term. The method can further comprise storing the relationship type and the roles associated with the one or more terms of the relationship type. The at least one of the one or more relationships can have m terms and the relationship type can have n terms, where m<n. The method can further comprise updating the least one of the one or more relationships by adding a term to the at least one of the one or more relationships.

In some embodiments, a computer-implemented method comprises identifying at least one relationship between an intentional concept of a software system and a second concept of the software system or a concept instance extracted from a software system artifact of the software system and stores the one or more relationships in one or more repositories. The method can further comprise identifying at least the intentional concept and the second concept, extracts at least the concept instance from the software system artifact and stores the intentional concept, the second concept and the concept instance in the one or more repositories.

The intentional concept can be based on at least one other concept of the software system and/or at least one relationship type of the software system. The intentional concept can be defined by one or more link definition language statements interpretable by a link processor. The second concept of the software system or the concept instance extracted from a software system artifact can be identified by querying the one or more repositories using one or more query languages. The one or more query languages can comprise XPath, SQL and PredQL. The method can further comprise updating the intentional concept.

In some embodiments, a computer-implemented method comprises receiving at least one cross-artifact relationship definition, identifying at least one cross-artifact relationship between a first concept instance extracted from a first software system artifact of a software system and a second concept instance extracted from a second software system artifact of a software system and storing the at least one cross-artifact relationship in one or more repositories. The identification can be based on the at least one cross-artifact relationship definition.

The first concept instance can have at least one attribute and the second concept instance can have at least one attribute. The at least one cross-artifact relationship can comprise at least one attribute of the first concept instance or of the second concept instance, a relationship type and expressions describing the first concept instance and/or the second concept instance. The at least one cross-artifact relationship can relate a first concept instance to at least one attribute of the second concept instance, the at least one attribute of the second concept instance used by or referred to by the first concept instance. The at least one cross-artifact relationship can relate a first concept instance attribute to a second concept instance attribute, the related attributes having the same value.

The at least one cross-artifact relationship definition can be expressed using link definition language statements interpretable by a link processor. The method can further comprise updating the at least one cross-artifact relationship. The first concept instance and the second concept instance can be identified by querying the one or more repositories using one or more query languages.

In some embodiments, a data structure encoded on one or more computer-readable storage media comprises one or more concepts associated with a software system, one or more relationship types and for respective of the relationship types, one or more role definitions. The data structure can further comprise one or more concept instances associated with the at least one concept and one or more relationships based on the one or more concepts and/or the one or more concept instances.

The at least one of the one or more relationship types can have an arity, n, greater than two and the at least one relationship type can be represented in the data structure as n−1 associated binary relationships. Respective of the associated binary relationships can have an associated co-relationship identifier, the co-relationship identifiers having a common value. The at least one of the one or more relationships can be associated with one of the one or more relationship types, and respective of the at least one relationships can have a number of terms less than or equal to the number of terms associated with the associated relationship type.

The data structure can further comprise one or more pluralities of viewing concept instances, the pluralities of viewing concepts instances representing recovered architectures of the software system, respective of the viewing concept instances of the one or more viewing concept instances pluralities having a layer index and one or more pluralities of viewing concept instances relationships, respective of the viewing concept instances relationships pluralities being associated with one of the one or more viewing concept instances pluralities.

In some embodiments, at least one computer-readable medium has encoded thereon computer-executable instructions for causing a computer system programmed thereby to perform a method comprising receiving a plurality of concept instances comprising a first concept instance extracted from a first software system artifact of a software system and a second concept instance extracted from a second software system artifact of a software system. The first software system artifact and the second software system artifact are associated with a first formal language and a second formal language respectively. The method further comprises identifying one or more relationships comprising a relationship between the first concept instance and the second concept instance or between at least one of the first concept instance or the second concept instance and at least one identified concept associated with the software system and storing the one or more relationships in one or more repositories.

In some embodiments, a general-purpose computer is configured to perform a method, the general-purpose computer comprising a programming module configured to receive a plurality of concept instances comprising a first concept instance extracted from a first software system artifact of a software system and a second concept instance extracted from a second software system artifact of a software system. The first software system artifact and the second software system artifact are associated with a first formal language and a second formal language respectively. The general-purpose computer further comprises a programming module configured to identify one or more relationships comprising a relationship between the first concept instance and the second concept instance or between at least one of the first concept instance or the second concept instance and at least one identified concept associated with the software system and a programming module configured to store the one or more relationships in one or more repositories.

In some embodiments, a computer-implemented method comprises receiving one or more viewing concepts of a software system, identifying one or more viewing instances comprising one or more concept instances or descendants of the one or more concept instances, the one or more concept instances or descendants of the one or more concept instances associated with at least one of the one or more viewing concepts or one or more sub-concepts of the one or more viewing concepts and assigning layer indices to the one or more viewing instances based on one or more associated viewing instances relationships.

The method can further comprise lifting at least one viewing instances relationship associated with at least one of the one or more viewing instances not associated with one of the one or more viewing concepts. The at least one lifted relationship can be lifted up a viewing instances hierarchy defined by member relationships between the one or more viewing instances. The at least one lifted relationship can be a uses relationship. The at least one lifted relationship can be a cross-artifact relationship. The one or more viewing concepts can be selected by a user.

The method can further comprise receiving the one or more sub-concepts of the one or more viewing concepts. The receiving the one or more sub-concepts can comprise identifying as the one or more sub-concepts, concepts of the software system that are related to at least one of the one or more viewing concepts by one or more sub-concept relationships. The identifying the one or more viewing instances can comprise identifying as the viewing instances, concept instances and descendants of concept instances related to at least one of the one or more viewing concepts by at least one instance relationship and identifying as the viewing instances, concept instances and descendants of concept instances related to at least one of the one or more sub-concepts of the viewing concepts by at least one instance relationship as the viewing instances.

The one or more viewing concepts can comprise domain concepts, language concepts and/or intentionally defined concepts. The at least one of the viewing concepts can be an intentionally defined concept and identifying the viewing instances can comprise identifying as viewing instances, constituent concept instances of the intentionally defined concepts. The identifying the viewing instances can comprise identifying as descendants of the one or more viewing instances, concept instances related to a viewing instance through one or more member relationships.

The at least one of the one or more viewing instances relationships can be inbound uses relationships, the assigning layer indices comprising: a) initializing a current layer index value; b) selecting at least one unindexed viewing instance having zero inbound uses relationships associated with at least one other unindexed viewing instance; and c) assigning the current layer index value to the selected at least one unindexed viewing instance. The assigning layer indices can further comprise: d) incrementing the current layer index; and e) iteratively repeating b) through d) until respective of the one or more viewing instances have an assigned layer index value. The method can further comprise identifying viewing instances having no associated uses relationships as misfit viewing instances.

The selecting the at least one unindexed viewing instance can comprise removing a cycle condition if respective of unindexed viewing instances have at least one inbound uses relationship associated with at least one other unindexed viewing instance and removing the cycle condition comprises iteratively selecting at least one viewing instances uses relationship associated with at least one unindexed viewing instance until at least one unindexed viewing instance has zero inbound uses associated with at least one other unindexed viewing instance based on viewing instances uses relationships associated with unindexed viewing instances minus the at least one selected viewing instances uses relationship or until viewing uses instances relationships with unindexed viewing instances have been selected at least once.

The method can further comprise dissociating the selected at least one selected viewing instances uses relationship from the viewing instances related by the at least one selected viewing instances uses relationship if at least one unindexed viewing instance has zero inbound uses relationships associated with at least one other unindexed viewing instance based on the viewing instances uses relationships associated with unindexed viewing instances minus the at least one selected viewing instances uses relationship.

The method can further comprise indicating that the cycle condition persists if the viewing uses instances relationships with unindexed viewing instances have been selected at least once, indicating that the cycle condition persists. The one or more viewing instances relationships can be associated with one or more relationship types, respective of the relationship types having an assigned relationship type weight. The selected at least one viewing instances uses relationships can be selected according to relationship type weight The method can further comprise passing the one or more viewing instances with assigned layer indices and the one or more viewing instances relationships to a visualizer for generating a visualization of the one or more viewing instances and/or the one or more viewing instances relationships.

In some embodiments, a computer-implemented method comprises receiving a representation of a software system architecture, the representation of the software system architecture comprising one or more concept instances associated with at least one software system concept of a software system and having layer index values and generating a visualization of the software system architecture based on the representation of the software system architecture. The visualization can comprise one or more layers, respective of the layers associated with a layer index value equal to one of the layer index values of the one or more concept instances and comprising representations of the one or more concept instances having a layer index value equal to the layer index value associated with the respective layer.

The represented concept instances can be associated with at least one software system viewing concept. The representation of the software system architecture can further comprise one or more relationships based on the one or more concept instances and/or the at least one software system concept and the visualization can comprise at least one representation of at least one of the one or more relationships. The method can further comprise providing additional information of selected viewing instances and/or selected relationships represented in the visualization. The visualization can be stored or sent to an output device.

In some embodiments, a computer-implemented method comprises expressing at least one software system architectural constraint in terms of at least one of one or more software system concepts, one or more instances of the software system concepts or one or more relationships based on the one or more software system concepts and/or the one or more concept instances; checking compliance of at least one of the one or more software system concepts, the one or more concept instances or the one or more relationships with the at least one architectural constraint; and reporting compliance information.

The reported compliance information can comprise identification of software system concepts, concept instances and/or relationships that are in compliance with the at least one architectural constraint. The reported compliance information can comprise identification of software system concepts, concept instances and/or relationships that are not in compliance with the at least one architectural constraint. The reported compliance information can comprise architectural drift information.

The at least one architectural constraint can be further expressed in terms of one or more intentionally defined concepts based in part on layer index values assigned to the one or more concept instances. The checking compliance can comprise expressing the at least one architectural constraint with at least one statement written in a query language, the at least one statement comprising a specified relationship; and querying the one or more software system concepts, the one or more concept instances and/or the one or more relationships to identify software system concepts, concept instances and/or relationships that satisfy the specified relationship. The specified relationship can comprise one or more logic predicates and the identified software system concepts, concept instances and/or relationships satisfy at least one of the one or more logic predicates of the specified relationship.

In some embodiments, at least one computer-readable medium has encoded thereon computer-executable instructions for causing a computer system programmed thereby to perform a method comprising receiving one or more viewing concepts of a software system; identifying one or more viewing instances comprising one or more concept instances or descendants of the one or more concept instances, the one or more concept instances or descendants of the one or more concept instances associated with at least one of the one or more viewing concepts or one or more sub-concepts of the one or more viewing concepts; and assigning layer indices to the one or more viewing instances based on one or more associated viewing instances relationships.

In some embodiments, a general-purpose computer is configured to perform a method, the method comprising a programming module configured to receive one or more viewing concepts of a software system, a programming module configured to identify one or more viewing instances comprising one or more concept instances or descendants of the one or more concept instances, the one or more concept instances or descendants of the one or more concept instances associated with at least one of the one or more viewing concepts or one or more sub-concepts of the one or more viewing concepts, and a programming module configured to assign layer indices to the one or more viewing instances based on one or more associated viewing instances relationships.

The foregoing and other objects, features and advantages of the invention will become more apparent from the following detailed description, which proceeds with reference to the accompanying figures.

BRIEF DESCRIPTION OF THE DRAWINGS

FIG. 17 shows exemplary SQL statements defining a relational database schema for concept definitions, concept relationship types, concept relationships, relationships between relationships and relationship roles.

FIG. 18 shows exemplary SQL statements defining a relational database schema for attribute definitions, attribute mappings and attribute values.

FIG. 19 shows exemplary SQL statements defining a relational database schema for relationship types, role definitions, and relationship and role policies.

FIG. 20 shows exemplary SQL statements defining a relational database schema for concept instances, relationship instances and auxiliary relationships.

FIG. 21 shows exemplary table entries in a relational database defined by the schema of FIG. 19 modeling a "represents" relationship type.

FIG. 29 shows exemplary Link Definitional Language statements modeling the Struts Action concept of the Java web application Struts framework.

FIG. 31A shows exemplary SQL statements defining a relational database schema for cross-artifact relationships.

FIG. 31B shows an exemplary table entry in a relational database defined by the schema of FIG. 31A modeling a "uses" cross-artifact relationship.

FIG. 34 shows a model definition statement.

DETAILED DESCRIPTION

As used in this application and in the claims, the singular forms "a," "an," and "the" include the plural forms unless the context clearly dictates otherwise. Additionally, the term "includes" means "comprises."

The described systems, apparatus and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures cannot show the various ways in which the disclosed systems, methods and apparatus can be used in conjunction with other systems, methods and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

EXAMPLE 1

Figure 1:
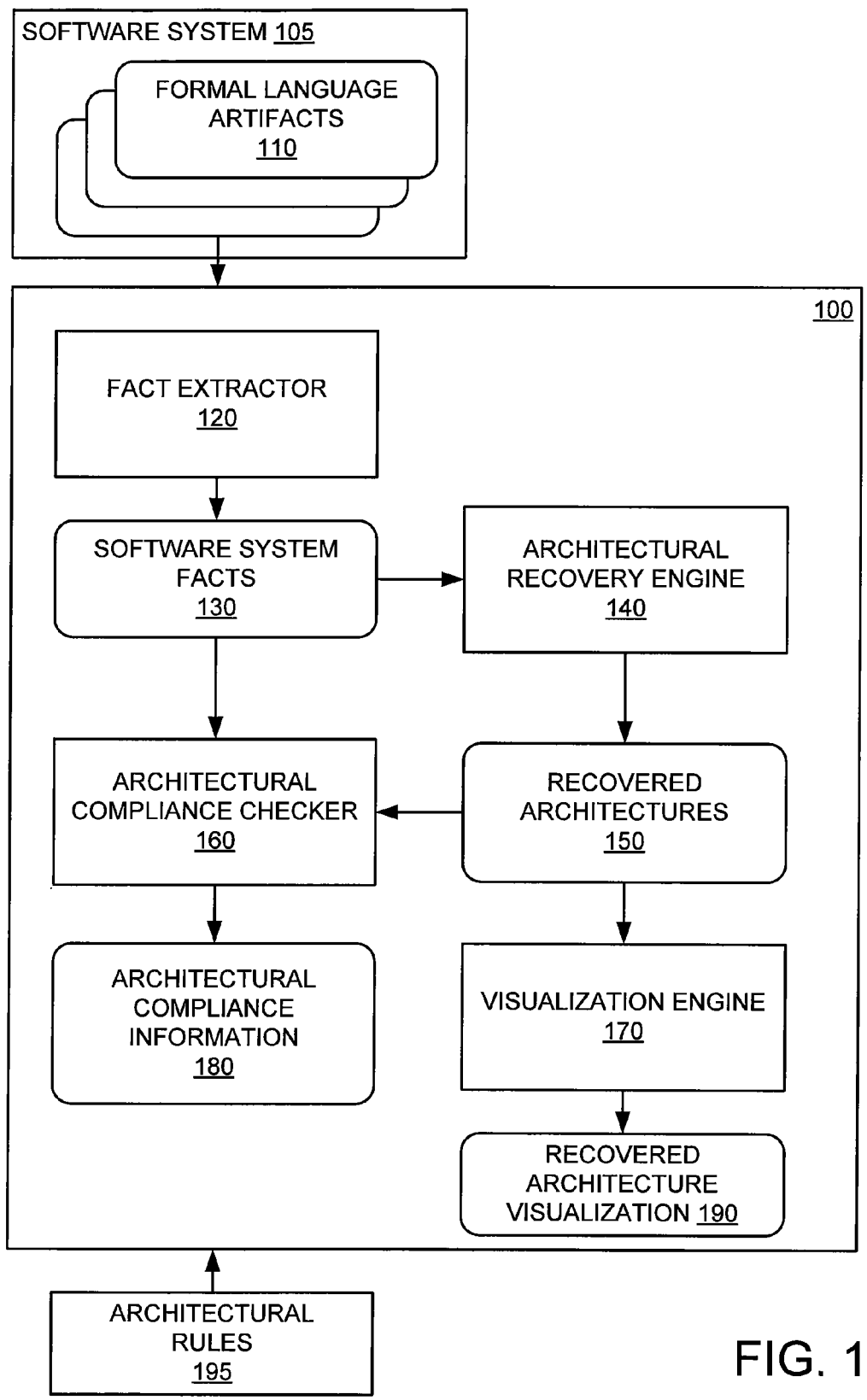
FIG. 1 is a block diagram of an exemplary concept-oriented software engineering system for identifying and extracting facts of a software system, recovering and visualizing software system architectures and checking software system architectural compliance.

Exemplary Concept-Oriented Software Engineering System for Identifying and Extracting Facts of a Software System, Recovering and Visualizing Software System Architectures and Checking Software System Architectural Compliance FIG. 1 is a block diagram of an exemplary concept-oriented software engineering system 100 for identifying and extracting facts of a software system, recovering and visualizing software system architectures and checking software system architectural compliance. In the example, a fact extractor 120 is configured to identify and extract software system facts 130 from formal language artifacts 110 of the software system 105. The software system facts 130 comprise concepts associated with the software system, specific instantiations of the concepts (concept instances) in the formal artifacts 110 (e.g. computer-executable instructions encoded on computer-readable media) and relationships within the software system 105 based on the concepts and concept instances. An architectural recovery engine 140 is configured to recover architectures 150 from the software system facts 130. An architectural compliance checker 160 is configured to verify or check compliance of the recovered architectures 150 or the facts 130 against architectural rules 195 and provide architectural compliance information 180. A visualization engine 170 is configured to render, display or generate visualizations 190 of the recovered architectures 150. The system 100 and variants of it can be used to perform any of the methods described herein.

EXAMPLE 2

Exemplary System for Identifying and Extracting Software System Facts

Figure 2:
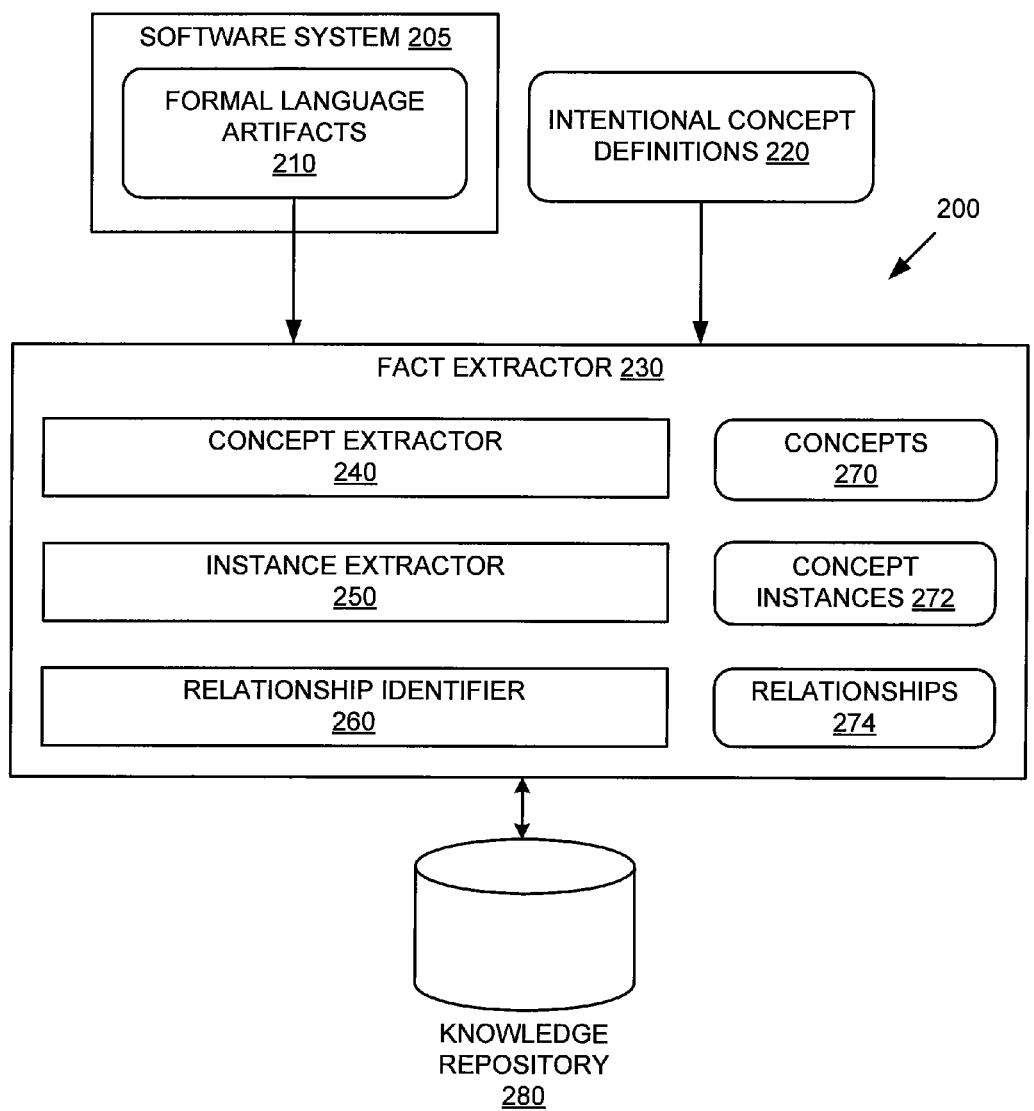
FIG. 2 is a block diagram of an exemplary system for identifying and extracting software system facts.

FIG. 2 is a block diagram of an exemplary system 200 for identifying and extracting software system facts (e.g., concepts 270, concept instances 272 and relationships 274) associated with a software system 205 and storing an indication, or representation, of the facts in a knowledge repository 280.

In the example, a fact extractor 230 comprises a concept extractor 240, an instance extractor 250 and a relationship identifier 260. The concept extractor 240 is configured to extract software system concepts 270 from formal language artifacts 210 of the software system 205. The concept extractor 240 is further configured to identify concepts 270 from intentional concept definitions 220. The instance extractor 250 extracts instances 272 of the software system concepts 270 from the formal language artifacts 210. The relationship identifier 260 is configured to identify or discern relationships 274 based on the concepts 270 and the concept instances 272. The relationships 274 relate one or more concepts 270 or one or more concept instances 272 to one or more other concepts 270 or one or more other concept instances 272. The fact extractor 230 stores the concepts 270, the concept instances 272 and the relationships 274 in a knowledge repository 280.

EXAMPLE 3

Exemplary Method of Identifying and Extracting Software System Facts

Figure 3:
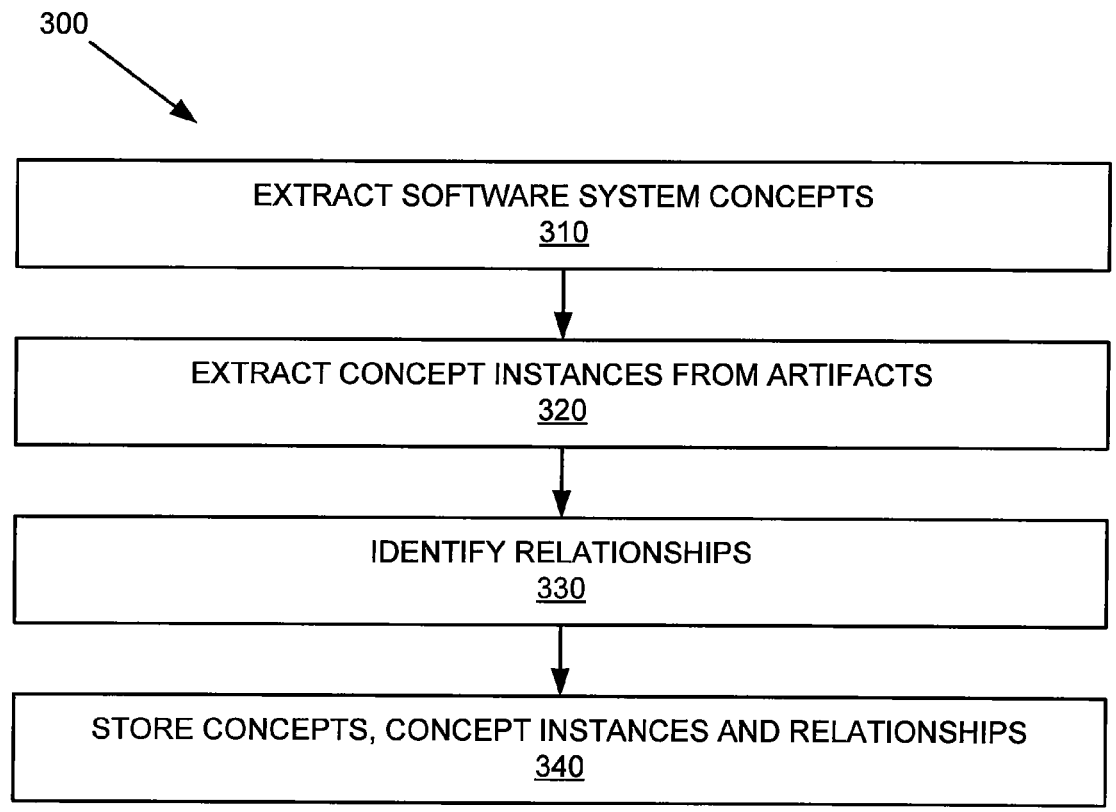
FIG. 3 is a block diagram of an exemplary method of identifying and extracting software system facts.

FIG. 3 is a block diagram of an exemplary method of identifying and extracting software system facts such as concepts or concept instances. At 310, software system concepts are extracted. The concepts can be extracted from formal language artifacts of the software system or defined intentionally by a set of intentional concept definitions.

At 320, concept instances are extracted from formal language artifacts. At 330, relationships based on the concepts and the concept instances are identified. At 340, the concepts, concept instances are relationships are stored in a knowledge repository.

The exemplary method 300 can operate with a knowledge repository already populated with software system facts. At 320, instances of concepts identified in 310 along with concepts previously stored in the repository can be extracted from the formal language artifacts. At 330, relationships can be identified based on the concepts identified at 310, the concept instances extracted at 320 and the concepts and concept instances previously stored in the repository.

The exemplary method 300 can process a set of formal language artifacts individually or together as a batch. In batch-mode processing, concepts are identified from the set of artifacts prior to the extraction of concept instances, the concept instances are extracted from the set of artifacts prior to identification of relationships and the relationships are identified prior to storing of software system facts in the knowledge repository. In individual-mode processing, the repository can be incrementally updated with a set of software system facts that are generated from the processing of one formal language artifact. The updated repository after the processing of one formal artifact can be a basis for the processing of the next formal language artifact. The storing of software system concepts and relationships comprises storing a representation (e.g., indication, model) of the concepts and relationships. That is, for example, the parent-child relationship between a C++ class and a field of that class can be stored, for example, in terms of the relationship type (e.g., member, parent-child), the concepts being related (e.g., C++ class, C++ field) and identifiers of the concept instances being related (e.g., C++ class "account," C++ field "balance"). The storing of concept instances can comprise storing a copy of the concept instances themselves (e.g., a copy of the computer-executable instructions comprising the concept instance) or a representation of the concept instance (e.g., information indicating where the artifact containing the concept instance can be found and at what location within the artifact the concept instance resides).

Prior to the processing of a first formal artifact of a software system by the exemplary method 300, the repository can comprise a set of bootstrap concepts from which other concepts are derived.

EXAMPLE 4

Exemplary Software System Facts

In any of the examples described herein, software system facts contain information about a software system and are expressed in terms of three basic constructs—concepts, relationships and roles. Concepts comprise domain concepts, which represent abstractions in the problem or knowledge domain to which the software system is applied, language concepts, which represent the data types and structures capable of being expressed in the various programming languages used to write the software system artifacts, and intentional concepts. Intentional concepts are concepts that are intentionally defined by users of the methods and systems described herein for extending the set of software system concepts beyond domain and language concepts. Relationship types represent the various manners in which elements of the software system (e.g., concepts and concept instances) relate to or depend upon each other. Roles are defined by and associated to the relationships.

Software system facts further comprise specific instantiations of software system concepts (concept instances) contained in the formal language artifacts comprising the software system and individual relationships (relationship type instances) within the software system (e.g., "concept instance A" uses "concept instance B," where uses is a relationship type).

The concept, relationship and role constructs can be better understood by way of an example outside of the software engineering realm. For example, a person John may have the following facts associated with him: John is a father, John is a citizen of India and John is an engineer. In any of the examples described herein, an instance can be associated with one concept. In this example, John is an instance of a "person" concept. The other facts associated with John are roles that this person plays in various relationships. Because John has children, he is associated with a "father" role. Because John satisfies criteria for Indian citizenship, he is associated with a "citizen" role.

Descriptional logic attempts to represent knowledge in a precise formal way with support for reasoning on that knowledge. Thus, the technologies described herein provide systems and methods to define, capture, represent, infer and use a descriptional logic knowledge base in a variety of ways.

EXAMPLE 5

Exemplary Software System and Software System Architecture

In any of the examples described herein, software systems can, for example, provide solutions to a myriad of problems and have wide-ranging applications. A software system architecture can provide a simplified representation of a software system by fragmenting the system, for example, along functional lines into constituent parts (e.g., systems, subsystems, functions, modules). A software system architecture can be a hierarchical organization of these parts.

Figure 4:
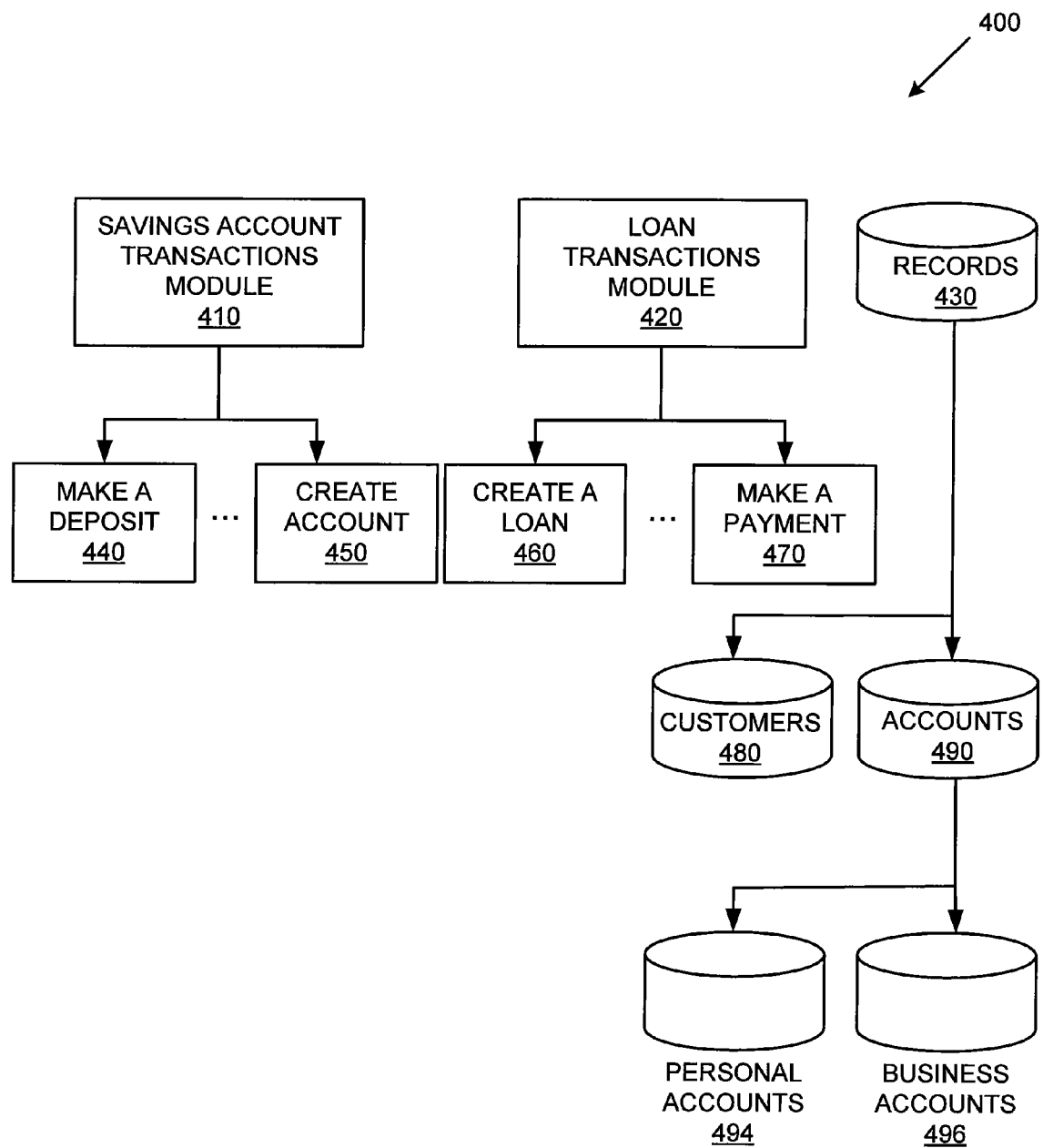
FIG. 4 is a block diagram of an exemplary banking software system.

FIG. 4 is a block diagram of an architecture of a banking software system 400. The system 400 comprises a savings account transactions module 410, a loan transactions module 420 and a records database 430. The savings account transaction module 410 is configured to provide transactions such as Make a Deposit 440 and Create an Account 450 and the loan transactions module 420 is configured to provide transactions such as Create a Loan 460 and Make a Payment 470. The records database 430 comprises a customer database 480 and an accounts database 490, the account database comprising a business account database 496 and a personal account database 494.

A software system can be modeled with or represented by various architectures, the constituent components of the architecture generated by partitioning the software system along various lines (e.g., functional, programmatic (i.e., by programming language)). As described herein, software system architectures can be recovered from formal language artifacts comprising the software system.

In any of the examples described herein, a software system can be described by a meta-model comprising concepts associated with the software system, instantiations of the software system concepts (concept instances) and relationships based on the concepts and the concept instances.

EXAMPLE 6

Exemplary Software System Concepts

In any of the examples described herein, various concepts are associated with a software system. These software system concepts comprise domain concepts that are, for example, associated with the problem or knowledge domain (e.g., finance, health care, engineering) to which the software system is applied. For example, the concepts "patient," "treatment plan" and "healthcare provider" can be associated with a healthcare software system. Concepts can model informational entities (e.g., "patient") or behaviors or actions (e.g. "patient release") within a knowledge domain.

Figure 5:
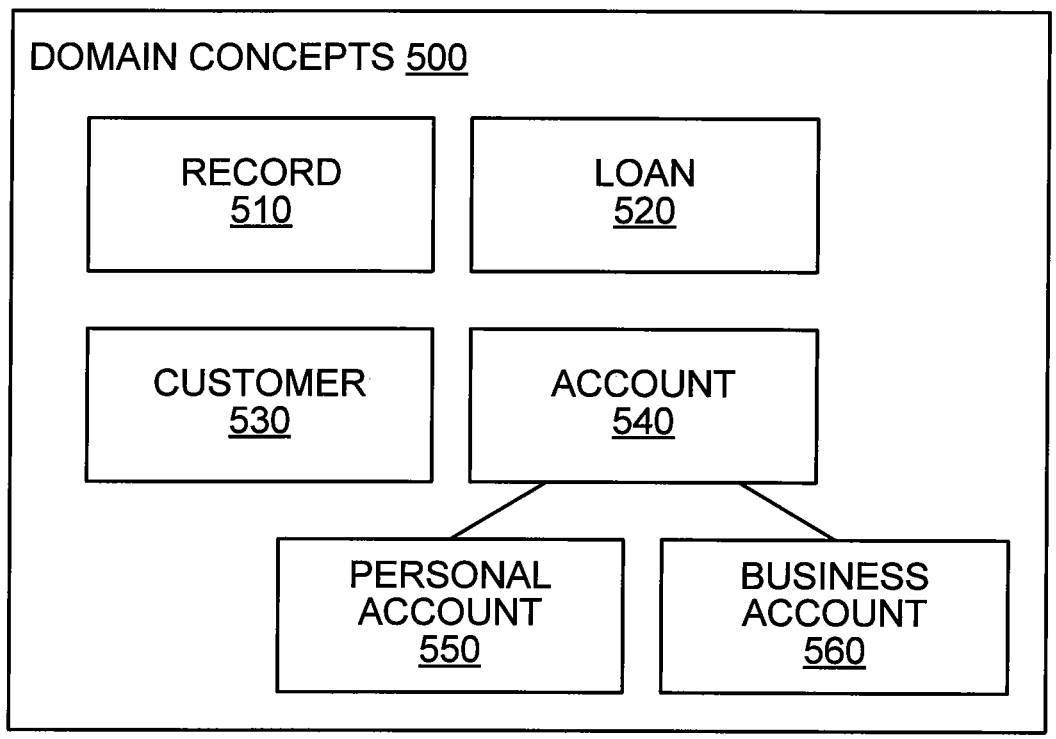
FIG. 5 is a block diagram of exemplary domain concepts of the exemplary software system of FIG. 4.

FIG. 5 is a block diagram of exemplary domain concepts 500 associated with the banking software system of FIG. 4. As shown in FIG. 4, the domain concepts 500 include record 510, loan 520, customer 530, account 540, personal account 550 and business account 560. Domain concepts can be hierarchically related. In the example, the personal account concept 550 and the business account concept 560 are sub-concepts of the account concept 540.

Figure 6:
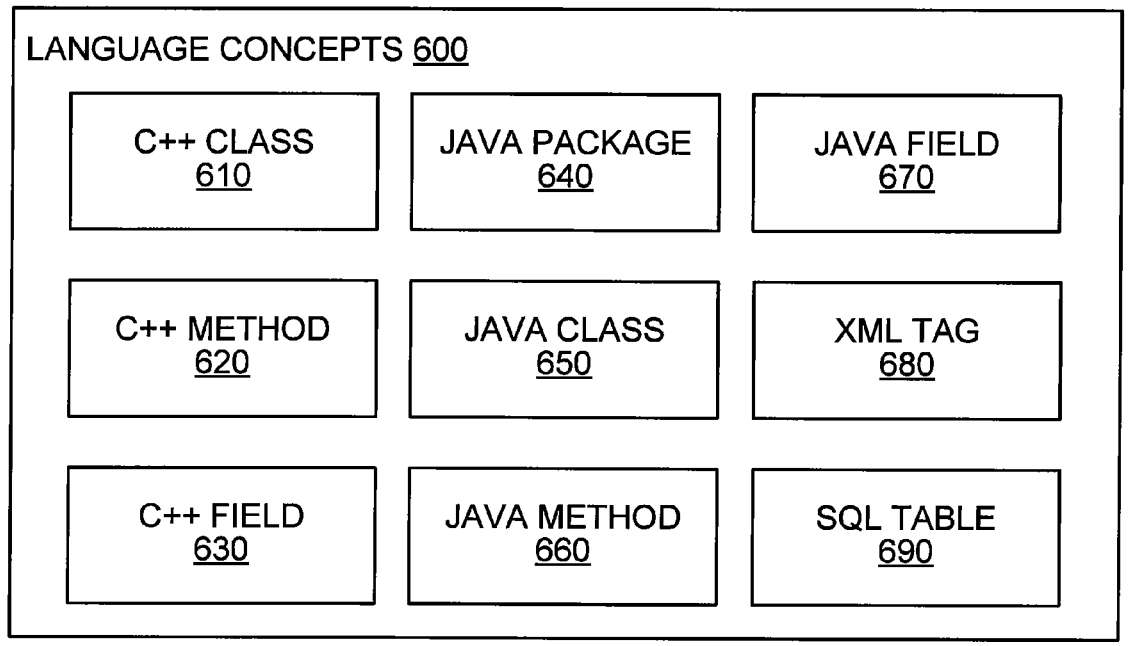
FIG. 6 is a block diagram of exemplary language concepts of the exemplary software system of FIG. 4.

Software system concepts further comprise language concepts. A software system is embodied in computer-executable instructions contained in one or more artifacts written in one or more formal languages (e.g., C++, Java). Language concepts are defined, in part, by the syntactical rules and allowed data types and structures of the various formal languages. FIG. 6 depicts language concepts "C++ class" 610, "C++ method" 620, "C++ field" 630, "Java package" 640, "Java class" 650, "Java method" 660, "Java field" 670, "XML tag" 680 and "SQL table" 690.

Figure 7:
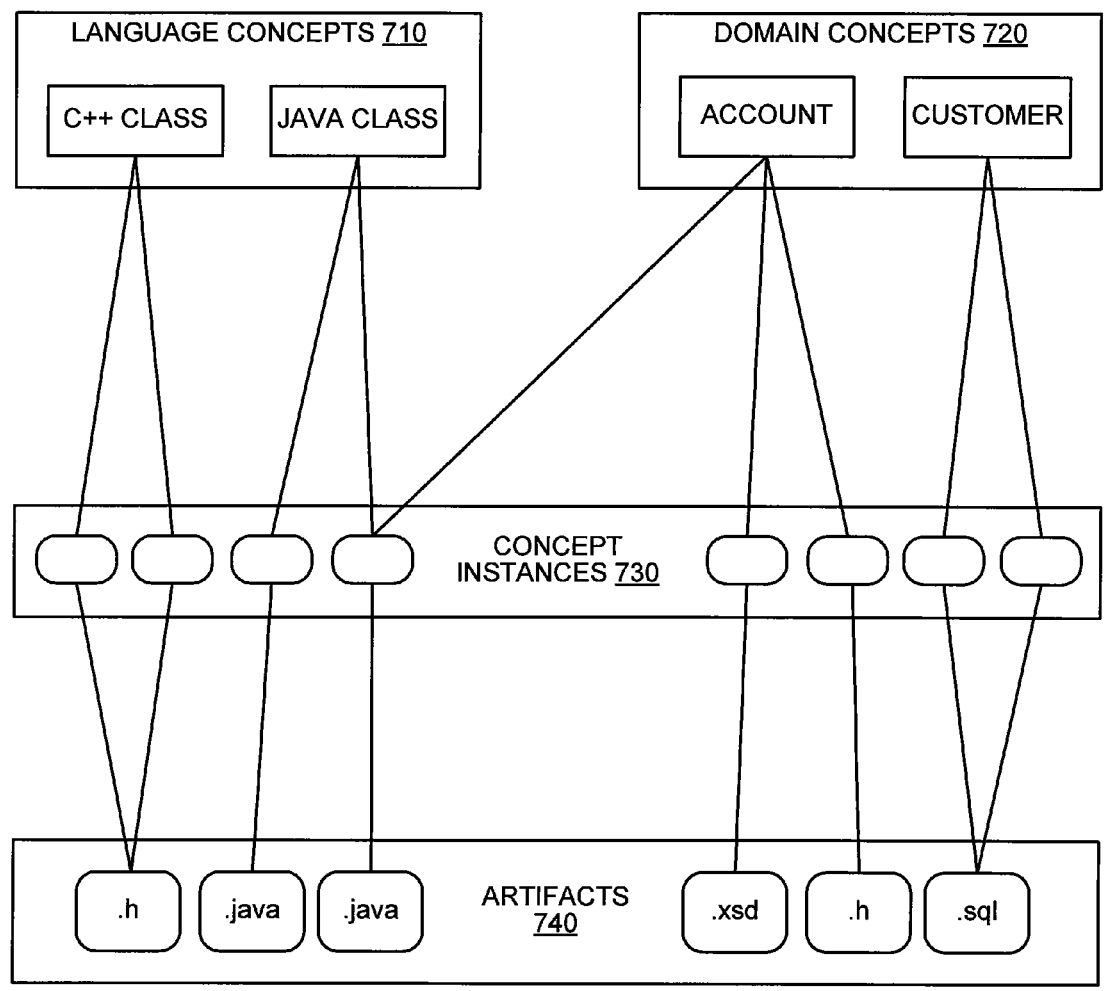
FIG. 7 is a block diagram of exemplary associations between concepts, concept instances and artifacts of the exemplary software system of FIG. 4.

FIG. 7 depicts possible associations between formal language artifacts 740, concept instances 730, domain concepts 720 and language concepts 710 of the software system 400 of FIG. 4. As shown, a concept instance 730 can be associated with one or more language concepts 710 or domain concepts 720, a language concept 710 or domain concept 720 can be associated with one or more concept instances 730 and an artifact 740 can contain one or more concept instances 730.

As described herein, software system concepts can further comprise intentionally defined concepts. Intentionally defined concepts are based on existing concepts and relationships and allow concept hierarchies to be built, which can aid in the understanding and conceptualization of larger software systems.

EXAMPLE 7

Exemplary Identification of Software System Concepts

In any of the examples described herein, software system concepts can be identified in various manners. For example, domain concepts can be extracted from formal concept language artifacts. Language concepts can be identified, for example, by formal programming language parsers or by schemas that define how a knowledge repository is to be organized (e.g., what language concepts are to be stored in the knowledge repository and how they will be represented). Intentionally defined concepts can be provided, for example, in concept definition files supplied by various stakeholders of the software system. Intentionally defined concepts can comprise domain concepts or concepts based on previously identified concepts or relationships.

EXAMPLE 8

Exemplary Instances

Figure 8:
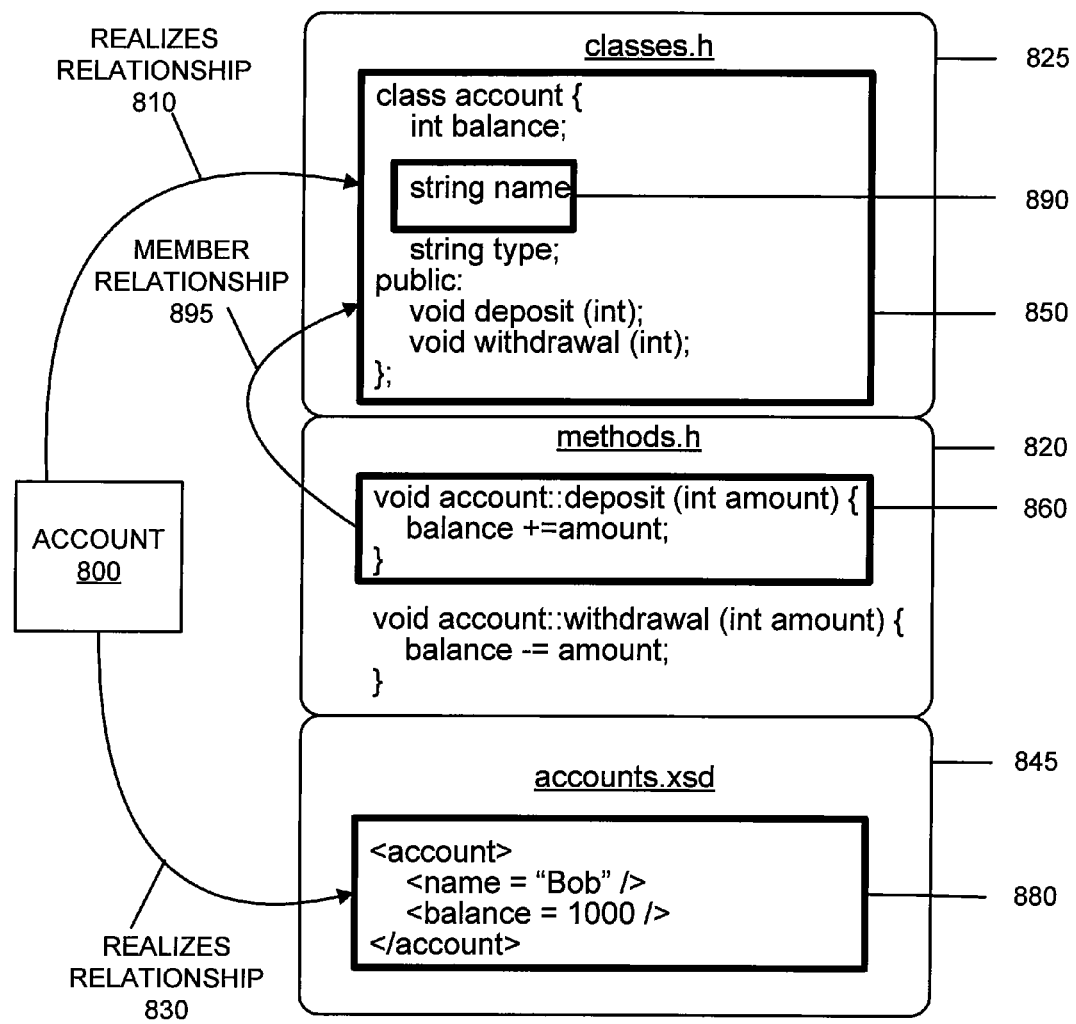
FIG. 8 depicts exemplary concept instances contained in formal language artifacts of the exemplary software system of FIG. 4 and "represents" relationships between the concept instances and a domain concept.

In any of the examples herein, a concept instance can be a specific instantiation, or instance, of a software system concept (e.g., domain concept, language concept) in a formal language artifact. FIG. 8 depicts C++ artifacts 820 and 825 and XML artifact 845 containing various concept instances. A concept instance is associated with one or more software system concepts. For example, a C++ class instance "account" 850 is an instance of the C++ "class" language concept, a C++ field instance "name" defined in statement 890 is an instance of the C++ "field" language concept and the C++ method "account.deposit" defined in statements 860 is an instance of both the C++ "method" language concept and the "savings account transaction" domain concept. Thus, C++ class "account," C++ field "name" and C++ method "account.deposit" are concept instances.

A concept can be associated with concept instances written in various formal languages. This allows for the technologies described herein to address the issue of semantic scatter (e.g., concept scatter) which occurs when instantiations of a concept are contained in artifacts written in different languages. For example, the software system domain concept "account" can be associated with the XML account concept instance "Bob," defined in statements 880 and C++ class "account."

EXAMPLE 9

Exemplary Artifacts

In any of the examples herein, a software system comprises various types of artifacts written in natural or formal languages. Natural language (e.g., English) artifacts are intended for human interpretation and comprise design manuals, architectural descriptions and planning documents. Formal language artifacts are intended for computer interpretation and comprise computer-executable instructions or computer-interpretable statements stored in physical files on computer-readable media (e.g., hard drives, diskettes, flash drives, optical drives, DVDs, CD-ROMs) or in memory (e.g., ROM, RAM, non-volatile memory). Formal languages comprise formal programming languages (e.g., C++, Java, COBOL, Perl, XML, PASCAL, FORTRAN, BASIC) and formal concept, or ontology, languages (e.g., UML (Universal Modeling Language), RDF (Resource Description Framework), OWL (Web Ontology Language)). The artifacts can be in source code or compiled form, stored locally or remotely to one or more processing units performing any of the methods described herein, and can be stored in a centralized or distributed fashion.

EXAMPLE 10

Exemplary Software System Relationships

In any of the examples herein, relationships within a software system model the various dependencies, interactions, associations and semantic links between software system concepts and/or concept instances. For example, a parent-child relationship can model the association between a C++ class and a C++ method belonging to that class. This parent-child relationship can modeled by a "member" relationship type using the technologies described herein.

Software system relationships are capable of being n-ary relationships (e.g., unary, $R(T_1)$; binary, $R(T_1,T_2)$; ternary, $R(T_1, T_2, T_3)$) where R is a relationship type and $T_1, \ldots T_n$ are the terms of the relationship. The terms in a relationship are identified by role names, the role names being associated with one of the terms in a relationship. Thus, unary relationships can be expressed as $R(r_{11}(T_1))$; binary relationships as $R(r_{21}(T_1),r_{22}(T_2))$; and ternary relationships as $R(r_{31}(T_1),r_{32}(T_2),r_{33}(T_3))$ where $r_{11}, r_{21}, r_{22}, r_{31}, r_{32}, r_{33}$ are the role names for the relationships. Relationships can exist as inverse pairs, $R_1(T_1, T_2)=R_1'(T_2, T_1)$ where $R_1'$ is the inverse relationship type of relationship type $R_1$.

Relationships within a software system are uniquely identified and are expressed in terms of a relationship type, concepts and concept instances. For example, with reference to FIG. 8, the relationship between C++ method "account.deposit" 860 and C++ class "account" 800 can be expressed as a "member" relationship, 895 relating the concept instance "account.deposit" of the language concept "C++ method" to the concept instance "account" of language concept "C++ class." Similarly, the relationship between C++ field "name" 890 and C++ class "account" 800 can be expressed as a "member" relationship relating the concept instance "name" of the language concept "C++ field" to the instance "account" of the language concept C++ "class."

Relationships can be represented in the knowledge repository according to various schemas. For example, the "member" relationship could be represented generally in the form "memberOf(source instance, target instance)," indicating that the "source instance" term is a member of the "target instance" term. In this example, the parent-child relationship between C++ class "account" and C++ method "account.deposit" shown in FIG. 8 could be expressed as "memberOf (account.deposit, account)."

Relationship schemas can restrict which concept instances and concepts can be used as relationship terms using term role names. For example, the C++class-method relationship can be modeled by a "member" relationship type defined by the expression "memberOf(memberMethod(method), ownerClass(class)). This definition is read "there is some instance of the 'class' concept (a class instance) that defines a member which is an instance of the 'method' concept (a method instance), and this relationship is to be represented in the relationship schema as a memberOf relationship between that class instance and the method instance." The term roles "memberMethod" and "ownerClass" define the permissible list of concepts whose instances can represent that the associated terms in the relationship. In the above definition, only instances of the "method" concept are permissible for the "memberMethod" role in the "memberOf" "relationship" and only "class" concept instances are permissible for the "ownerClass" role for the "memberOf" relationship type.

Relationship instances (e.g., individual relationships, relationships) are expressed in terms of relationship type names and actual instance names. For example, if "account" is an instance of the "C++ class" concept and "transferFunds" is an instance of the "C++ method" concept and is defined in the class "account," this class-member relationship can be expressed as memberOf(transferFunds, account), where "transferFunds" satisfies the "memberMethod" role and "account" satisfies the "ownerClass" role. Thus, only instances of the C++ "method" language concept would be permitted to be used as the source term and only instances of the C++ "class" language concept would be permitted to be used as the target term. Schemas that utilize term role names can have relationship type variants for the various formal languages used to write the software system artifacts. For example, a schema using term role names could have the "member" relationships type variants "memberOf_cplusplus_method_class(method, class)" and "memberOf_java_method_class(method, class)".

Relationship types in a schema can comprise base relationship types, extended relationship types and intentionally defined cross-artifact relationship types. Relationship types may also be related to each other by a "subsumes" relationship, which relates a relationship type as being specific kind of another relationship type. A relationship tree structure can be created in which children relationships types that are specific kinds of a parent relationship type are related to the parent relationship types by the "subsumes" relationship type. Relationship trees, or relationship hierarchies, can be used to derive subsumes relationships between corresponding roles in relationships. For example, if a relationship type R1 is defined by $R1(r_{11}, r_{12})$ and does not define the permissible concepts for roles $r_{11}$ and $r_{12}$, a relationship type R2 is defined by $R2(r_{21},r_{22})$ and relationship type R2 subsumes R1 (i.e., R2 is a special kind of relationship type R1), then it can be inferred that role $r_{21}$ subsumes role $r_{11}$ and role $r_{22}$ subsumes $r_{22}$. That is, the permissible concepts for roles $r_{11}$ and $r_{12}$ include the permissible concepts for roles $r_{21}$ and roles $r_{22}$, respectively.

EXAMPLE 11

Exemplary Base Relationship Types

In any of the examples described herein, relationships within a software system can be represented with a set of base relationship types. The base set of relationship types comprises "member," "instance," "extends," "represents," "represented by," "conforms," "realizes," "realized by," "uses" and "representational variant" relationship types.

The "member" (e.g., "memberOf") relationship type relates a concept instance as a member of another concept instance. With reference to FIG. 8, a "member" relationship 895 can relate the instance "account.deposit" of the C++ "method" language concept to the instance "account" of the C++ "class" language concept.

The "instance" (e.g., "instanceOf") relationship type associates a specific instantiation of a concept with that concept.

Thus, an "instance" relationship can relate instance "account" 850 to the C++ "class" lnaguage concept and the instance "name" 890 to the C++ "field" language concept.

The "extends" relationship type indicates a generalization—specialization relationship between concepts, relationships or roles. That is, a concept, relationship or role is a refinement of another concept, relationship or role. "Extends" relationships can be used to build hierarchies of concepts, relationships or roles. The concept of inheritance in frame based or object oriented languages is an example of an "extends" relationship. "Extends" relationship types can be defined, for example, as "extends: {subConcept(Concept), superConcept(Concept}," or "extends: {subRelation(Relationship), superRelation(Relationship)}" or "extends: {subRole(Role), superRole(Role)}," where "subConcept," "superConcept," "subRelation," "superRelation," "subRole" and "superRole" or term roles for the "extends" relationship type.

Figure 9:
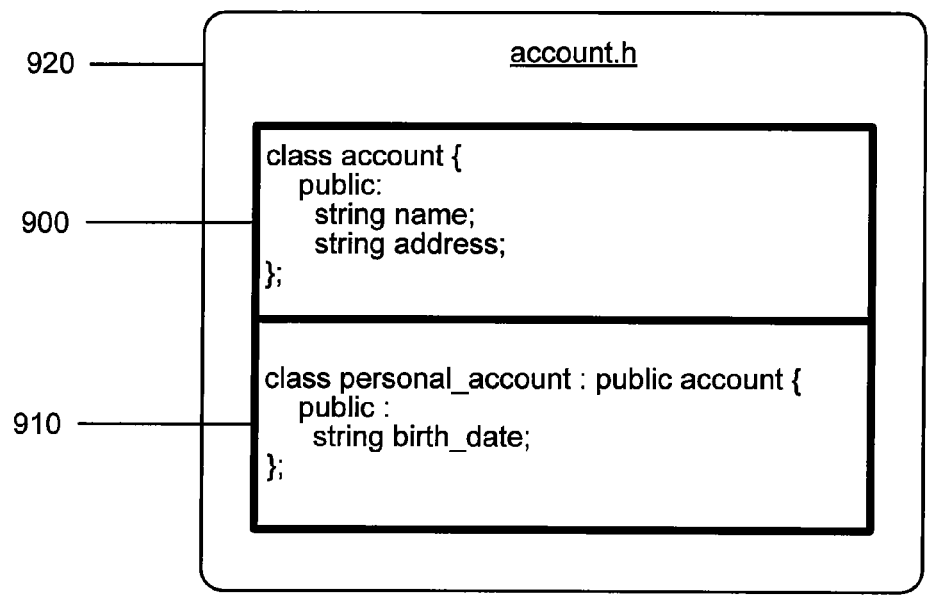
FIG. 9 depicts exemplary concept instances contained in formal language artifacts that are related to a domain concept by an "extends" relationship.

For example, referring to FIG. 9, concept instances 900, 910 are contained in an artifact 920 of a software system such as the software system of FIG. 4. The C++ class "personal_account" 910 is an instance of the domain concept "personal_account" 550 of FIG. 5 and is derived from C++ class "account" 900, which is an instance of the domain concept "account" 540. As a derived C++ class, "personal_customer" 910 inherits the properties of the "account" class 900 in addition to defining its own properties (e.g., "string birth_date"). Thus, this implementation of the "personal_customer" domain concept 550 and the "account" domain concept 540 shows that the "personal_customer" domain concept 550 is a refinement of the "account" domain concept 540 and is associated with the "extends" relationship type.

Figure 10:
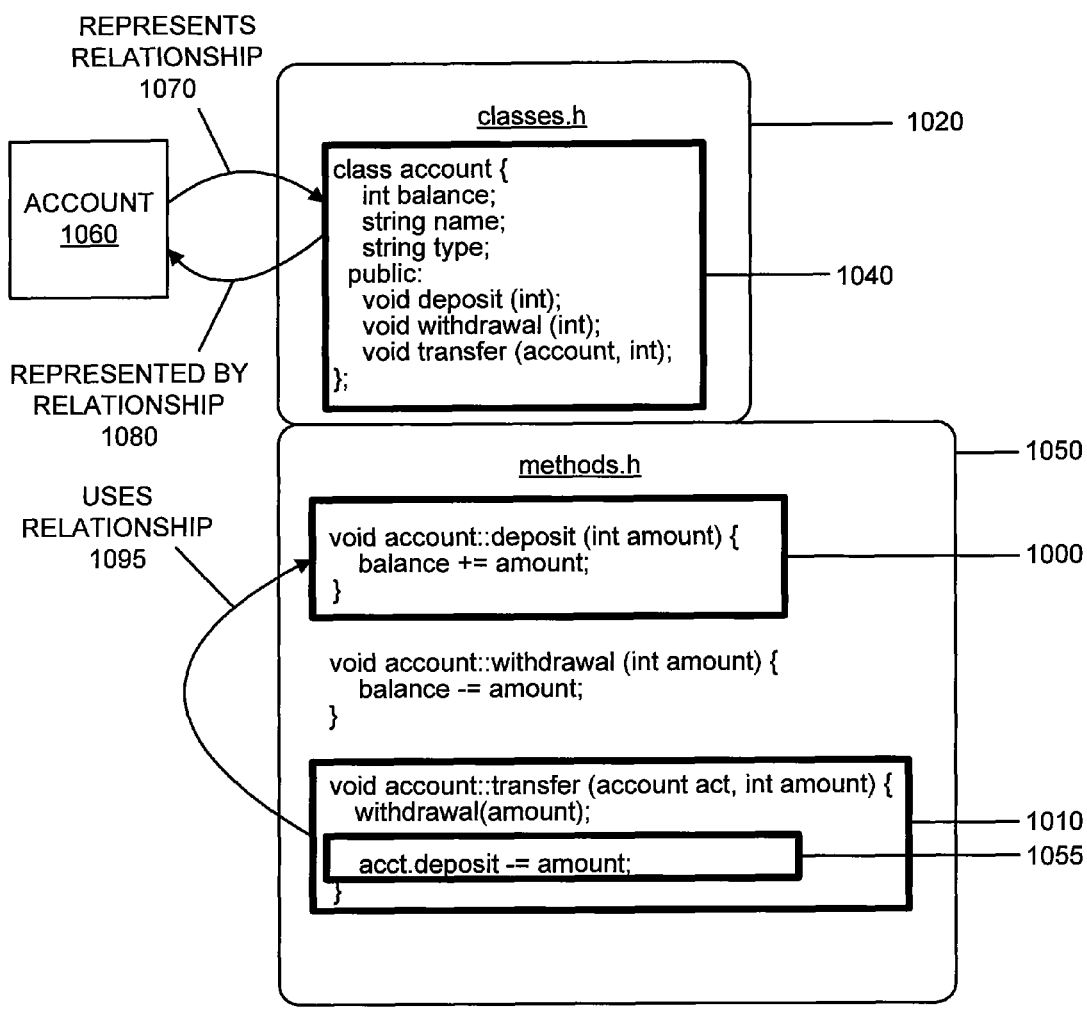
FIG. 10 depicts exemplary concept instances contained in formal language artifacts and "uses," "represents" and "representedBy" relationships.

The "represents" (e.g., "representationOf") relationship type relates a domain concept in some knowledge domain to a representation of that concept in some formal language. This representation can be referred to as a model of that domain concept. For example, with reference to FIG. 10, the C++ class "account" 1040 in C++ artifact 1020 represents the banking and financial domain concept "account." Thus, the "represents" relationship 1070 relates the "account" instance 1040 of C++ language concept "class" to the domain concept "account" 1060. A "represented by" (e.g., "representedBy") relationship type is the inverse of the "represents" relationship type (i.e., the "represents" and "represented by" relationship types comprise an inverse relationship type pair). That is, the "represented by" relationship type relates an instantiation of a concept to the domain concept that it represents. Thus, the "represented by" relationship 1080 also relates the "account" instance 1040 of C++ language concept "class" to the domain concept "account" 1060. Although not shown in FIG. 10, a pair of "represented" and "represented by" relationships could relate the "account" concept instance 1040 to the C++ "class" language concept.

The "representational variant" (e.g., "representationalVariantOf") relationship type expresses the representational variance between multiple model representations of a given domain concept. In some cases, models that represent a domain concept can be organized based on the degree of abstraction into an ordered sequence. If the organization is arranged according to increasing degree of abstraction, then the top-most model is the most abstract and the bottom-most model is the least abstract. The "realizes" and "realized by" relationship type inverse pair, extended from the "representational variant" relationship type, are used to describe this situation. The "realizes" relationship type is defined by the expression realizes(abstractModel(model), realizedModel (model)) and the "realized by" relationship type is defined by the expression realizedBy(realizedModel(model), abstractModel(model)). For example, with reference to FIG. 8, "realizes" relationships 810 and 830 indicate that instance "account" 850 of C++ language concept "class" and instance "Bob" 880 of XML concept "account" realize domain concept "account" 800. That is, the "realizes" relationship type relates an instance of a language concept to the domain concept it represents. In this case, the domain concept "account" is more abstract than the XML language concept and the C++ language concept. That is, the C++ and XML language concepts realize that domain concept.

In another example, an "account" concept belonging to the banking and financial services domain is modeled in two artifacts, an artifact account.uml written in UML and an artifact account.java written in Java. Account.uml contains an instance "account_UML" of concept "UML_class" and accountjava contains an instance "account_Java" of concept "Java_class" where "account_UML" is considered more abstract than Account_Java. Software system facts describing this example include:

account_Java instanceOf Java_Class
    account_UML instanceOf UML_Class;
    account_Java represenationOf account;
    account_UML reprsentationOf account; and
    account_Java realizes Account_UML.

The "uses" relationship type indicates that a concept instance is used by or referred to by another concept instance. The "uses" relationship type can comprise various relationship types (e.g., sub-relationship types) between concepts instances. For example, a "calls" relationship type is a "uses" sub-relationship type indicating that one method concept instance calls another method concept instance and a "fieldUse" relationship type is a "uses" sub-relationship type indicating that one concept instance refers to a field of another concept instance. For example, with reference to FIG. 10, the reference of C++ method "account.transfer" 1010 in C++ artifact 1050 to the C++ method "account.deposit" 1000 indicated by statement 1055 can be represented by a "uses" relationship 1095 relating the instance "account.transfer" 1010 of C++ language concept "method" to the instance "account.deposit" 1000 of C++ language concept "method."

The "conforms" relationship type relates a first instance that is a schema or a meta-model representation to a second instance that structures data representation such that the second instance satisfies or conforms to the structural rules in the schema or meta-model representation. For example, a domain concept "account" may be structurally defined to have two attributes, a numeric account number and an account type that is a character string. This structural definition of the "account" concept may be expressed using the XML Schema language as instance "AccountXSD" in an artifact Account.xsd. An instance "johns_account" of concept "account" that represents John's account (#101, "SA") may be represented using XML constructs defined by the AccountXSD schema. In this case, the instance "johns_account" conforms to instance "Account XSD" (e.g. johns_account "conformsTo" AccountXSD).

The relationships identified using any of the methods or systems described herein are potential relationships between concepts and/or concept instances and need not be used by the software system in order for the relationship to be identified and stored in a repository. For example, the "uses" relationship 1095 between "account.transfer" 1010 and "account.deposit" is identified and stored regardless of whether the "transfer" method of a specific instance of C++ class "account" refers to that "deposit" method of that instance (e.g., whether, in an instance "john" of C++ class "account,"

method "john.transfer" has referred to method "john.deposit"). In this sense, the methods described herein provide a static analysis of a software system that yields a consistent result regardless of the run-time history of the software system.

EXAMPLE 12

Exemplary Extended Relationship Types and Concepts

In any of the examples herein, the knowledge repository can comprise extended, composite or other relationship types defined in terms of existing relationship types. Extended relationship types can be composed using the predicate composition rules of the query language PredQL or otherwise composed. Thus, base relationship types can be combined in a logic expression using logic operators to define extended relationship types or concepts. Extended relationships can themselves be used in defining further extended relationships, allowing a hierarchy of relationship types to be defined. For example, the expression R3:–R1 v R2 (using PredQL syntax) would define an extended relationship type R3 as a logical "OR" of existing relationships types (either base relationship types or previously derived extended relationship types) R1 and R2.

EXAMPLE 13

Exemplary n-ary Relationship Types and Partial Facts

Figure 11:
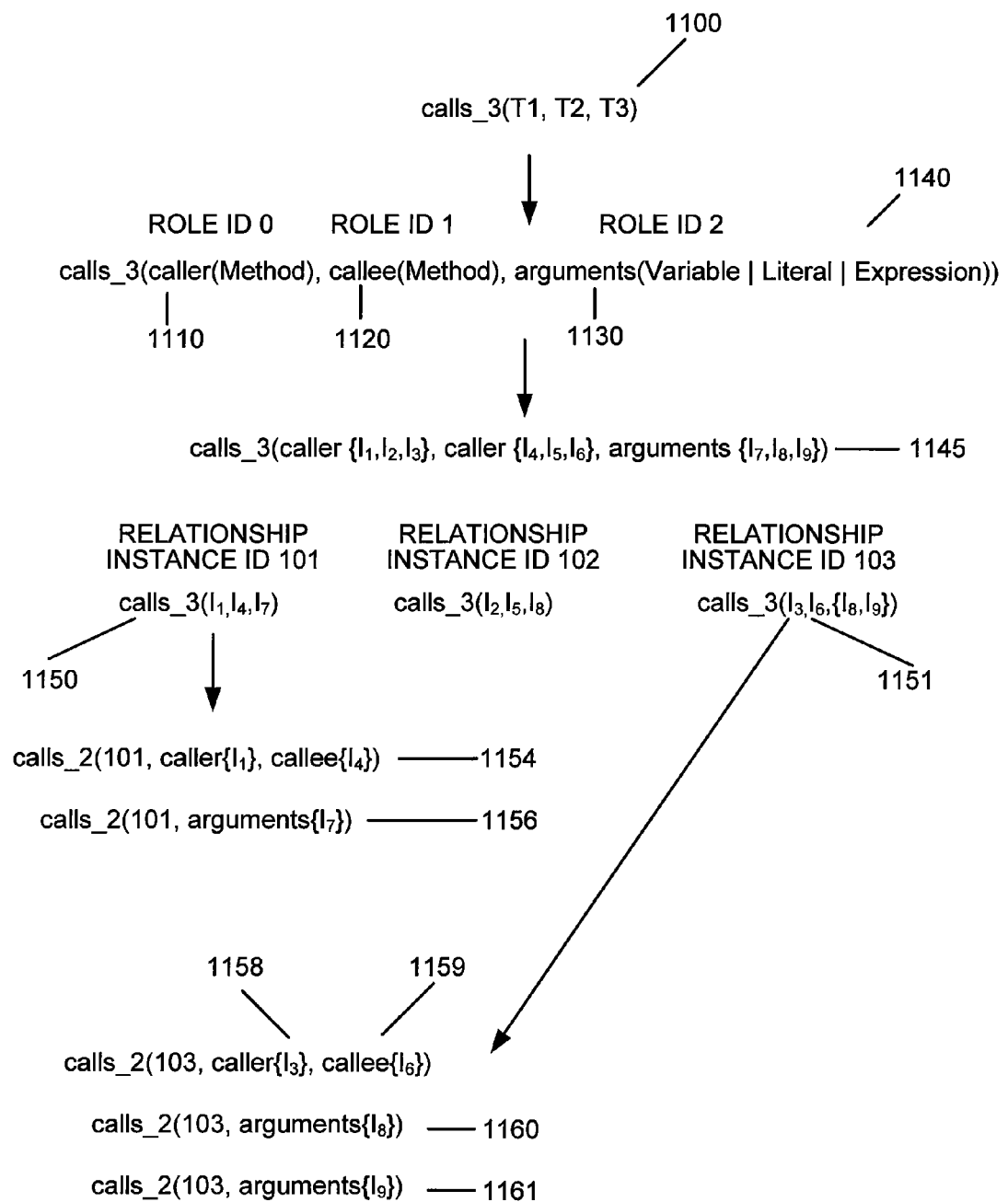
FIG. 11 depicts an exemplary ternary relationship type with term roles, permissible concept instances for the term roles, and decomposition of a ternary relationship into binary relationships.

The technologies described herein support n-ary relationship types, where n>=1, (e.g., unary, binary, ternary, quaternary). A relationship having an arity n greater than two is evaluated by decomposing the relationship into (n−1) binary relationships consisting of one primary binary relationship that relates two roles of the n-ary relationship and (n−2) secondary binary relations that relate the remaining roles of the n-ary relationship to the primary relationship. Referring to FIG. 11, a ternary relationship "calls_3" 1100 has three terms with role names "caller," "callee," and "arguments" 1110, 1120 and 1130. These roles have associated role identifiers (e.g., 0, 1 and 2 for the terms "caller," "callee" and "arguments" respectively). The role and associated role policies indicate the concepts and concept instances that may be used for the associated term in the "calls_3" relationship. In the example, the "caller" role permits instances $I_1$, $I_2$ and $I_3$ to be used for the first term, the "callee" role permits instances $I_4$, $I_5$ and $I_6$ to be used for the second term and the "arguments" role permits either variable (e.g., name, address, balance), literal (e.g. "John," "123 Main St.") or expression (e.g. x+y) concept instances $I_7$, $I_8$ and $I_9$ to be used for the third term, as shown in relationship expression 1145.

A co-relationship identifier allows the multiple binary relationships that constitute a single instance of an n-ary relationship of a given relationship type to be associated with each other. In the example, instances 1150, 1160 and 1170 of the ternary relationship "calls_3" have co-relationship identifiers 101, 102 and 103 respectively. These relationships can be decomposed into two binary relationships: calls_2(co-relationship identifier, caller, callee) and calls_2(co-relationship identifier, caller, arguments). For example, instance calls_3 $(I_1, I_4 I_7)$ 1150 is decomposed into calls_2(101, caller{$I_1$ }, callee{$I_4$}) 1154 and calls_2(101, arguments {$I_7$}) 1156. Co-relationship identifier 101 is used to relate calls_2 relationships 1154 and 1156 to each other as constituent binary relationships of a higher-order relationship. The partitioning of n-ary relationships into (n−1) binary relationships of the same relationship type allows for the representation of partial or incomplete knowledge about a relationship. For example, for relationship calls_3($I_1$, $I_4$, $I_7$) 1150, constituent relationship calls_2($I_1$, $I_4$) 1154 represents partial knowledge of relationship 1150. Relationship 1154 is stored independently from and can be stored or generated at a different time from constituent relationship calls_2(I, $I_7$) 1156. For example, if the additional knowledge about the third term of the calls_3 relationship, "arguments," is available at a later time than when the knowledge for the first and second terms, "caller" and "callee" is available, the ternary relationship calls_3($I_1$, $I_4$, $I_7$) can be evaluated at that later time. Constituent relationships having a same co-relationship identifier are combined to evaluate the ternary relationship 1150. Thus, co-relationship identifiers enable not only the representation of partial knowledge of higher-order relationships but also allow for incremental completion of facts in a knowledge database without having to change previously stored facts.

For n-ary relationships with n<=2, the term role names are unary predicates (e.g., subClass($I_1$), superClass($I_2$)). For n-ary relationship types with n greater than two, the term role names may be either unary predicates (e.g., caller($I_1$), caller ($I_2$)) or binary predicates between a co-relationship identifier and the permissible concept instances for that role (e.g. caller (101, $I_1$), callee(101, $I_2$)). The difference between the two predicate expressions is that the unary predicate caller($I_1$) determines whether instance $I_1$ takes a "caller" role in any "calls" relationship while the binary predicate caller(101, $I_1$) determines whether the instance $I_1$ is the caller for a specific "calls" relationship (e.g., relationship 101).

Relationships can be represented at various arities. For example, if "livesIn" is a relationship and "John" and "David" are two instances of a "Person" concept, then one fact could be "John livesIn Pune" while another fact could be "David livesIn Delhi" at "Greater Kailash." The second fact uses the same "livesIn" relationship type but provides more terms related to the "livesIn" relationship. Thus, the "livesIn" relationship could be either a binary relationship "livesIn(Person, City)" or a ternary relationship "livesIn(Person,City,Neighborhood)," where "Neighborhood" is a term role name for the additional term in the ternary relationship.

EXAMPLE 14

Exemplary Language Parsers

Figure 12:
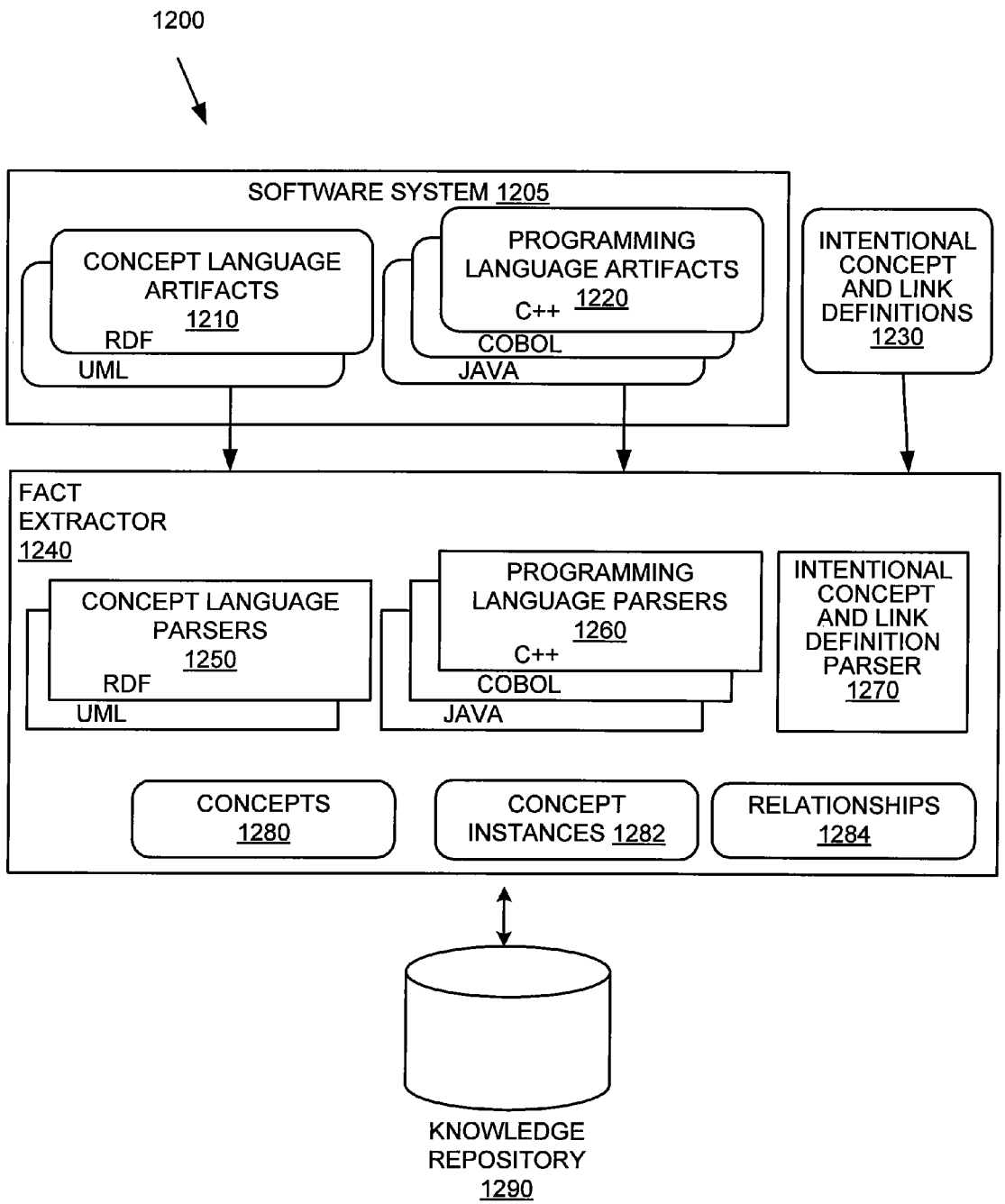
FIG. 12 is a block diagram of the exemplary system for extracting facts of a software system of FIG. 2 using language parsers.

FIG. 12 is a block diagram of the exemplary system for extracting software system facts of FIG. 2 including language parsers 1250 and 1260. A language parser extracts concepts and concept instances from formal language artifacts written in the formal language associated with the parser. Formal concept language parsers 1250 extract concepts 1280 from concept language artifacts 1210 and formal programming language parsers 1260 extract programming language concepts and concept instances 1282 from programming language artifacts 1220. The formal programming language parsers 1260 can provide the language concept definitions for the language for which the parser is written.

The parsers 1250 and 1260 can further identify relationships 1284 within the software system 1205. The parsers 1250 and 1260 can identify relationships among concept instances both within a single artifact and across multiple artifacts. If the parsers 1260 are not capable of identifying relationships between concept instances in multiple artifacts, cross-artifact relationships can be intentionally defined separately, for example, with intentional concept and link definitions 1230. Alternatively, one or more components of the fact extractor 1240 other than the parsers 1250 and 1260 can identify the relationships 1284. The parsers can access the knowledge repository 1290 to reference stored concepts, concept instances and relationships. The parsers 1250 and 1260 are written employing parser technologies and techniques known in the art.

An intentional concept and link definition parser 1270 can parse the intentional concept definitions 1230. The intentional concept and link definition parser 1270 identifies additional concepts 1280 for inclusion in the knowledge repository 1290 based on the intentional concept definitions 1230 and relationships 1284 based on the intentional link definitions 1230. The intentional concept and link definitions 1230 can be expressed using a Link Definition Language as described herein and the parser 1270 can be a link processor that interprets Link Definition Language statements.

EXAMPLE 15

Exemplary Knowledge Repository

Figure 13:
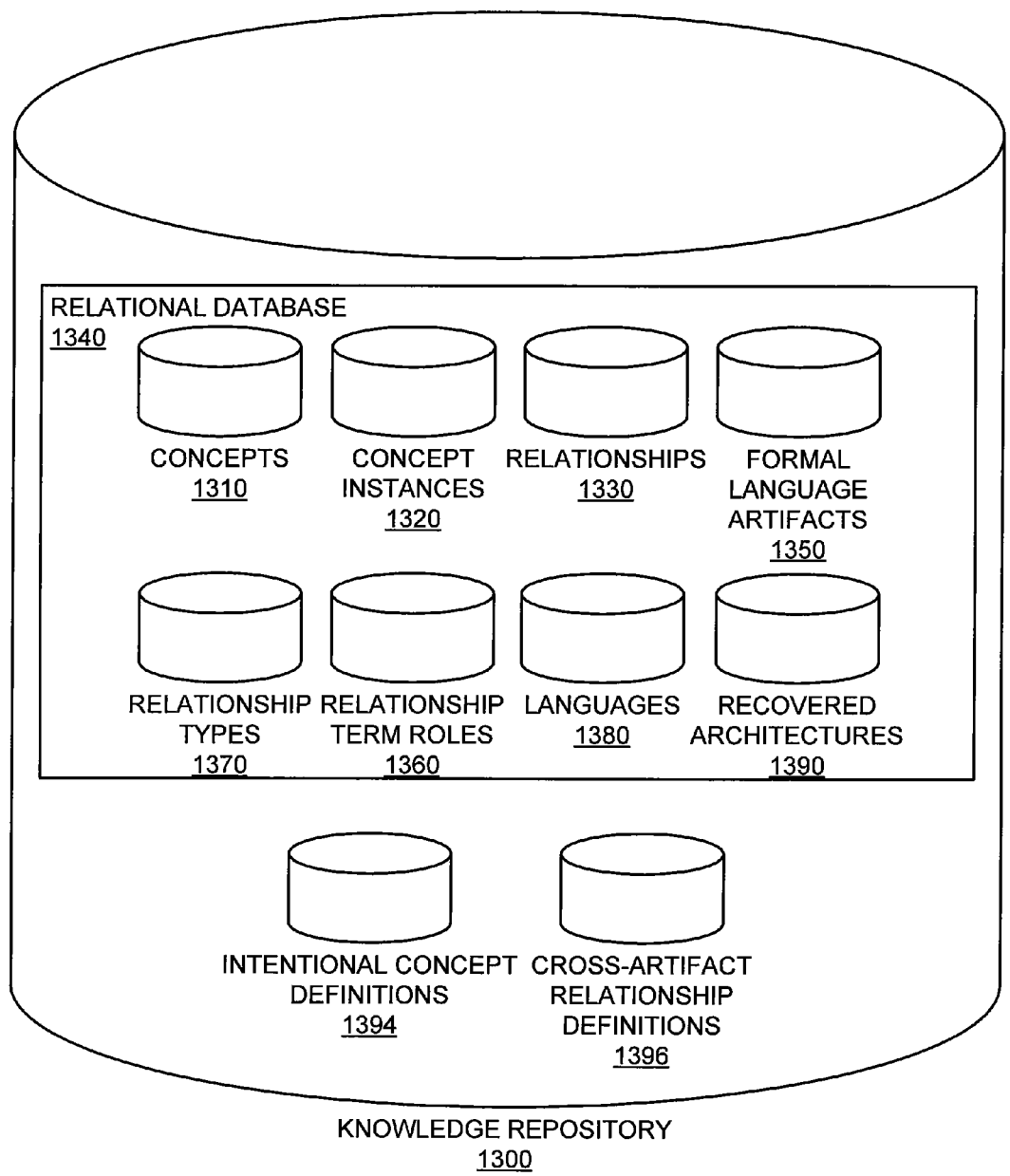
FIG. 13 depicts an exemplary knowledge repository.

FIG. 13 depicts an exemplary knowledge repository 1300 for storing software system facts. The knowledge repository 1300 stores the facts (i.e., stores representations of the facts) identified and extracted from a software system using any of the methods described herein. The repository 1300 comprises concepts 1310, concept instances 1320 and relationships 1330. The repository can also comprise formal language artifacts 1350 (either as copies of the artifacts or as information indicating where the artifacts are located), relationship term roles\(roles) 1360, relationship types 1370 and artifact languages 1380. The software system facts 1310-1390 can be stored in a relational database 1340. Intentional concept definitions 1394 and cross-artifact relationship definitions 1396 can be stored in the knowledge repository 1300 as XML, or other concept language, artifacts.

The repository 1300 can be manifested in various forms. A set of software system facts can be stored locally (e.g., stored in memory (e.g., ROM, RAM) or in one or more internal and/or external hard drives as part of a general computing environment as described herein) or remotely (e.g., the repository is accessed over a local-area network (e.g., LAN) or wide-area network such as the Internet) to any of the exemplary systems herein. Software system facts can be stored on various other types of computer-readable media (e.g., DVD, CD-ROM, optical or the like). The repository 1300 can comprise multiple repositories. The repository 1300 can be stored in a distributed fashion wherein multiple repositories or parts of a single repository are stored in more than one location. The repository 1300 can be static (e.g., software system facts are identified and extracted once for a software system) or dynamic (e.g., facts are added, removed or modified as additional artifacts are processed or modified, or as intentional concept definitions or cross-artifact relationship definitions are created, removed or modified). The repository can be of any data structure (e.g., linked list, tree, array) or organization (e.g., relational database, deductive database). The knowledge repository 1300 can have a hierarchical arrangement, and comprise additional repositories organized by, for example, the type of software system fact. The concepts and the relationship in the repository are extensible and new concepts or relationships or refinements of existing concepts and relationships can be added or made to the repository over time.

Figure 14:
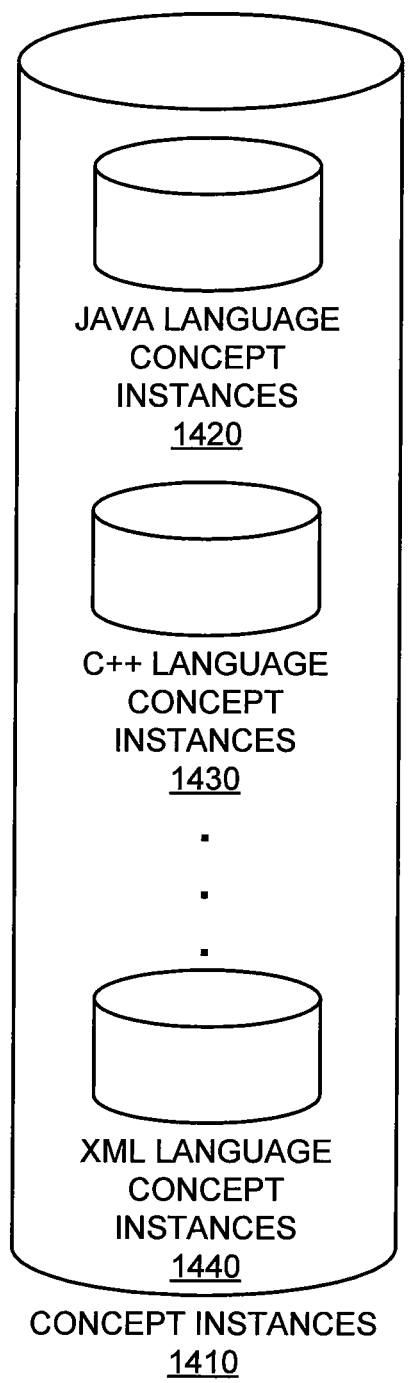
FIG. 14 depicts an exemplary concept instances repository within the exemplary knowledge repository of FIG. 13.

FIG. 14 depicts an exemplary concept instances repository 1410. The concept instance repository 1410 contains concept instances extracted from the formal language artifacts obtained from a software system. The concept instances in the repository 1410 can be organized, for example, in the order that they were extracted from the artifacts or according to formal programming languages. For example, the concept instance repository 1410 comprises a Java concept instances repository 1420, a C++ concept instance repository 1430 and an XML concept instances repository 1440.

Figure 15:
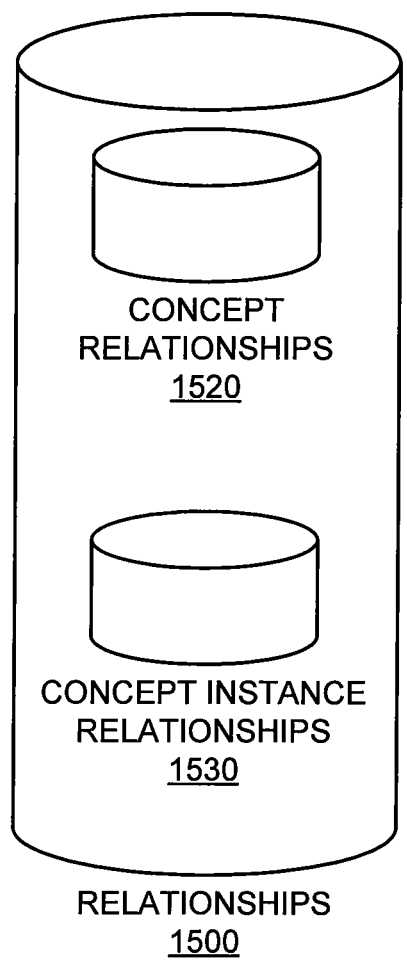
FIG. 15 depicts an exemplary relationships repository within the exemplary knowledge repository of FIG. 13.

A relationships repository can be similarly organized. FIG. 15 depicts an exemplary relationships repository 1500 comprising a concept relationships repository 1520 and a concept instance relationships repository 1530. Relationships relating concepts to concept instances can reside in both the concept and concept instance relationship repositories or in just one of the relationship repositories depending on whether the source or the target term in a relationship is the concept or the concept instance. The concept repository 1500 can have a set of bootstrap concepts to which extracted concepts and intentionally defined concepts are added.

Figure 16:
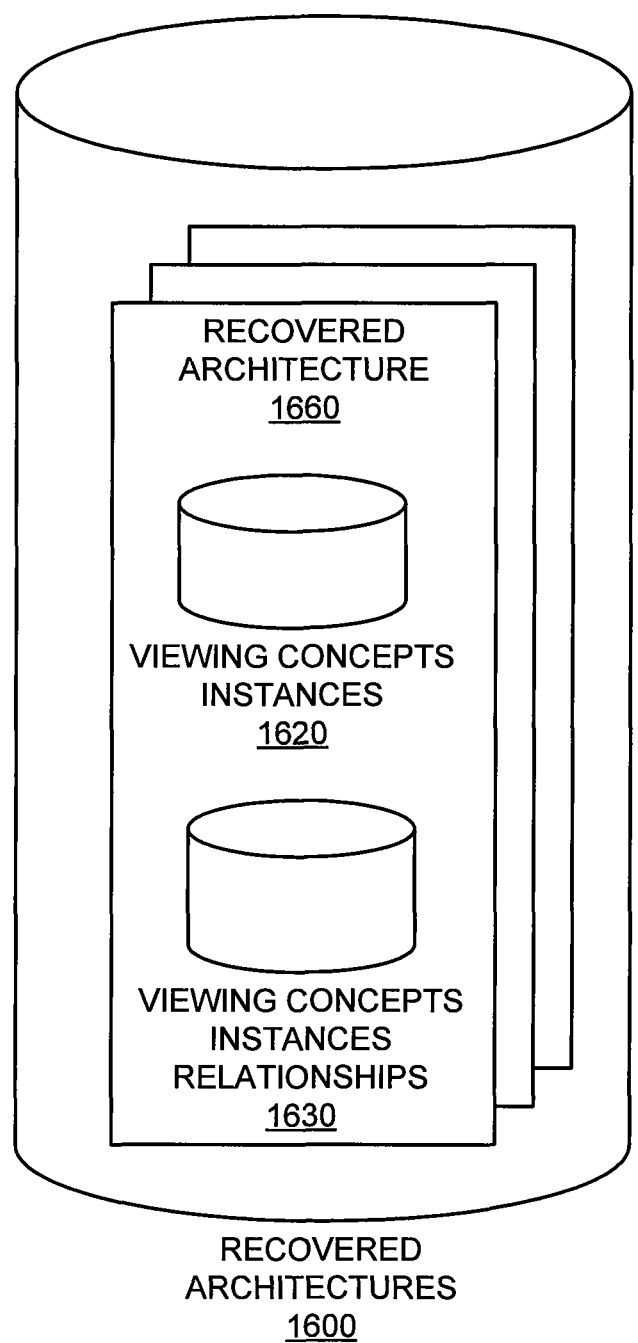
FIG. 16 depicts an exemplary recovered architectures repository within the exemplary knowledge repository of FIG. 13.

FIG. 16 depicts an exemplary recovered architecture repository 1600. The recovered architecture repository 1600 comprises sets of concept instances and sets of concept instances relationships that are to be contained in visualizations of recovered architectures (e.g. viewing concept instances and viewing concept instances relationships). A recovered architecture is associated with one set of viewing concept instances and a related set of viewing concept instances relationships. For example, a recovered architecture 1660 is associated with a set of viewing concept instances 1620 and viewing concept instances relationships 1630.

The knowledge repository can be extended to store any kind of information related to a software system. For example, in addition to storing software system facts a knowledge repository can store XML concepts, use-cases (i.e., to represent units of system behavior or features for specifying and understanding software system requirements), software system services (e.g., independent features that a system can expose data to on a network in a technology-independent manner), test-cases, software change requests, problem reports, hardware and network outages and failures, etc. The kind of information that a knowledge repository can store is limited only by the creativity of the application designer.

Additionally, a knowledge repository can store fact probabilities. Generally, software system facts (e.g., "account" is an instance of a concept "class") stored in a database are "true." That is the probability that the fact exists in the software system is 1.0. Other facts may only be known with a certain degree of accuracy or certainty For example, consider a component "jdbc" of a software system responsible for querying or accessing a database in an API. If a problem has been reported by the data access feature of a system, then there is high probability that the problem is with the "jdbc" component. The fact that the "jdbc" component is the cause of the failure is not known with certainty. The fact that this component is the likely cause for failure can be expressed in a knowledge repository as a valid relationship with an additional "probability" attribute attached to the relationship, e.g., failureCause(dataaccess,jdbc,0.8), where 0.8 is the probability or certainty of the this fact.

EXAMPLE 16

Exemplary Bootstrap Concepts

In any of the examples described herein, the repository comprises a set of bootstrap concepts that are stored in the repository prior to the processing of formal language artifacts or intentional concept definitions. The bootstrap concepts comprise "concept" which is the concept from which all other concepts derive, "artifact," "metamodel concept," "relationship", "domain" and "domain concept." Other bootstrap concepts may be added depending on the specific application. Concepts or relationships in the repository other than the bootstrap concepts are defined based on these bootstrap concepts. For example, a domain concept "account" can be defined by extending the "domain concept" bootstrap concept. Similarly, an artifact type "Java_artifact" can be created by extending the "artifact" bootstrap concept. Instances of metamodel concepts can be treated as concepts themselves. Concept instances can be related to these meta modelconcept instances by a "conforms" relationship.

EXAMPLE 17

Exemplary Repository Schema

In any of the examples described herein, a meta-model of a software system can be partially expressed with a relational database schema that defines how software system concepts definitions (both domain and language concepts), concept instances, relationship types, relationship term role names and specific relationships are to be modeled in a knowledge repository. Relationship database schemas can be defined, for example, by a relational database management system (RDBMS). FIGS. 17-20 depict a schema defined by a relational database management system using SQL as the query language.

The SQL code responsible for creating and interacting with the relational database portion of a knowledge repository can be included in one or more components of the software architecture management system 100 of FIG. 1. Interaction with the relational database can be implemented, for example, as an API (e.g., a C++ library of SQL functions) in the language of one of the components (e.g., fact extractor 120) of the system 100.

EXAMPLE 18

Exemplary Concept Schema

In any of the examples described herein, the schema used to model a software system can model software system concepts with a fixed set of mandatory attributes and an extensible set of optional attributes.

FIG. 17 shows exemplary SQL statements defining a relational database schema for concept definitions, concept relationships and concept attributes. SQL statements 1710 define a table "schema.concept_def" for containing concept definitions. This table contains the fixed set of mandatory attributes for concept definitions, the mandatory attributes comprising a concept identifier (CID), a concept type (CTYPE), indicating whether the concept is domain concept, a language concept, an intentionally defined concept, an attribute concept etc., and a concept name (CNAME). A concept definition may be known by other names, or synonyms, that convey the same meaning as the concept definition name (CNAME). These synonyms are stored in the SYNONYMS parameter as a comma-delimited list of words SQL statements 1720 define a table "schema.reltype_def" which defines relationship types between concepts. Parameters within the "schema.reltype_def" table include the name of the relationship (RNAME) and an identifier of this relationship type (RDEF_ID). SQL statements 1730 define a table "schema.concept_rel" which defines a table for storing the actual relationships between concepts. The "subsumes" relationship type is an example of a relationship between relationships and "JAVA_CLASS subsumes Object_Oriented_Class" is an example of an actual "subsumes" relationship stored in "schema.concept_rel." Thus, the SQL tables "schema.reltype_def" and "schema.concept_rel" are one possible implementation of the concept relationship repository 1520 of FIG. 15. Parameters within the "schema.concept_rel" table representing a concept relationship include a unique concept relationship identifier (ID), a concept relationship name (RDEF_ID, e.g., the ID of the "subsumes" relationship type), and the identifiers of the source and target concepts of the relationship (SRC_CID, TAR_CID).

SQL statements 1740 define a table "schema.reltype_rel" which defines a table for storing the terminological relationships between relationship types. The "subsumes" relationship type is an example of such a relationship and the relationship "calls" subsumes "uses" is an example of an actual subsumes relationship in table "schema.reltype_rel" where 'calls' and 'uses' refer to two relationship types defined in table "schema.reltype_def" 1910. Parameters within the "schema.reltype_rel" table include an identifier of the terminological relationship (ID), the ID of the relationship type between the relationships (RDEF_ID), and the identifiers of the source and target relationships of the terminological relationship (SRC_RTYPEID, TAR_RTYPEID).

Similarly, SQL statements 1750 defines a table "schema.roldef_rel" for storing the terminological "subsumes" relationships between roles associated with a relationship type. Some role relationships are derived from the "subsumes" relationship between their corresponding relationship types. For example if "calls" is a relationship type defined as Calls (caller, callee) where "caller" and "callee" are the two roles of the "calls" relationship type and "uses" is a relationship type defined as Uses(usedBy, uses) and table "schema.roldef_rel" contains a relationship "Calls subumes Uses", then the role "caller" subsumes the role "usedby" and role "caller" subsumes the role "uses." Parameters within the table "schema._reltype_rel" table include an identifier of the relationship between roles (ID), the ID of the relationship type between the roles (RDEF_ID), and the identifiers of the source and target roles of the terminological relationship (SRC_ROLDEID, TAR_ROLEID).

SQL code segments 1800-1850 define tables for containing concept attribute definitions and specific concept attribute values for defined concepts or relationship types. These tables provide extensibility by capturing additional attribute values for a concept instance or a relationship type instance. SQL statements 1800 define a table "schema.attr_def" for storing common attribute definitions. Attribute definition parameters include an attribute definition identifier (ATTR_ID), a data type identifier (DATA_TYPE_ID) and an attribute name (NAME).

SQL statements 1810 defines a table "schema.map_attr_def" which maps defined attributes (ATTR_ID, DATA_TYPE_ID) to either a concept definition (DOMAIN_CID) or a relationship type definition (DOMAIN_RTYPE). Additional parameters include a unique identifier (AID) for the attribute to be mapped (ATTR_ID) to an identified concept (DOMAIN_CID). The ROLE_ID parameter describes the semantics or the meaning of the attribute and the RANGE_CID parameter specifies which concepts (ATTRIBUTE_CONCEPT) are permitted for the role.

SQL statements 1820 define a table "schema.element_attr_value" which associates a previously mapped concept attribute, identified by the AID parameter in the "schema.

map_attr_def" table 1810 to an instance. An instance stored in the table "schema.instance" 1810 is associated with a value (VALUE) from one of the "schema.attr_xxx_value" tables, where XXX is the data type of the attribute value. SQL statements 1830-1850 define tables containing attribute values for character, Boolean and integer data types, respectively. Each value is uniquely identified by a value identifier (VID) that associates this value with an instance in the "schema.instance_attr_value" table 1810.

In any of the examples described herein, the relational database schemas represent one possible set of tables for containing software system facts and information related to software system facts. In alternative schemas, the tables can be defined to have more, fewer, or alternative parameters than those indicated in FIGS. 17-20 and 31A.

EXAMPLE 19

Exemplary Relationship Schema

In any of the examples described herein, the schema used to model a software system represents relationships in terms of relationship types, relationship term roles, role policies and relationship policies.

FIG. 19 shows SQL code of a relational database schema for relationship types, relationship term role names and specific role and relationship policies. Instances of these relationship types are used to describe facts between, for example, concept instances.

SQL statements 1910 define a table "schema.reltype_def" for storing definitions of relationship types. Parameters defining relationship types comprise a relationship type identifier (RTYPE_ID), a relationship type name (RNAME, e.g., "extends," "uses") and the name of an inverse relationship type (INVERSE_RNAME, e.g., "represents" is the inverse relationship type of the "representedBy" relationship type). A Boolean flag (TRANSITIVE) indicates whether the relationship is transitive. If R(a,b) is an instance of a relationship type between instances a and b and R(b,c) is an instance of the same relationship type between instances b and c, then the relationship R is said to be transitive if R'(a,c) is valid. That is, a is transitively related to c and R' is the transitive relationship name (TRANSITIVE_RNAME) of relationship R. Other relationship parameters in the "schema.reltype_def" table 1910 include the arity (e.g., binary, ternary) of the relationship type (ARY), a descriptor of the source and target role names (SOURCE, TARGET, e.g., "caller," "callee"), and flags for symmetric (SYMMETRIC) and cyclic (CYCLIC) relationships. A relationship R is considered to be symmetric if the existence of a relationship R(a,b) implies that the relationship R(b,a) also exists. A relationship R is said to be cyclic if it permits a relationship to be related to itself, or if R(a,a) is valid. A relationship type may be known by other names, or synonyms, that convey the same meaning as the relation name (RNAME). These synonyms are stored in the SYNONYMS parameter as a comma-delimited list of words. The group of words comprising RNAME and SYNONYMS is identified by one RTYPE_ID value, a single semantic relationship type in the repository.

SQL statements 1920 define a table "schema.role_def" for storing ordered lists of relationship term roles. Relationship types are used to relate n terms where n is the arity of the relationship. Relationship term roles are associated with the terms holding a specific slot, or index, in a relationship type. A relationship type instance relates concepts instances where concept instances occupy a term associated with a role name. Parameters in the "schema.role_def" table defining relationship roles comprise a unique role identifier (ROLE_ID), an identifier for the relationship type that the role is associated with (RTYPE_ID), a role name (ROLE_NAME), and the index, or slot, of the relationship term that the role corresponds to (INDEX). For example, the source and target terms for the "uses" relationship type could have roles "usedBy" and "used" which correspond to the source and target terms respectively. The "used" role could be represented as an entry in the "schema.role_def" table with ROLE_ID=100, RTYPE_ID=5 (the identifiers of the "uses" relationship type), ROLE_NAME="used" and INDEX=0, the position of the source term in the list of terms of the "uses" relationship type. In one embodiment, the role at index 0 is the source role and the role at index 1 is the target role for a relationship type.

As described, a role is a name attached to a term holding a specified slot, or index, in the relationship type. A relationship is an instance of a relationship type relating concept instances. The concept instances that are permitted to occupy a specific role of a relationship type can be defined by a set of rules known as role policies and relationship policies. These constraints can be defined in the "schema.relation_policy" table 1930 and the "schema.role_policy" table 1940. The parameters defining a role policy in table 1940 include a unique role policy identifier for a (POLICY_ID), a role identifier (ROLE_ID) and the relationship identifier (RTYPE_ID) for which the role policy is defined. These three parameters relate to roles defined in "schema.role_def" table 1940. Additional parameters PERMITTED_CID or BANNED_CID specify the concept identifier of a concept defined in "schema.concept_def" table 1710. A value of '0' for PERMITTED_CID indicates that any concept is permitted. A value of '0' for BANNED_CID indicates that all concepts are banned. The PERMITTED_CID and the BANNED_CID entries cannot both have a CID associated with them. Only one of these two parameters can have a value other than a default value (e.g., "−1"). The parameter PERMITTED_CID indicates that the concept instance associated with the specified CID is allowed to be used for specified role and the BANNED_CID parameter indicates that the concept instance associated with the specific CID is not permitted, any other concept is permitted for this role. The PERMITTED_CID) and BANNED_CID parameters can take on a list of numbers or a single number.

For example, consider a concept repository containing concepts "Java_Package," "Java_Class" and "Java_Method" and relationship types "Calls" and "MemberOf." The roles for the "Calls" relationship type can be defined as Calls (caller, callee) and the roles for the "memberOf" relationship type can be defined as memberOf(parentElement, childElement). A role policy for the "caller" role of the "calls" relationship type can specify that only instances of the concept "Java_Method" are allowed to be used for the "caller" role. Similarly, a role policy for the "callee" role can specify that only instances of the concept "Java_Method" are allowed to be used for the "callee" role. Further, the role policy for the "parentElement" role can specify that instances of the concepts "Java_Package" or "Java_Class" are permitted while the policy for the "childElement" role permits instances of "Java_Class" or "Java_Method." A relationship policy can permit further refinement of a role policy for a given relationship type. For example, a relationship policy can require that if, for example, the "parentElement" role of the "memberOf" relationship type is filled with an instance of "Java_Package," then the "childElement" role must be an instance of the "Java_Class" concept. Thus, relationship policies can be considered to be "IF/THEN" rules, expressed over role policies.

The CARDINALITY and OPERATOR parameters of table "schema.role_policy" 1940 can specify additional role restrictions. The CARDINALITY and OPERATOR parameters of a role policy specify the number of distinct instances that can fill a certain role when the source role is filled with a particular instance. Thus, role cardinalities are expressed with reference to source roles that always have a cardinality of 1. For example if "caller" is the source role and "callee" is the target role for a "calls" relationship type, then the cardinality for the "caller" role policy will be '1' and the cardinality of the 'callee' role can be any of the following.

| OPERTAOR | CARDINALITY | NUMBER OF DISTINCT INSTANCES FOR ROLE |
|---|---|---|
| GT | n | greater than n |
| GTE | n | greater than or equal to n |
| LT | n | less than n |
| LTE | n | less than or equal to n |
| EQ | n | n |

For example, if OPERATOR=GT and CARDINALITY=3, then the specified role of the specified relationship can take on three or more distinct instances.

EXAMPLE 20

Exemplary Concept Instance Schema

In any of the examples described herein, the schema used to model a software system can model concept instances. Concept instances are also known as individuals or elements. Instances in the concept instance repository are associated with at least one concept. For example, the concept instance schema can contain a set of definitions for concept instances of C++ language concepts (class, method, package) and a set of definitions for concept instances of Java concepts (package, class, method, field). The instance schema is extensible in that as concepts are added to the concept schema their instances can be added to the concept instance repository.

FIG. 20 shows SQL statements 2010 defining a table "schema.element" for containing concept instances. Elements, or instances, in the schema are defined by parameters comprising an element identifier (EID), the corresponding concept identifier for this element (CID) from the "schema.concept_def" table 1710, the concept instance name (NAME, e.g., "account") and the fully qualified name of the class (QNAME, e.g., "com.bank.account"). A parent element of an element is represented by the name and identifiers of the parent element and the parent concept (PARENT_NAME, PARENT_ID, PARENT_CID). Additional parameters indicate the formal language that the artifact is written in (LANG_CODE), the location of the artifact containing the concept instance (FILE_ID) and the location of the element within the artifact (LINE_NO, OFFSET).

SQL statements 2020 define a table "schema.relation" for containing instances of relationships within a knowledge base. The instance relationships model the knowledge contained in the various artifacts within a software system. The set of parameters representing an individual relationship comprise a relationship instance identifier (RIID), the identifier of the relationship type the relationship represents (RTYPE_ID), the source role identifier (SRC_ROLE_ID) and the target role identifier (TAR_ROLE_ID), as defined in table "schema.role_def" 1920 the source element or source concept instance parameters (SRC_EID, SRC_CID, SRC_NAME, SRC_QNAME) and the target element or concept instance parameters (TAR_EID, TAR_CID, TAR_NAME, TAR_QNAME). The "schema.relation" table 2020 contains information about only the source and target roles for binary relationships.

If the relationship type has an arity greater than 2, (e.g., ternary, quaternary), then information for the remaining roles for the relationship are stored in the auxiliary table "schema.aux_relation" 2030. Thus, n-ary relationships are stored as one binary relationship in table "schema.Relation" 2020 and n−2 relationships in table "schema.aux_relation" 2030. Entries in the two tables are correlated by the CORREL_ID parameter in the "schema.aux_relation" and "schema.relation" tables 2030 and 2020. The relationship instance identifier (RIID) from the "schema.relation" table 2020 is copied to the CORREL_ID parameter in the "schema.aux_relation" table 2030 to associate the auxiliary roles (those roles beyond the source and target roles in a binary relationship) with the corresponding source and target roles in the "schema.relation" table 2020. The "schema.aux_relation" table 2030 stores unary relationships and the parameters that describe the additional roles in a relationship comprise a unique auxiliary relationship identifier (RoID), the CORREL_ID, the relationship type (RTYPE_ID) and the role (ROLE_ID) to which this relationship is associated, the element or concept instance that fills the role described by element identifier (EID), the concept identifier (CID) and the NAME and QNAME of the concept instance from the "schema.element" table 2010.

Thus, the co-relationship parameter (CORREL_ID) is a mechanism for identifying correlated table entries (i.e., relationships) of data as one unit (i.e., fact) of information. A co-relationship identifier is used to associate one primary binary with n−2 secondary unary relationships that together constitute a relationship of arity n. The additional role names associated with n-ary relationships with n>2 (e.g., the third role "arguments" in ternary relationships "calls_3" 1130) are represented as entries in the "schema.role_def" table 1920.

The co-relationship identifier is also used to identify terms in a relationship that are multi-valued, or when multiple elements may occupy the same role term of a relationship instance. For example, an instance 1151 of the "call_3" relationship type in FIG. 11 and with relationship ID of 103 (RID=103) has element I3 (EID=I3) in the "caller" role 1158, element I6 (EID=I6) in the "callee" role 1159 and two elements (EID=I8 and EID=I9) in the "arguments" role 1160 and 1161. Thus, the "arguments" role for relationship instance 103 is multi-valued and is represented by two separate entries in "schema.aux_relatio" table 2030.

FIG. 21 shows entries in the relational database tables defined by the SQL statements shown in FIGS. 17-20 that model the "represents" relationship type. The "represents" relationship type can be generally expressed in the form "represents(model{concept instance}, concept{domain concept})," where "model" and "concept" are term role names and "concept instance" and "domain concept" represent permissible concept instances and concepts that can be used as the terms of the "represents" relationship type. Table entry 2110 models the "represents" relationship type as a binary relationship (ARY=2) with the name "represents," source and target term names "concept instance" and "domain concept," a relationship type ID of 100 and having corresponding inverse relationship type "representedBy."

Table entry 2120 represents the "model" term role as the role for the source term of the "represents" relationship type 2110. The "model" term role is represented by setting the term role name to "model," setting the relationship type ID to that of the "represents" relationship type (RTYPE_ID=100) and tying the role to the first term of the "represents" relationship type (INDEX=0). Similarly, table entry 2130 models the "modeled_domain concept" term role as the role for the target term of the "represents" relationship type.

Table entries 2150 and 2160 represent policies for the "model" and "modeled_domain concept" roles. The concept IDs of the concepts that are permitted to occupy the respective roles are listed in the PERMITTED_ID field and the role is defined by two unique instances, as specified by the OPERATOR (GT) and CARDINALITY (2) parameters.

EXAMPLE 21

Exemplary Relational Database Population

Figure 22:
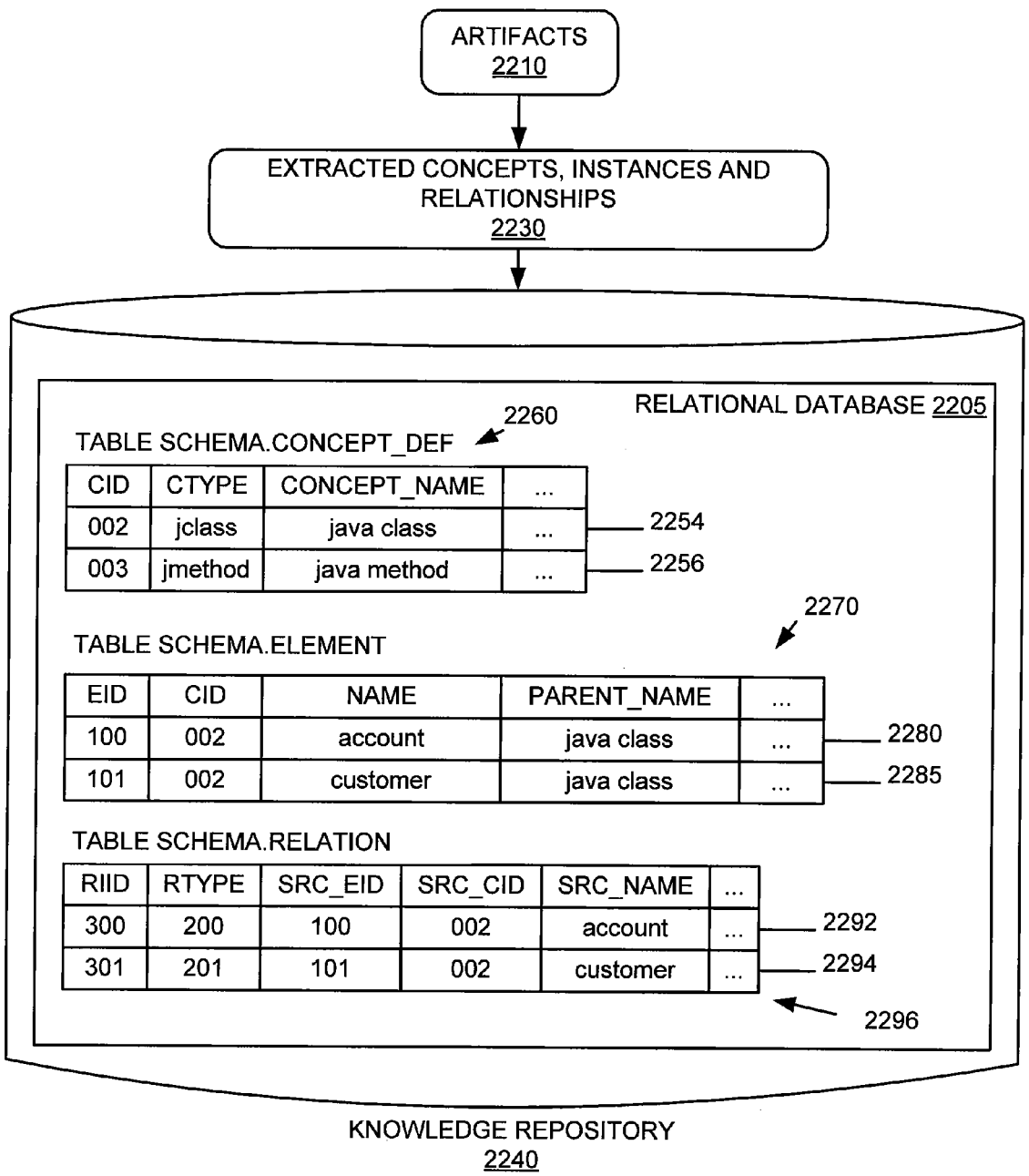
FIG. 22 is a block diagram of an exemplary population of a relational database defined by the schema of FIGS. 17-19.

FIG. 22 depicts an exemplary population of a relational database portion 2205 of a knowledge repository 2240 with software concepts, concept instances and relationships 2230 extracted from formal language artifacts 2210. Concept definition table 2260 "schema.concept_def" contains concept definitions 2254 and 2256 defining Java language concepts "Java class" and "Java method." Concept instance table 2270 "schema.element" contains concept instances "account" 2280 and "customer" 2285. These instances are indicated as instances of the concept "java_class" by setting the concept ID parameter equal to the "java_class" concept ID (CID=002).

Relationship table 2296 "schema.relation" contains "uses" relationships 2292, and 2294 associated with Java class concept instances "account" and "customer," respectively. Relationship 2292 relates the instance "account" (SRC_ID=100) of Java language concept "class" (SRC_CID=002) by a relationship type having RTYPE_ID=200 (e.g., "field use," "calls," "uses") to a target concept instance (not shown). Similarly, relationship 2294 relates the instance "customer" (SRC_ID=101) of Java language concept "class" (SRC CID=002) by a relationship type having RTYPE_ID=201 (e.g., "field use," "calls," "uses") to a target concept instance (not shown). The relationships 2292 and 2294 are different relationship types because of their different RTYPE_ID values.

EXAMPLE 22

Exemplary System for Defining Cross-Artifact Relationships

Figure 23:
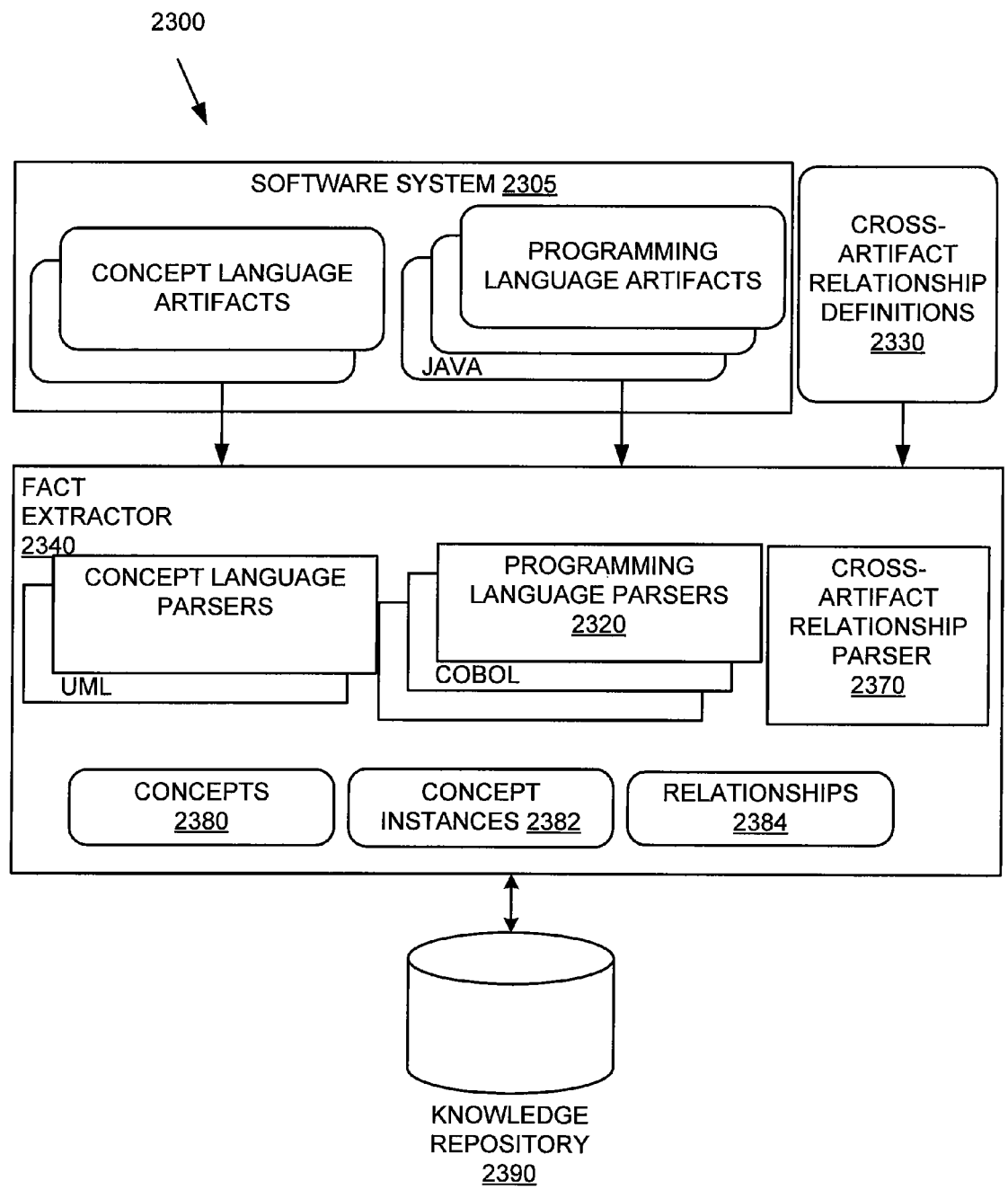
FIG. 23 is a block diagram of an exemplary system for defining cross-artifact relationships between concept instances in a software system.

FIG. 23 is a block diagram of an exemplary system 2300 for defining cross-artifact relationships between concept instances in a software system. Cross-artifact relationship definitions 2330 are provided to a fact extractor 2340 and processed by a cross-artifact relationship parser 2370. The cross-artifact relationship parser 2370 interprets cross-artifact relationship definitions 2330 and identifies cross-artifact relationships between concepts and/or concept instances based on the cross-artifact relationship definitions 2330. Both the cross-artifact relationship definitions and the cross-artifact relationships are stored in the repository 2390. The cross-artifact relationships can be stored as relationships 2384 or otherwise (e.g., as a separate repository within the knowledge repository, as dedicated tables within a relational database portion of a knowledge repository that contains cross-artifact relationships).

EXAMPLE 23

Exemplary Method of Defining Cross-Artifact Relationships

Figure 24:
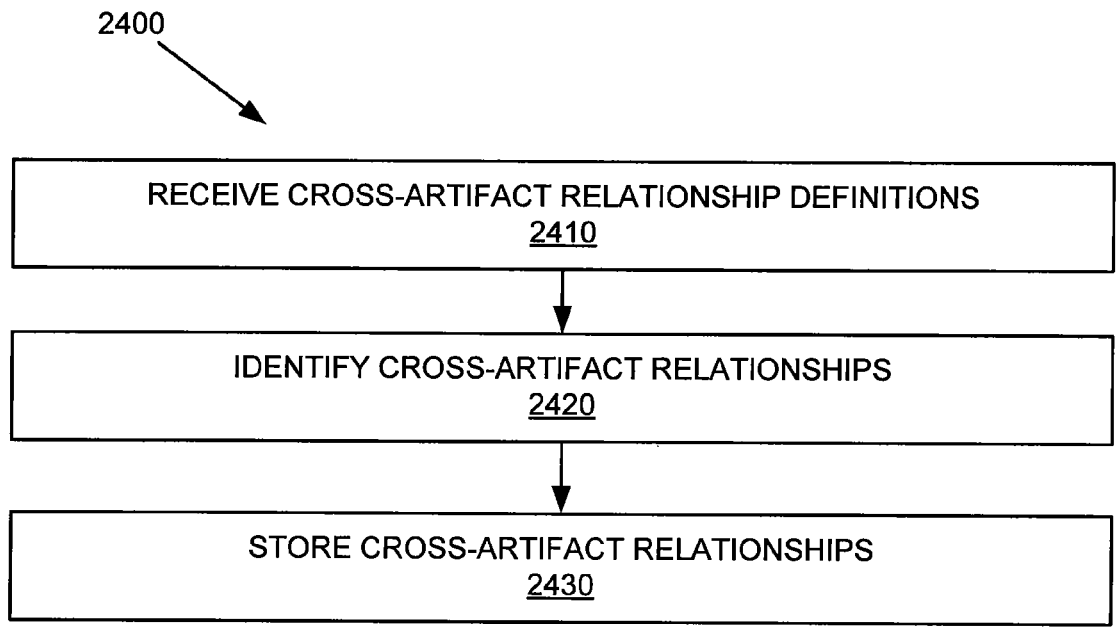
FIG. 24 is a block diagram of an exemplary method of defining cross-artifact relationships between concept instances in a software system.

FIG. 24 is a block diagram of an exemplary method 2400 for defining cross-artifact relationships between concepts and/or concept instances in a software system.

At 2410, cross-artifact relationship definitions are received. As described herein, the cross-artifact relationship definitions can be expressed by Link Definition Language statements. Alternatively, the cross-artifact relationship definitions can be supplied in an alternative format.

At 2420, cross-artifact relationships between concept instances and/or concepts extracted from different artifacts are identified, based on the cross-artifact relationship definitions. A cross-artifact relationship parser is used to interpret the cross-artifact relationship definitions. For example, a Link Processor as described herein interprets cross-artifact relationship definitions written in the Link Definition Language. The cross-artifact relationship parser queries a knowledge repository for concepts and/or concepts instances that satisfy the cross-artifact relationship definitions. Cross-artifact relationships are expressed in terms comprising a cross-artifact relationship type, concept instances and/or concepts.

At 2430, the cross-artifact relationships are stored in a repository. The cross-artifact relationships can be stored as entries in existing tables in a relational database portion of a knowledge repository, or dedicated tables containing cross-artifact relationships. A relational database management system (e.g., SQL statements) defining dedicated cross-artifact relationship tables could be contained in the cross-artifact relationship parser or in any other component of a general computing environment as described herein executing the method 2400.

EXAMPLE 24

Exemplary Link Definition Language

In any of the examples herein, intentionally defined concepts and cross-artifact relationships can be expressed using a Link Definition language (LDL). LDL is a specific language defined by means of a XML scheme restriction above the XML language and provides for extending a knowledge repository beyond the concepts and relationships that can be extracted by formal language parsers from formal language artifacts. LDL provides knowledge repository extensibility by refining concept or relationship types already existing in the repository or by defining new concepts or relationships to be added to the repository.

EXAMPLE 25

Exemplary Intentional Concepts

In any of the examples described herein, software system concepts can comprise intentionally defined concepts (i.e., intentional concepts). Intentional concepts comprise domain concepts, design abstractions, concepts extracted from formal concept languages artifacts and language concepts defined by formal programming languages. For example, intentional concepts can be domain concepts (e.g., account, customer, patient). Instances of these intentional concepts are stored as facts in the knowledge repository using, for example, the "instance" (e.g., "instanceOf") relationship or the "represented By" relationship.

Intentional concepts further include concepts built from compositions of existing concepts and relationship types to build higher levels of concept abstractions or to introduce concepts that are refinements (e.g., sub-concepts) of existing concepts. For example, an intentional concept can be created by the PredQL expression "ThreadStarter(x):=class(?x) & defines(?x, ?y) & calls(?y, ?z) & method(?z) & nameOf(?z, "java.sun.thread.run( )")." This expression defines an intentional concept called "ThreadStarter" that is built from the existing Java language concepts "class" and "method," existing relationships "defines" and "calls" and a built-in LDL predicate "nameOf" and can be described as follows. Concept names act as unary predicates in the Link Definition Language. Thus, the expressions "class(?x)" and "method(?z)" query a knowledge repository for instances of the Java language concepts "class" and "method" respectively. The expression "defines(?x, ?y)" queries the knowledge repository for concept instances "y" defined within Java classes (i.e., "x" is constrained to instances of Java classes by the "class(?x)" predicate). The expression "calls(?y, ?z)" queries the repository for concept instances "z" called by concept instances "y" that are defined by a Java class instance (i.e., "y" is constrained by the "defines(?x, ?y) predicate). The "nameOf" predicate further narrows the query to instances of Java methods having the qualified name "java.sun.Thread.run( )." Thus, the PredQL expression as a whole queries the knowledge repository to find concept instances that call instances of Java methods named "java.sun.Thread.run( )" and are defined by Java class instances. The returned concept instances are constituent, or member, concept instances of the newly defined intentional concept "ThreadStarter."

Another example of an intentional design abstraction expressed in PredQL is

EJBClass(x): class(?x) & extends+("javax.ejb.SessionBean") where the design abstraction concept "EJBClass" is defined as those concept instances that are instances of the 'Class' concept and that transitively extend the Class called "javax.ejb.SessionBean". Here, "extends+" stands for the transitive form of the 'extends' relationship. That is, if extends(A,B) and extends(B,C) are two relationships of a software system, then the notation extends+(A,C) expresses that A transitively extends C.

As mentioned above, intentional concepts can be defined in terms of other intentionally defined concepts. For example, the above expression could be modified to add the constraint that the Java class concept instances also be intentional instances of the defined concept "account." This additional constraint could be added to the above expression by adding the clause "& account(?x)."

The "nameOf" predicate allows for querying the knowledge repository by either the name (e.g., "run") or qualified name (e.g., "java.sun.Thread.run") of a concept instance. The PredQL Language further allows the use of regular expressions and wildcards (e.g., "?", "*") in PredQL named expressions, allowing for flexibility in defining intentionally defined concepts and cross-artifact relationships.

EXAMPLE 26

Exemplary Cross-Artifact Relationships for Integrating Stakeholder Vocabularies

In any of the examples described herein, various stakeholders in a software project include executive sponsors of the project (e.g., CIO), business managers, IT managers, project managers, architects, developers and end-users. These classes of enterprise system stakeholders have distinct concepts and relationship vocabularies with a shared understanding of meaning. These informal stakeholder vocabularies are formally expressed as ontologies using a set of concepts and relations in the knowledge repositories described herein. These multiple ontologies are then bridged by relationship types that link concepts in one ontology with concepts in another ontology.

For example, business users and analysts describe software systems in terms of system-users interactions called "usecases" while developers describe the system in terms of programming language concepts (e.g., "class" and "method"). The "realized by" subtype relationship that extends the "representational variant" relationship is defined to bridge the business user ontology to the developer ontology. The "realized by" relationship sub-type can be defined in the case of modeling use cases with the expression "realizedBy(realizedUseCase(UseCase), useCaseMethod(Method))," where "realizedUseCase" and "useCaseMethod" are the defined role terms for the "realized by" relationship. For example, a "useCase" instance "makepayment" can be linked to an instance "executePayment" instance of the programming language concept "method" by the following facts:

instanceOf("makePayment", "useCase")
  instanceOf("executePayment" "method")
  realizedBy("makePayment","executePayment")

Figure 25:
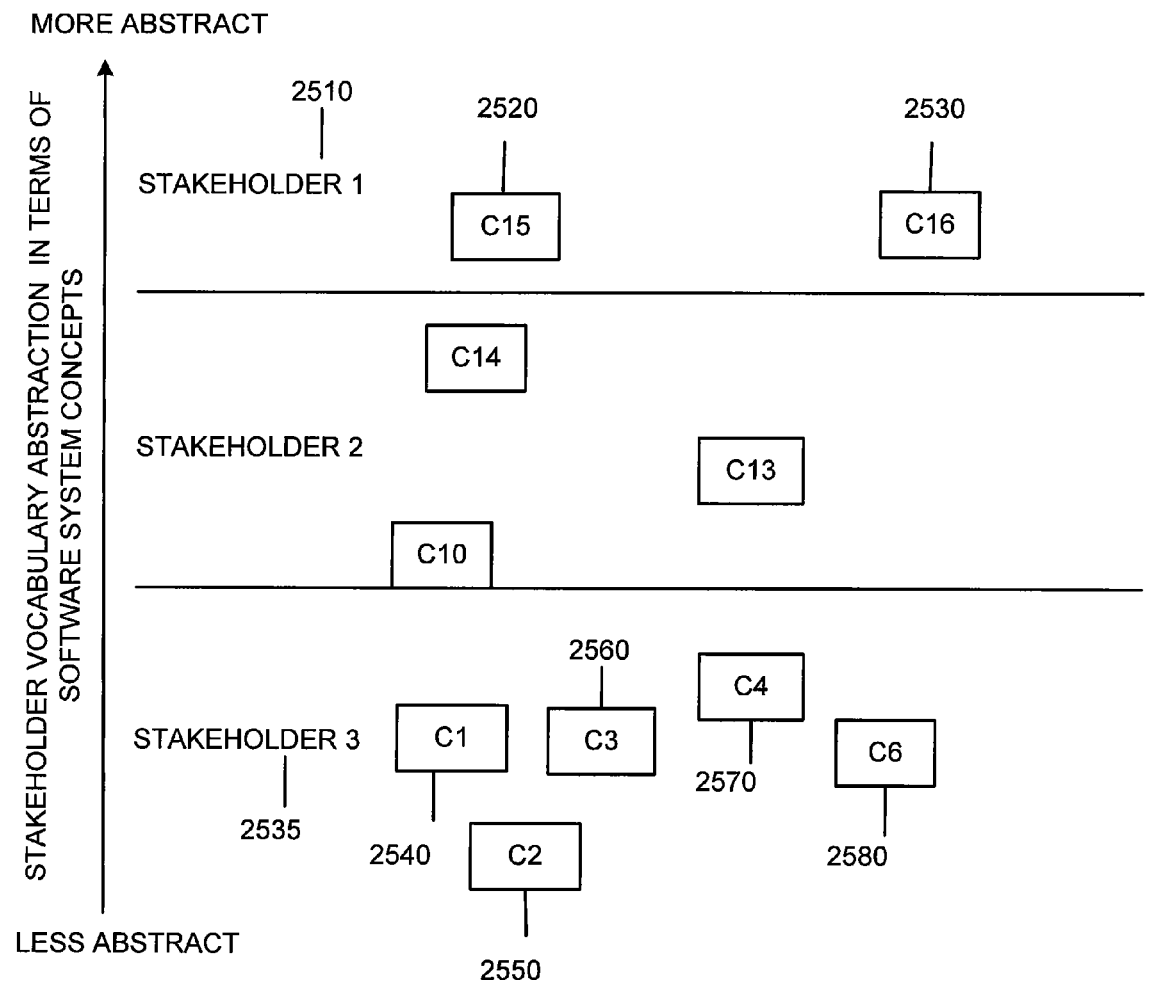
FIG. 25 is a chart depicting an exemplary distribution of software system concepts according to level of abstraction.

Concepts and relations can thus be defined to accommodate the vocabularies of various stakeholders in a software system, allowing for different levels of abstraction to be captured within a knowledge repository. FIG. 25 is a chart depicting a distribution of software system concepts according to level of abstraction. For example, a stakeholder 2510 who is concerned about global aspects or concerns of a software system (e.g., business manager, software architect, software system program manager) can consider the software system in terms of higher levels of abstraction. Thus, the vocabulary of stakeholder 2510 regarding the software system could include concepts 2520 and 2530. Similarly, a stakeholder 2535 who works with the software system at a more detailed level (e.g., software programmer) may consider the software system in terms of lower-level abstraction concepts 2540, 2550, 2560, 2570 and 2580.

EXAMPLE 27

Exemplary Cross-Artifact Relationships for Modeling Semantic References

In any of the examples described herein, cross-artifact relationships are used to formally model relationships between concept instances extracted from different artifacts. The different artifacts can be written in the same formal language or in different formal languages. For example, a C++ class instance named "account" extracted from artifact A and a C++ class instance named "customer" extracted from artifact B have a relationship if, for example, instance "account" refers to instance "customer." The same relationship would exist between the two classes if they were contained in the same artifact, but if a system or method described herein for extracting relationships from a set of formal language artifacts is not capable of identifying relationships between artifacts (e.g., programming language parsers 2340 of FIG. 23 are not capable of identifying relationships between concept instances extracted from multiple artifacts), then cross-artifact relationships can be modeled intentionally by a user or discovered by applying a learning algorithm on existing artifacts within a software system. In either case, the Link Definition Language can be used to represent the cross-artifact relations.

Figure 26:
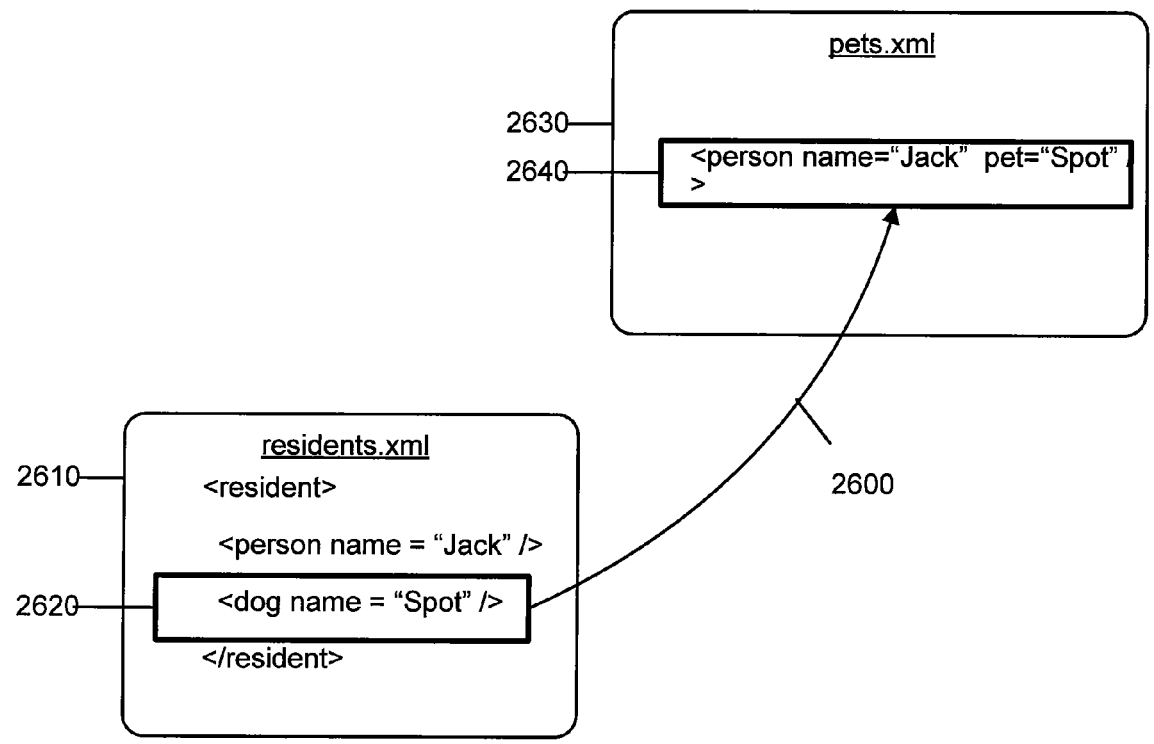
FIG. 26 shows an exemplary define-use cross-artifact relationship.

Cross-artifact semantic references relationships can be used to relate concept instances extracted from different artifacts when one concept instance refers to one or more attributes of another concept instance or when an attribute of one or more concepts share the same value space. For example, cross-artifact relationships can model a define-use relationship between concept instances extracted from different artifacts. FIG. 26 shows an exemplary define-use relationship between XML concept instances in XML artifacts 2630 and 2610. A pet having the name "Spot" is defined by statement 2620 in artifact 2610 and is used in statement 2640 in artifact 2630. Cross-artifact relationship 2600 represents this define-use relationship between these two artifacts. Such semantic references can exist between concept instances in multiple artifacts written in different languages.

The cross-artifact relationship definitions 2330 shown in FIG. 23 can be expressed using the Link Definition Language (LDL) as described herein, or in another format. The cross-artifact relationship parser 2370 can comprise a Link Processor capable of processing cross-artifact relationship definitions written in LDL.

EXAMPLE 28

Exemplary Cross-Artifact Relationships for Modeling Semantic Scatter

In any of the examples described herein, cross-artifact relationships can address the problem of semantic scattering (concept scattering) whereby a domain concept is represented in multiple artifacts written in the same or different formal languages, by associating multiple concept instances extracted from the multiple artifacts with one domain concept. For example, if an instance "ClassAccount" of the Java language concept "class" is extracted from a Java artifact and an instance "TblAccount" of the SQL language concept "rdbms_table" is extracted from an SQL artifact, and instances "account" and "rdbms_table" are both representations of "DomainConcept" (i.e., a domain concept) called "account," then concept instances "account" and "tbl_account" are semantically related. That is, they both represent the same concept, the domain concept "account". The "represents" relationship (or its inverse relationship "representedBy") is used to express such relationships between a domain concept and a representation of that domain concept in some language. The "representedBy" relationship is defined by the expression representedBy(ModeledDomainConcept, Model[ ]) where "ModeledDomainConcept" and "Model" are role names for the "represented" relationship. The "[ ]" after Model role name indicates that it is multiply valued. That is, a single domain concept could be modeled by multiple representations in many languages. The example described above is now represented using the following relationships:

instanceOf(ClassAccount,Class)
    instanceOf(Account,DomainConcept)
    instanceOf(TblAccount,RDBMSTable)
    representedBy(Account,TblAccount)
    representedBy(Account,ClassAccount)

The relationship type "representationalVariantOf" is used to express the representational variance between model representations of a given domain concept. A "representationalVariantOf" relationship is a ternary relationship expressed as "representationalVariantOf (sourceRepresentation(Model), targetRepresentation(Model), LanguageMapping(Mapping)). Thus, the relationship "representationalVariantOf (Account, {ClassAccount,TblAccount})" describes the modeling of the domain concept "Account" by the models "ClassAcount" and "TblAccount" in the above example.

Figure 27:
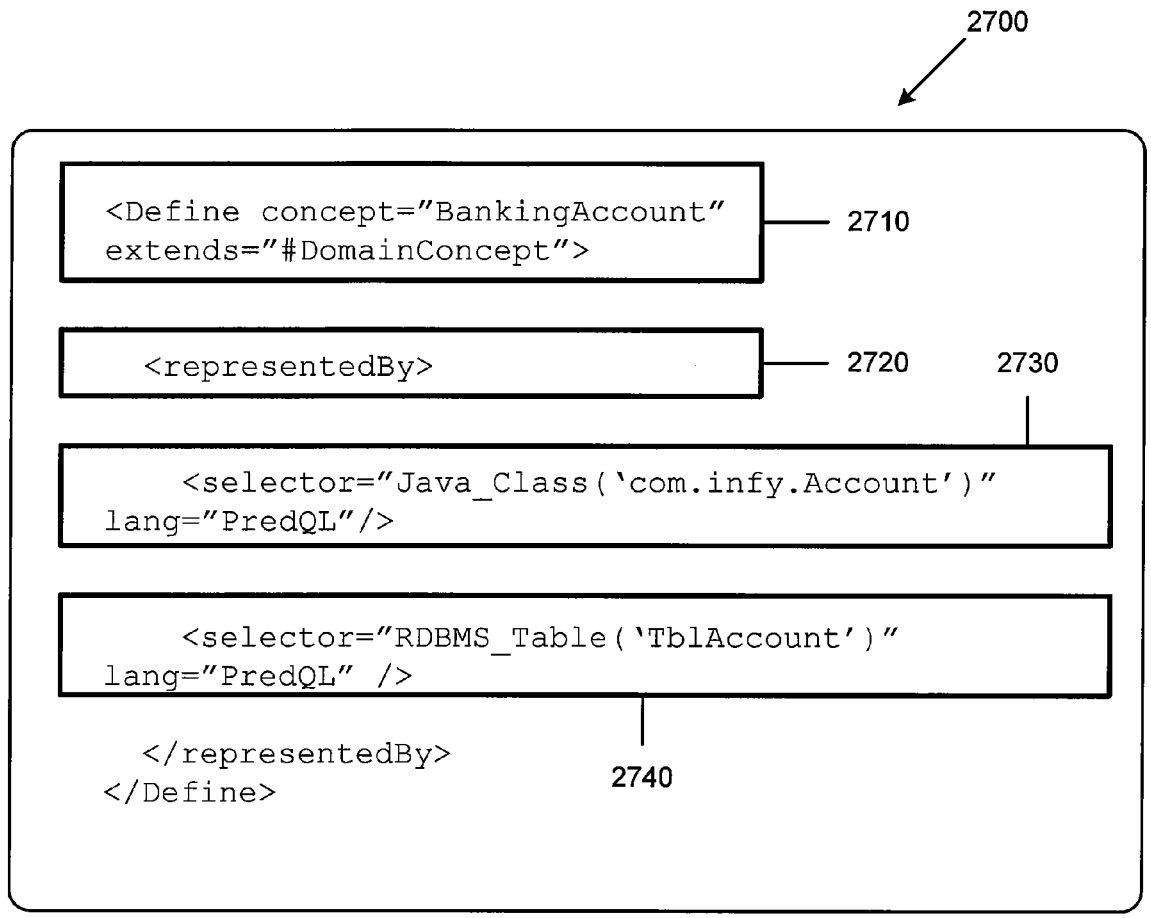
FIG. 27 shows exemplary Link Definitional Language statements linking two concept instances extracted from artifacts written in different languages to a single domain concept.

FIG. 27 depicts the cross-artifact relationship between the "account" and "tbl_account" concepts from the example above, expressed in Link Definition Language (LDL) statements 2700. LDL statement 2710 defines a concept "BankingAccount" as an extended sub-concept of the concept "DomainConcept," a bootstrap concept that is a parent concept to all domain concepts. LDL statement 2720 specifies the relationship type (e.g., "representedBy") of the cross-artifact relationship. LDL concept selector statements 2730 and 2740 specify the concept instances that are to be related to the specified concept by the specified relationship type. For example, concept selector statements 2730 and 2740 specify that concept "BankingAccount" is to be related to an instance 'com.infy.account' of concept 'java_class' and an instance 'tbl_account' of concept "rdms_table" by a "representedBy" relationship. The "lang=PredQL" term of the concept selector statements indicates that the query language PredQL is to be used to query the knowledge repository for the selected concept instances. Thus, a cross-artifact relationship, or semantic link, between 'com.infy.account' and 'tbl_account,' two concept instances written in two different languages, is modeled by intentionally relating them to the "BankingAccount" domain concept with a "representedBy" relationship using LDL statements. In this example, the "representedBy" relationship type is assumed to have already been defined in the knowledge repository.

EXAMPLE 29

Exemplary Link Definition Language Concept Selector Statements

In any of the examples described herein employing the Link Definition Language, concept selector statements are used to select a concept or concept instances from a knowledge repository. This is an effective mechanism for specifying and interpreting intentional concept expressions that are derivatives of existing concepts and relations. For example, with reference to FIG. 27, a selector expression statement 2730 queries a knowledge repository for instances of the language concept "Java_Class" having the name "com.infy.account." The "lang=PredQL" term of the statement specifies that PredQL is to be used as the query language. PredQL is a logic based query language as described herein.

The concept selector statements are able to handle various query languages. XPath, the World Wide Web Consortium (W3C) language for addressing parts of an XML file, is a query language that can be used for querying XML artifacts. SQL is a query language that can be used for querying relational database management systems (RDBMS) artifacts. PredQL is a query language that can be used for searching the knowledge repository for concept instances. The Link Definition Language can be extended to integrate additional query languages.

EXAMPLE 30

Figure 28:
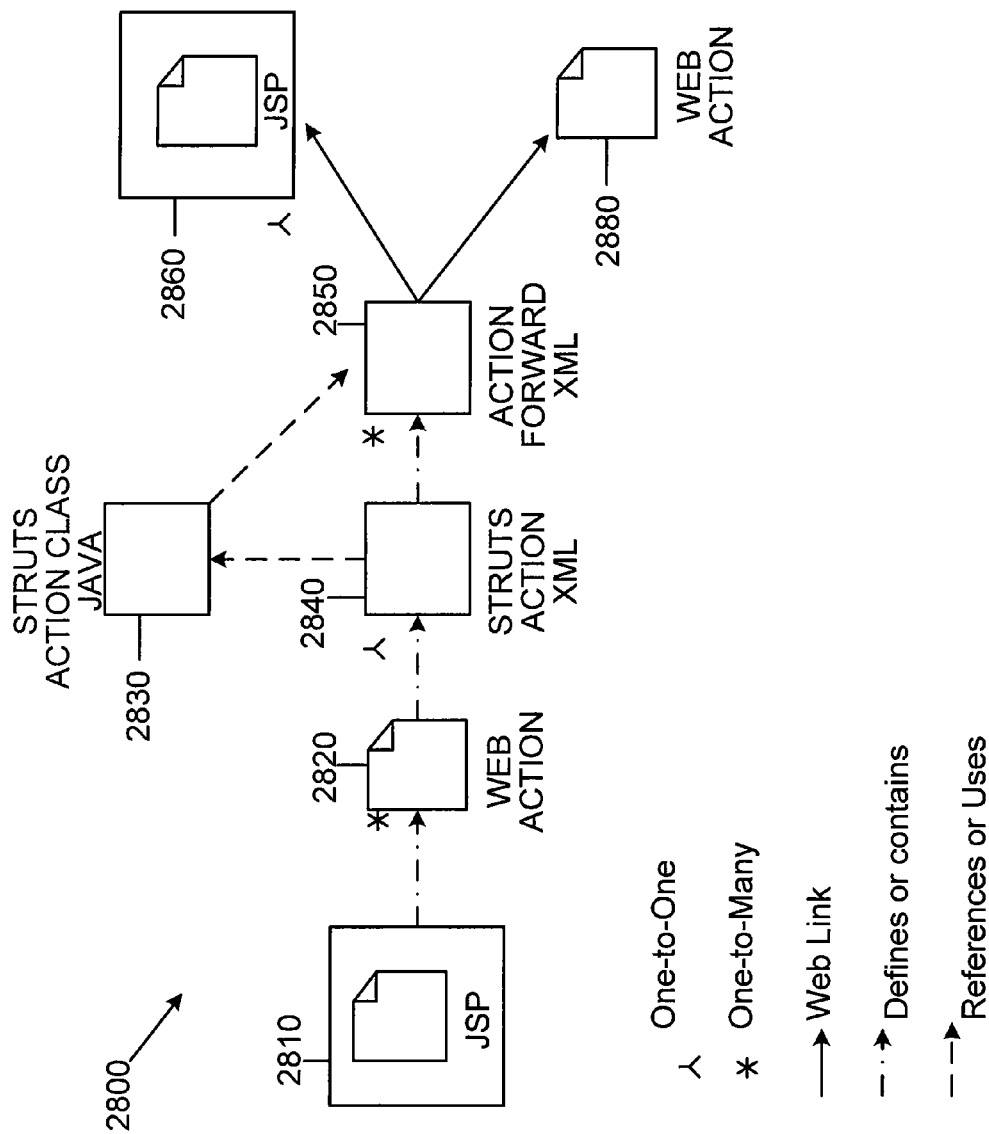
FIG. 28 is an exemplary conceptual model of the open-source Struts framework for writing Java web applications.

Exemplary Cross-Artifact References for Modeling the Struts Web Application Framework FIG. 28 is a conceptual model 2800 of the open-source Struts framework (offered by The Apache Software Foundation) for developing web applications. In the Struts framework, a JSP (JavaServer Page) file 2810, can define one or more actions of a web application (e.g., validate a username) 2820. A Struts Action instance 2840 is associated with a web application action 2820 and a Struts Action instance 2840 can re-direct flow to one or more Struts Action Forward instances 2850 when executed. A Struts Action Forward instance includes a path attribute that indicates where the result generated by a web action request is to be forwarded. The Struts Action Forward path attribute can be, for example, the URL of another web action (e.g., JSP file 2860) or indicate the location of another Struts Action 2880. Struts Action and Struts Action Forward instances are written in XML. A Struts Action Forward element 2850 can be used by Struts XML instances 2830 within Java artifacts to direct the flow of a web application. Thus, a Struts Action Forward element 2850 contained in an XML artifact can both reference other Struts elements contained in XML artifacts 2880 and be referenced by Struts instances 2830 contained in Java artifacts.

FIG. 29 shows Link Definition Language (LDL) statements modeling the Struts Action concept of FIG. 28. LDL statement 2910 defines a "StrutsAction" concept as an extension of the "Java_Class" concept and associates ancestors (indicated by the "subTypeOf+" keyword) of concept instances having the name 'org.struts.Action' with the newly created "StrutsAction" concept. LDL statements 2920 define a "StrutsConfig" concept as extending the "XMLArtifact" concept and a "ActionXML" concept as extending the "XMLElement" concept, the "ActionXML" concept being defined as part of the "StrutsConfig" concept by the LDL "<Has>" tag. LDL statements 2930 link the "StrutsConfig" concept attribute "type" to the "qname" attribute of the "StrutsAction" concept. Similarly, LDL statements 2940. link "StrutsConfig" attribute "path" to the "path" attribute of the "StrutsAction" concept.

Figure 30:
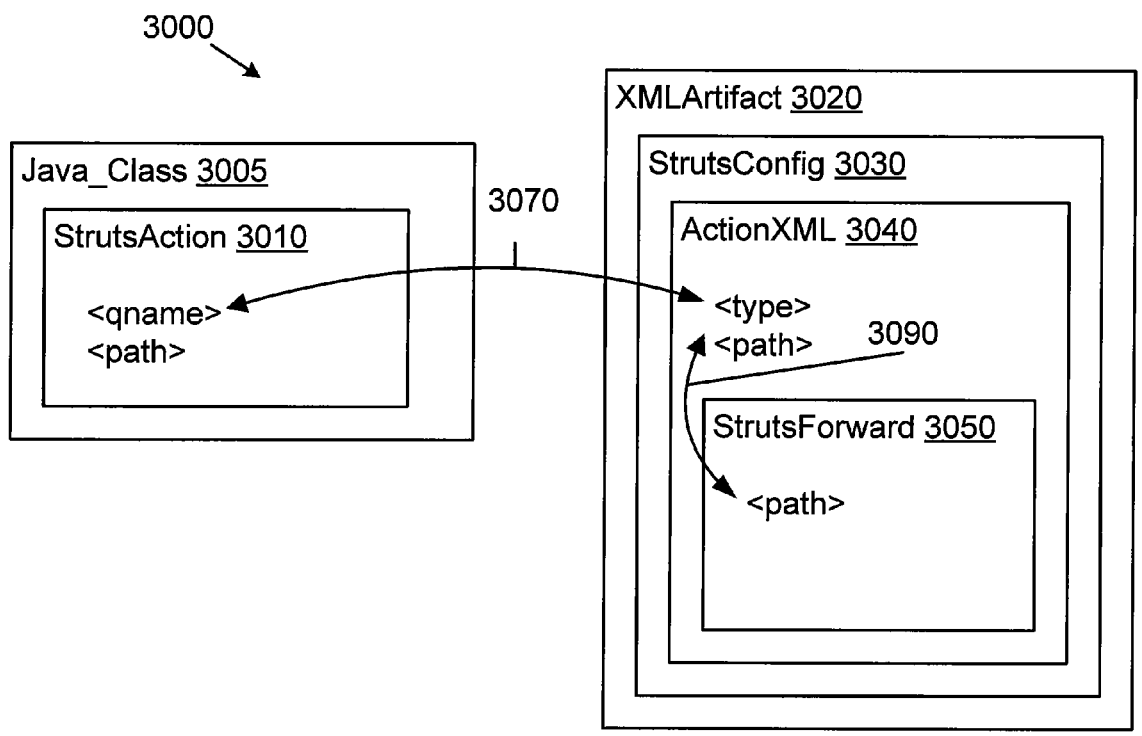
FIG. 30 is a block diagram of the cross-artifact relationships defined by the Link Definition Language statements of FIG. 29.

FIG. 30 is a block diagram 3000 of the concepts and cross-artifact relationships defined by the Link Definition Language statements of FIG. 29. Concept "StrutsConfig" 3030 is an extension (e.g., sub-concept) of concept "XMLArtifact" 3020. Concept "StrutsAction" 3010 comprises attribute "qname" and "path" and is an extension of concept "Java_Class" 3005. Concept "ActionXML" 3040 is an extension of "StrutsConfig" 3030 and comprises attributes "type" and "path" and concept "StrutsForward" 3050 comprising an attribute "path." A cross-artifact relationship 3070 links the "type" attribute of concept "ActionXML" 3040 to the "qname" attribute of "StrutsAction" 2910 and a cross-artifact relationship 3090 links the "path" attribute of "StrutsForward" concept 3050 to the "path" attribute of "ActionXML" concept 3040.

EXAMPLE 31

Exemplary Link Processor

In any of the examples described herein employing the Link Definition Language (LDL), a Link Processor interprets LDL statements and invokes multiple engines for querying a knowledge repository depending on the query language (e.g., selector language) specified in a selector expression statement. The Link Processor can support concept selector statements that specify XPath, SQL and PredQL as the query language. The Link Processor evaluates LDL statements and can add software system facts to or remove software system facts from a knowledge repository or modify software system facts previously stored in the knowledge repository.

EXAMPLE 32

Exemplary Cross-Artifact Relationship Storage

In any of the examples described here, cross-artifact relationships can be stored in a knowledge repository according to relationship schema described herein. Cross-artifact relationship types can be modeled as entries in a relational database defined for containing relationships extracted from formal language artifacts or they can be modeled uniquely. For example, cross-artifact relationship types can be modeled as entries in the SQL table "schema.reltype_def" defined by SQL statements 1910 in FIG. 19 and individual cross-artifact relationships can be modeled as entries in the table "schema.relation" defined by SQL statements 1920 in FIG. 19.

Alternatively, the cross-artifact relationship definitions and cross-artifact relationships can be modeled in relational database tables dedicated to storing these software system facts. FIG. 31A shows SQL statements 3110 defining an SQL table "schema.relation_crossrel" containing individual cross-artifact relationships. In the example, the table "schema.relation_crossrel" is an extended version of the table "schema.relation" defined in SQL statements 1920 in FIG. 19, with added source and target term attributes SRC_ATTR and TAR_ATTR to model which attributes of the source and target concept instances are cross-referenced.

FIG. 31B shows the cross-artifact relationship 3070 of FIG. 30 modeled as an entry in the SQL table defined in FIG. 31A.

EXAMPLE 33

Exemplary PredQL

In any of the examples described herein, PredQL is a logic based predicate query language. Link Definition Language concept selector statements (e.g., LDL statements 2730 and 2740 in FIG. 27) can specify PredQL as the query language for selecting concept instances or concepts from the knowledge repository. The basic constructs employed to formally represent ontologies in the knowledge repository are 'concept', 'relationship' and 'role'. PredQL is a predicate query language where expressions are composed from basic predictaes using standard logic operators "&" (AND) for conjunction, "|" (OR) for disjunction and "!" (NOT) for negation. All of the concepts stored in the "schema.concept_def" table of FIG. 17, the relationship types stored in the "schema.reltype_def" tables as shown in FIG. 19 in "schema.role_def" form the basic predicates that can be used to compose predicates using PredQL. Additionally, PredQL also supports the definition of derived predciates or composite predicates from other existing basic or derived predicates. For example the PredQL expression, EJBClass(x): class(?x) & extends+("javax.ejb.SessionBean") defines a intentional concept called 'EJBClass' as a derived predicate from other existing predicates in the repository. Thus, PredQL predicates are extensible (i.e., composite predicates can be defined based on other predicates). The basic set of PredQL predicates comprises concepts, relationship types and role names. The extended set of predicates comprises intentional concepts (expressed as composite predicates). The basic set of PredQL operates used to compose predicate expression comprise the logical AND (conjunction) and logical OR (disjunction) operators.

EXAMPLE 34

Exemplary Reporting of Software System Facts

Figure 32:
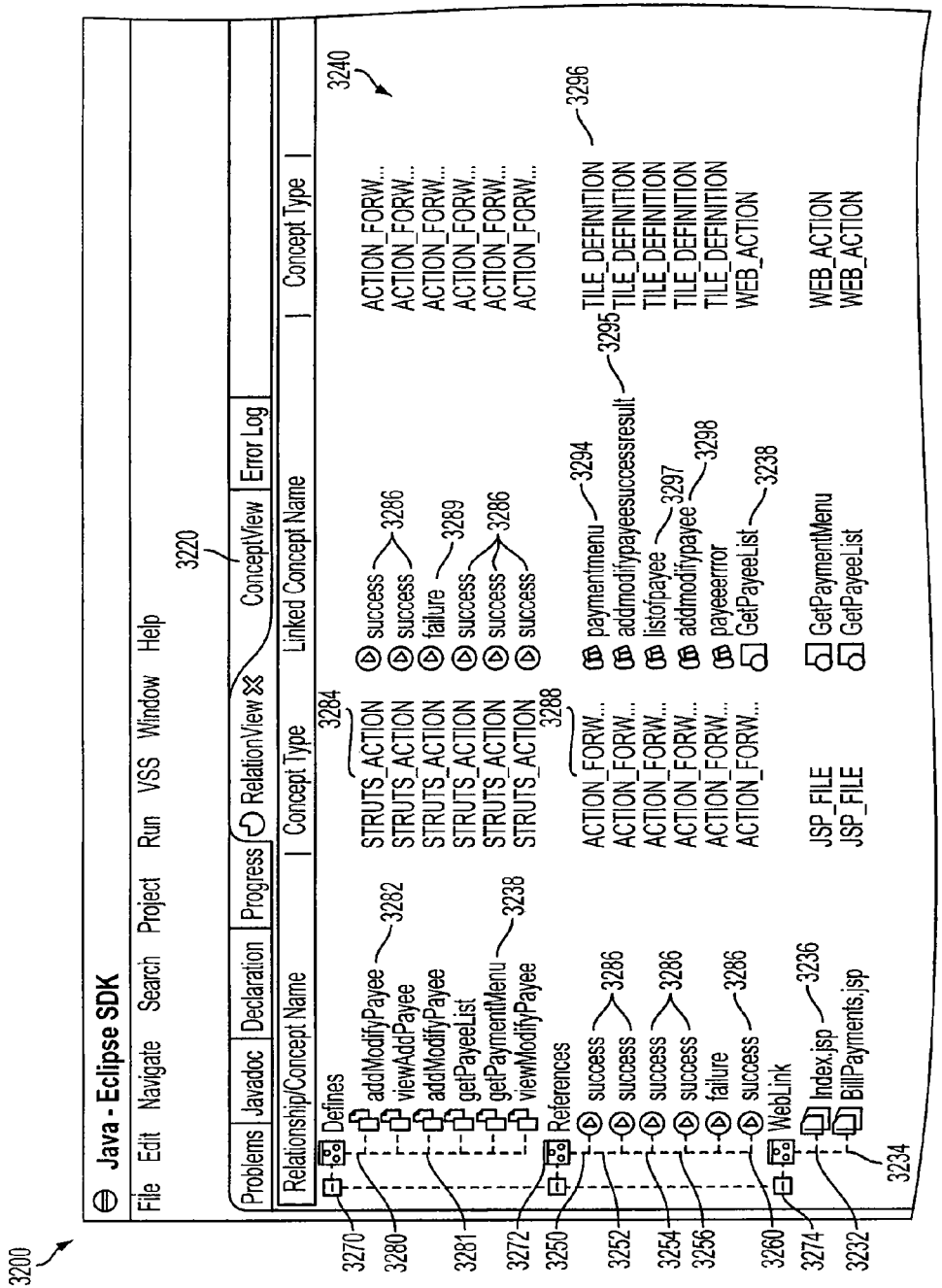
FIG. 32 is an exemplary screen shot generated by a concept-oriented software engineering system reporting identified and extracted software system facts using the exemplary method of FIG. 3.

FIG. 32 is an exemplary screen shot 3200 generated by a concept-oriented software engineering system reporting identified and extracted software system facts using the methods described herein. The screen shot 3200 comprises a relationship report 3240 showing a hierarchy of identified relationships within a web-based financial services or banking software system developed using the Struts framework. In the example, the relationship hierarchy comprises defines relationships 3270, references relationships 3272 and weblink relationships 3274. Individual identified relationships are represented as entries in the report 3240, arranged by relationship type.

For example, consider a Struts Action named "addModifyPayee" that includes Action Forward instances "success" and "failure." The "success" and "failure" Action Forward instances indicate where the result of the web application action associated with "addModifyPayee" is to be sent depending upon whether the action of adding a payee or modifying the profile of a payee was successful. The relationship between the "addModifyPayee" Struts Action and the "success" and "failure" Action can be represented by entries 3280 and 3281 in the example. Entry 3280 represents a defines relationship indicating that instance "addModifyPayee" 3282 of concept "STRUTS_ACTION" 3284 defines an instance "success" 3286 of concept "ACTION_FORWARD" 3288. Entry 3281 represents the defines relationship between instance "addModifyPayee" and Action Forward instance "failure" 3289.

References relationships are similarly reported. For example, entry 3250 represents a references relationship indicating that instance "success" 3286 of concept "ACTION_FORWARD" 3288 refers to instance "paymentmenu" 3294 of concept "TILE DEFINITION" 3296. Entries 3252, 3254, 3256 and 3260 represent additional references relationships between instance "success" 3286 and other concept instances (e.g., "listofpayee," 3297 "payeeeror"). Entries 3232 and 3234 similarly report weblink relationships 3274 between JSP files and various web applications. A user can view similar reports for identified concept definitions and relationships, for example, by selecting the ConceptView tab 3220.

Thus, the report 3240 provides information on how elements of the web-based financial services or banking software system are organized and interrelated. For example, the report 3240 shows that web application GetPaymentMenu 3238 is defined in JSP file indexjsp 3236 (entry 3232) and includes Action Forward "success" 3286 (entry 3283). Action Forward "success" in turn references tile definitions paymentmenu 3294, addmodifypayeesuccessresult 3295, listofpayee 3297, addmodifypayee 3298 and getPayeeList 3299 (entries 3250, 3252, 3254 and 3260).

Reports such as report 3200 can be generated as part of system appreciation efforts to provide software engineers with an understanding of the constituent components of a software system and their interdependencies. Software system facts can be analyzed after identification to provide additional information about the software system. For example, the systems and methods described herein use software system facts to recover and visualize various architectures of the software system, to check compliance of the software system against architectural constraints and to assess the impact of proposed changes to the software system.

EXAMPLE 35

Exemplary System for Recovering Software System Architectures

Figure 33:
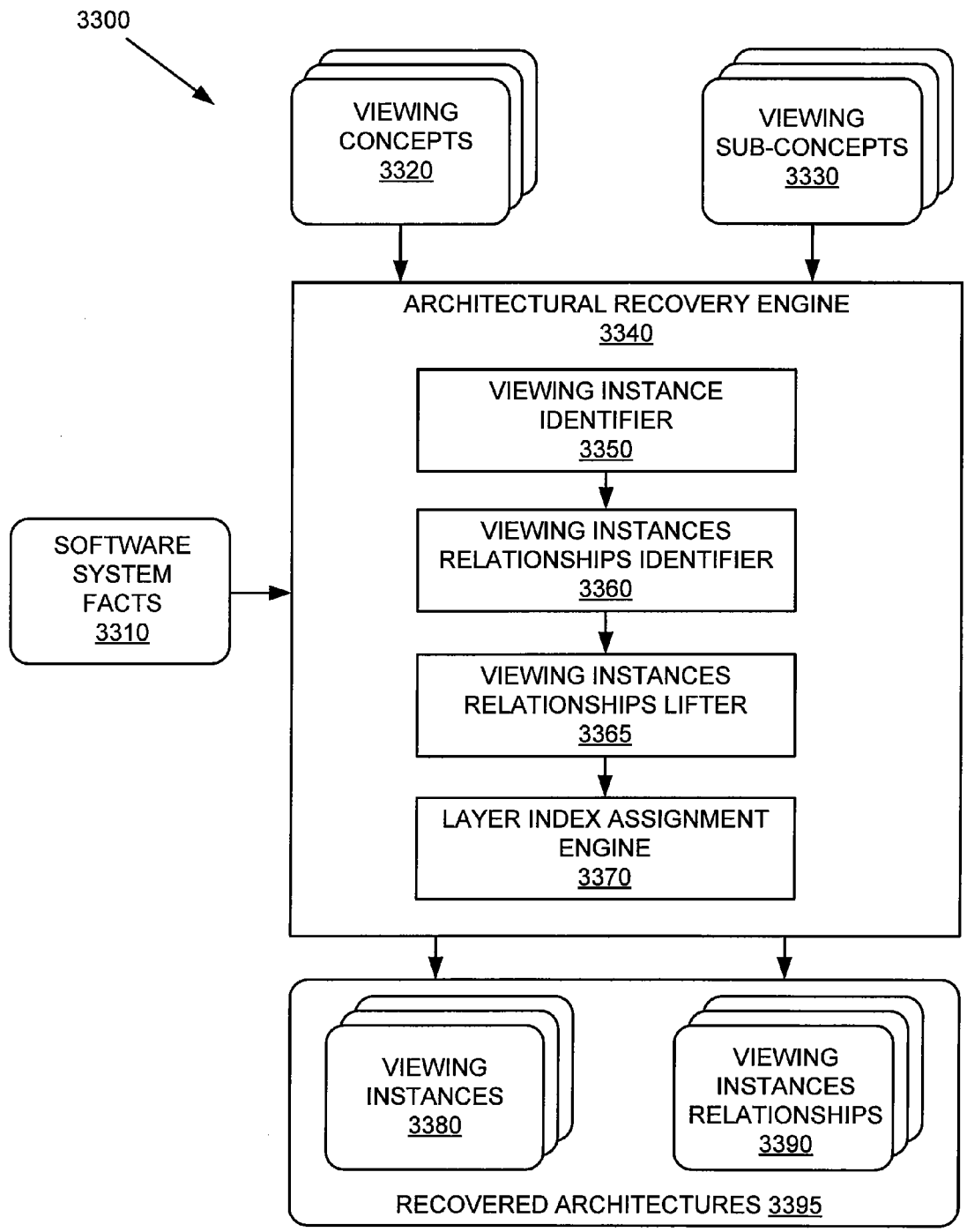
FIG. 33 is a block diagram of an exemplary system for recovering software system architectures.

FIG. 33 is a block diagram of an exemplary system 3300 for recovering software system architectures. The system 3300 can be part of a larger system (e.g., the exemplary concept-oriented software engineering system 100 of FIG. 1) or can be an independent system. The system 3300 comprises an architectural recovery engine 3340 that receives viewing concepts 3320 and viewing sub-concepts 3330 of a software system and recovers architectures 3395. The architectural recovery engine 3340 has access to software system facts 3310 of the software system and comprises a viewing instance identifier 3350, a viewing instances relationships identifier 3360, a viewing instances relationships lifter 3365 and a layer index assignment engine 3370. The system 3300 can recover multiple architectures for one or more software systems, based on one or multiple sets of viewing concepts 3320 and viewing sub-concepts 3330. The software system facts 3310 can be identified and extracted from a software system using United States Patent Application "Concept-Oriented Software Engineering System And Method For Identifying, Extracting, Organizing, Inferring And Querying Software System Facts," incorporated herein by reference.

The viewing concepts 3320 are concepts belonging to the software system facts 3310 and for which a set of associated concept instances, viewing instances 3380, will be included in a rendered view of a recovered architecture. The viewing sub-concepts 3330 are sub-concepts of the viewing concepts 3320 and ensure that the recovered architecture reflects the relationships and concept instances associated with a concept hierarchy defined by the viewing concepts 3320. Thus, a set of viewing concepts 3320 define the scope of a recovered architecture 3395. A set of viewing concepts 3320 and viewing sub-concepts of 3330 is used to recover an architecture and a recovered architecture comprises one set of viewing instances 3380 with assigned layer index values and one set of viewing instances relationships 3390.

Alternatively, an archictecture can be recovered based on a set of modules instead of or in addition to viewing concepts 3320 and viewing sub-concepts 3330. Modules provide for representing levels of abstractions beyond those represented by language concepts, domain concepts and intentionally defined concepts. Modules are defined based on concept instances within the software system facts 3310 and can be supplied via a module definition file. For example, module definition statement 3410 in FIG. 34 defines the module "JUNIT_EXTENSION" comprising instances junit.extensions.ActiveTestSuite, junit.extensions.ActiveTestSuite$1, etc. Modules are treated as viewing instances during architectural recovery. That is, viewing instances relationships may be lifted to modules and modules are assigned layer index values and are included in the layered view of the recovered architecture (e.g., FIG. 50).

The viewing instance identifier 3350 selects the viewing instances 3380 from the software system facts 3310 based on the viewing concepts 3320 and the viewing sub-concepts 3330. A module link analyzer (not shown) can analyze any module definition statements. The viewing instances relationships identifier 3360 selects viewing instances relationships 3390 from the software system facts 3310 that are associated with the viewing instances 3320. The viewing instances relationships lifter 3365 lifts low-level relationships to higher-level relationships, as will be discussed. The layer index assignment engine 3370 determines layer index values for the viewing instances 3380 for use in rendering layered views of a recovered architecture. The architectural recover engine 3340 can comprise a relationship weight assignment engine (not shown) which assigns weights to relationships in the software system facts 3310 based on relationship type.

The software system facts 3310 can be identified and extracted from software system artifacts of a software system as described herein. In addition to the recovered architectures 3395, the system 3300 can generate architectural documentation (e.g., architectural reports) for use by various stakeholders of the software system (e.g., software engineers, system architects).

EXAMPLE 36

Exemplary Method of Recovering Software System Architectures

Figure 35:
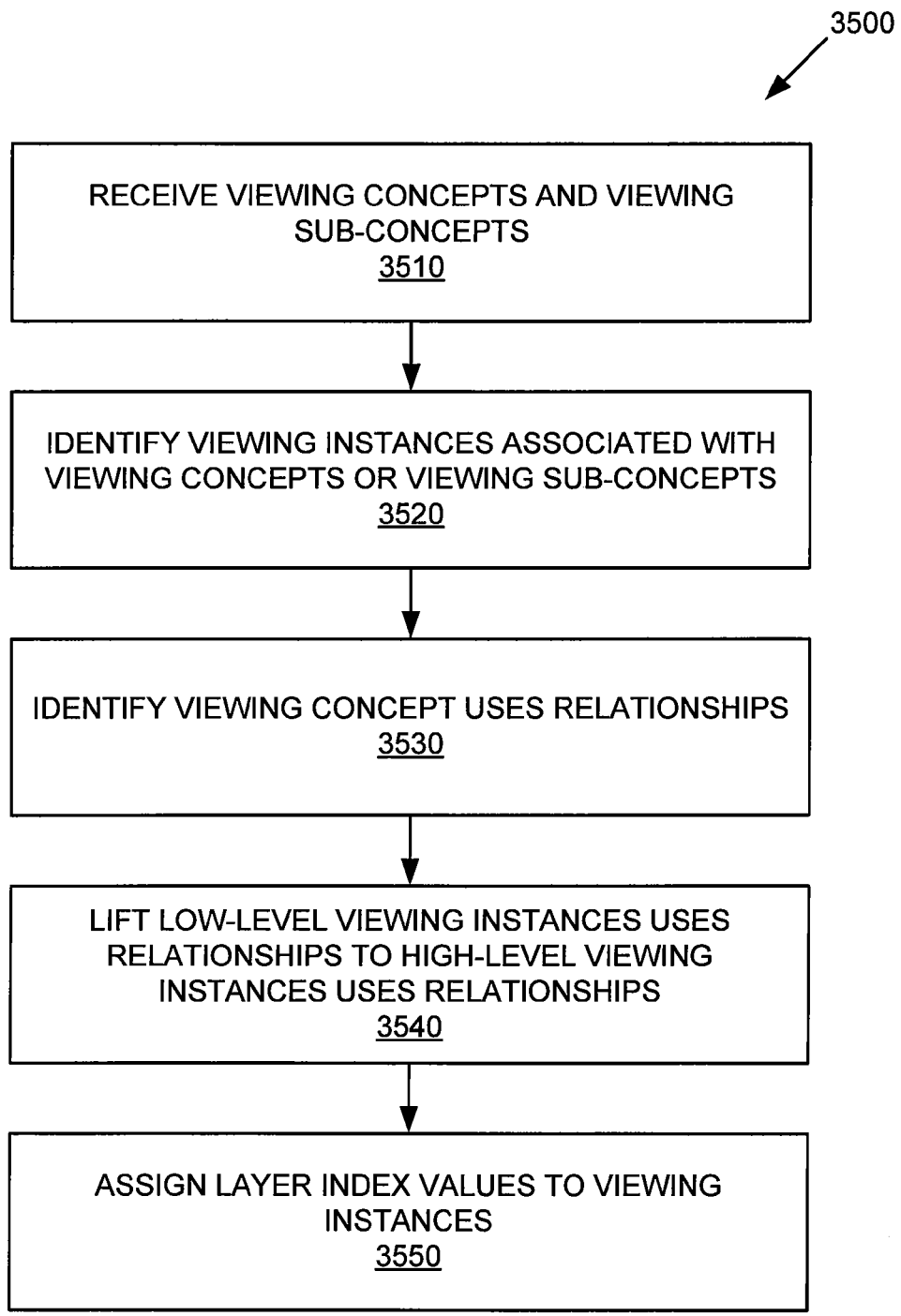
FIG. 35 is a block diagram of an exemplary method of recovering software system architectures.

FIG. 35 is a block diagram of an exemplary method 3500 of recovering software system architectures. At 3510, viewing concepts and viewing sub-concepts are received. The viewing concepts and viewing sub-concepts are concepts associated with a software system for which an architecture is to be recovered. The viewing concepts and sub-concepts can be user-selected or provided automatically as described herein. For example, if an architecture is to be recovered in part based on defined software system modules, the viewing concepts can be specified in a module definition file.

At 3520, viewing instances associated with the viewing concepts and viewing sub-concepts are identified. Viewing instances associated with concepts and sub-concepts included in a module definition, if supplied, will also be identified. At 3530, "uses" relationships between the viewing instances are identified. These viewing instances uses relationships can be identified, for example, by querying the software system facts to identify the concept instances used by the viewing instances identified at 3520 (i.e., querying the software system facts for "uses" relationships and sub-relationships of "uses" relationships that indicate a viewing instance "uses" another concept instance). "Uses" relationships or "uses" sub-relationships relating a viewing instance to a concept instance that is not associated with a viewing concept or a viewing sub-concept or that is not a descendant of a viewing instance are discarded. Concept instances that are associated with a viewing concept or a viewing sub-concept or that are descendants of a viewing instance, are related to a viewing instance by a "uses" relationships, and are not previously identified as viewing instances in 3520 can be retained as viewing instances.

At 3540, low-level viewing instances uses relationships are lifted to high-level viewing instances uses relationships along a viewing instances hierarchy defined by "member" relationships as described herein. At 3550, layer index values are assigned to the viewing instances based on the viewing instances uses relationships. Alternatively, the layer index values could be assigned based on other relationships (e.g., relationships between concept instances written in different formal languages). The layer index values are used for generating layered views of a recovered architecture.

Alternatively, the exemplary method 3500 can comprise storing recovered architectures, for example, in a knowledge repository or passing the recovered architecture to another computing system or a component of a computing system as described herein (e.g., visualization engine 170 of the system 100 of FIG. 1).

EXAMPLE 37

Exemplary Viewing Concepts

Figure 36:
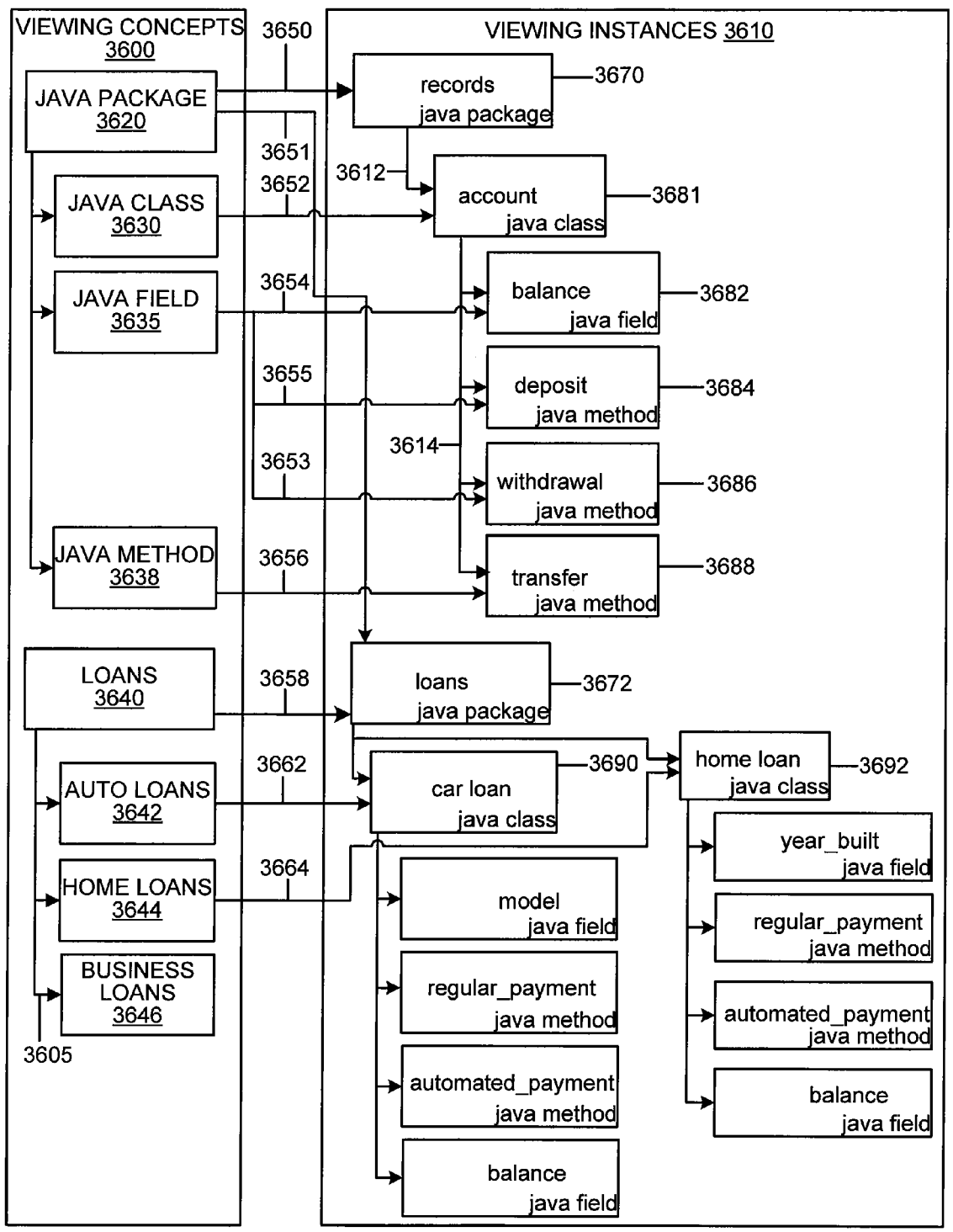
FIG. 36 is a block diagram of exemplary viewing concepts and associated viewing instances.

FIG. 36 depicts exemplary viewing concepts of a software system. The viewing concepts 3600 and viewing sub-concepts belong to the set of software system facts for which an architecture is to be recovered and/or visualized. Viewing concepts 3600 can be user selected (e.g., with a user interface or provided as input in a user-generated file, such as a module definition file) or automatically selected. For example, the viewing concepts 3600 can be automatically selected based on various concept types (e.g., modules, packages, classes) contained in a set of software system facts. The viewing sub-concepts can also be selected automatically or by a user. For example, the viewing sub-concepts can be automatically selected by identifying from a set of software system facts, concepts that are related to a viewing concept 3600 by an "extends" or "subconcept" relationship or a chain of "extends" or "subconcept" relationships (i.e., the selected sub-concepts comprise concepts that are sub-concepts, sub-concepts of sub-concepts, etc. of a viewing concept). That is, the viewing sub-concepts include concepts that are descendants (e.g., children, grandchildren) of a viewing concept.

In the example, the viewing concepts 3600 comprise language concepts "Java package" 3620, "Java class" 3630, "Java field" 3640 and "Java method" 3650 and domain concepts "loans" 3640, "auto loans" 3642, "home loans" 3644 and "business loans" 3646. Domain concepts "auto loans" 3642, "home loans" 3644 and "business loans" 3646 could be alternatively identified as viewing sub-concepts as they are sub-concepts of the viewing concept "loans" 3642. For example, the sub-concepts 3642, 3644 and 3646 of domain concept "loans" 3640 can be identified by querying the software system facts for concepts that are related to the concept "loans" 3640 by one or more "extends" or "subconcept" relationships, such as relationships 3605.

Viewing concepts are termed as such because concept instances associated with a set of viewing concepts (i.e., viewing instances) are typically included in a layered view of an architecture that was recovered based on the set of viewing concepts. For example, if language concept "Java Package" 3620 is a viewing concept provided to the method 3500, a layered view of a resulting recovered architecture usually comprises a representation of the instances "records" 3670 and "loans" 3672. Thus, one difference between identifying concept "java class" 3630 as a viewing concept to identifying "java class" as a sub-concept of viewing concept "java package" 3620 is that concept instances associated with the "java class" concept will typically be included in a layered view of an architecture that was recovered based on the "java class" concept as a viewing concept.

EXAMPLE 38

Exemplary Viewing Instances

FIG. 36 further depicts viewing concept instances, or viewing instances, 3610 associated with the viewing concepts 3600. The viewing instances 3610 are concept instances belonging to the set of software system facts of a software system for which an architecture is to be recovered. The viewing instances 3610 are the concept instances associated with the viewing concepts 3600 or viewing sub-concepts and include descendants (e.g., children, grandchildren) of the concept instances associated with the viewing concepts 3600 or sub-concept of the viewing concepts. For example, concept instances "records" 3670 and "loans" 3672 are viewing instances because they are associated with the language concept "java package" 3620. Further, concept instances "account" 3681 and "balance" 3680 are viewing instances because they are descendants of concept instance "records" 3670, respectively. Concept instance "account" 3681 can alternatively be identified as a viewing instance because it is an instance of "Java class" 3630, a sub-concept of the viewing concept "java package" 3620. Moreover, if viewing concept "Java class" 3630 is identified as a viewing concept, instance "account" 3681 can be identified as a viewing instance due to an "instance" relationship 3652 indicating that instance "account" is associated with (e.g., an instance of) viewing sub-concept "Java class" 3630.

EXAMPLE 39

Exemplary Viewing Instances Identification

Referring to FIG. 36, viewing instances 3610 can be identified, for example, by querying a set of software system facts for concept instances that are related to a viewing concept or viewing sub-concept by an "instance" relationship. For example, concept instance "loans" 3672 is identified as a viewing instance because relationship 3651 indicates that concept instance "loans" 3672 is an instance of language concept "Java package" 3620. Alternatively, concept instance "loans" 3672 can be identified as a viewing instance by "instance" relationship 3658, indicating that instance "loans" 3672 is an instance of domain concept "loans" 3640. Any defined modules are considered viewing instances. The constitutent concept instances of the modules are also included as viewing instances.

Descendants of concept instances associated with viewing concepts or viewing sub-concepts are also identified as viewing instances 3610. Descendant concept instances are related to a concept instance associated with a viewing concept or viewing sub-concept by one or more "member" relationships. For example, concept instance "account" 3681 is identified as a viewing instance because it is related to viewing instance "records" 3670 by "member" relationship 3612. Similarly, concept instances 3682, 3684, 3686 and 3688 are identified as viewing instances because they are related to viewing instance "records" 3670 by two "member" relationships. That is, concept instances 3682, 3684, 3686 and 3688 are related by "member" relationship 3614 to concept instance "account" 3681, which in turn is related by "member" relationship 3612 to viewing concept 3670. Concept instances 3682, 3684, 3686 and 3688 can alternatively be identified as viewing instances by being related to viewing concepts 3630, 3635 and 3638 (which can be identified either as viewing concepts or viewing sub-concepts) by "instance" relationships 3653-3656.

In this manner, viewing instances 3610 include concept instances associated with viewing concepts 3600 or viewing sub-concepts along with descendants of these concept instances.

EXAMPLE 40

Exemplary Viewing Instances Relationships and Hierarchy

Figure 37:
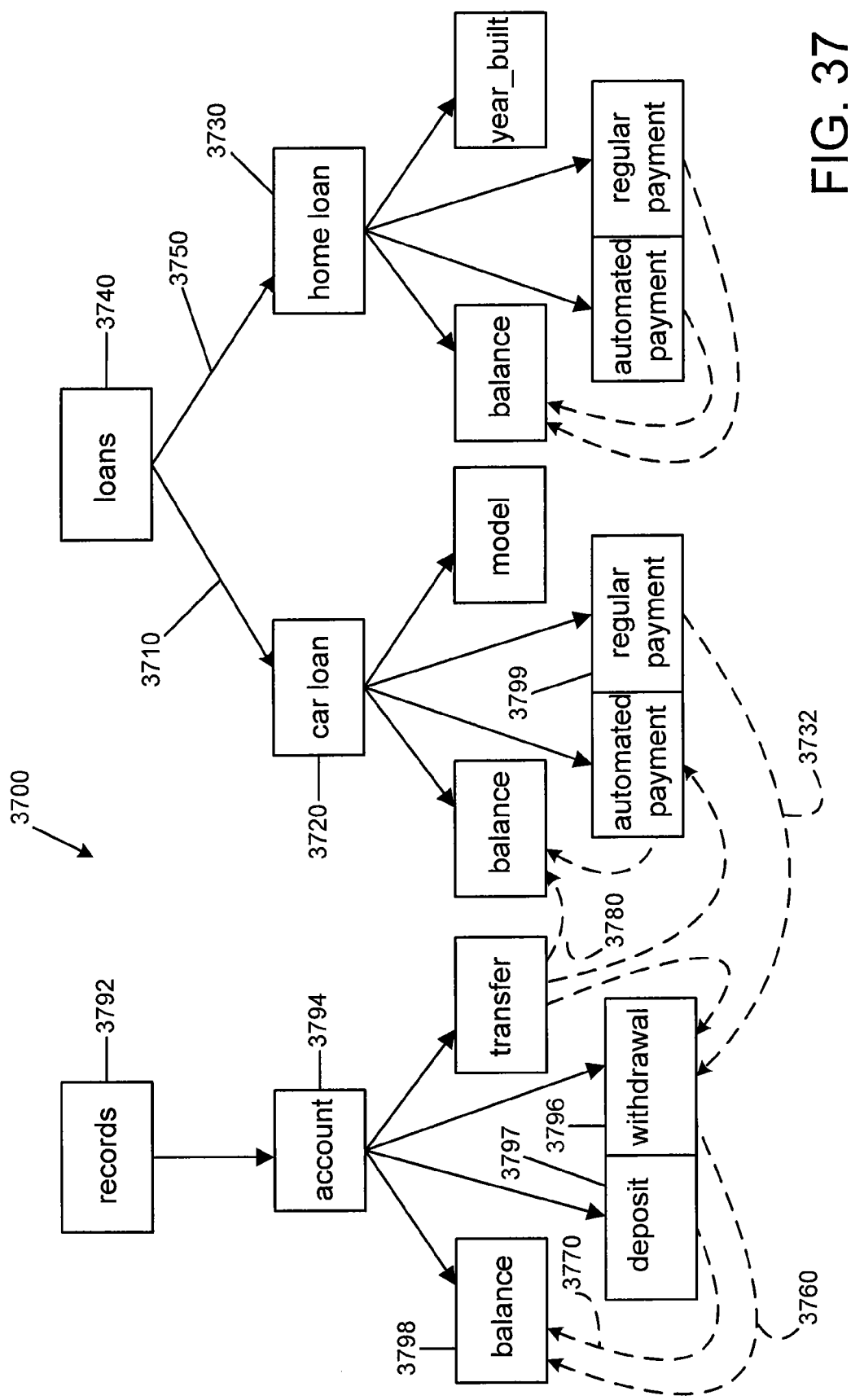
FIG. 37 depicts an exemplary viewing instances hierarchy containing viewing instances relationships.

FIG. 37 depicts an exemplary viewing instances hierarchy 3700 based on the viewing instances 3610 of FIG. 36 and arranged according to the "member" relationships associated with the viewing instances 3610. For example, viewing instances "car loan" 3720 and "home loan" 3730 are shown at a lower-level in the hierarchy 3700 because they are members of viewing instance "loans" 3740 as indicated by "member" relationships 3710 and 3750.

The hierarchy 3700 contains "uses" relationships and "uses" sub-relationships (e.g., "calls," "fieldUse," "argumentPassing") related the viewing instances. For example, relationships 3760 and 3770 represents Java methods "withdrawal" 3796 and "deposit" 3797 using or referring to a Java field "balance" 3798 within a Java class "account" 3794. Viewing instances relationships comprise "uses" relationships between concept instances that do not share a common ancestor in a viewing instance hierarchy. For example, relationship 3732 relates method "regular payment" 3799 of class "car loan" 3720 belonging to package "loans" 3740 to the method "withdrawal" 3796 of a class "account" 3794 belonging to a package "records" 3792.

Although not shown in FIG. 37, the viewing instances hierarchy 3700 can comprise cross-artifact relationships relating concept instances extracted from artifacts written in different languages. Alternatively, the viewing instances hierarchy 3700 can be arranged by any other relationship type or combination of relationship types described herein. Moreover, the hierarchy can comprise modules if module definitions have been supplied.

EXAMPLE 41

Exemplary Lifting of Viewing Instances Relationships

In any of the examples described herein, low-level relationships can be lifted, or promoted, to top-level relationships between concepts of higher abstraction. Low-level relationships are associated with at least one viewing low-level viewing instance, a viewing instance that is not associated with one of the viewing concepts. Top-level relationships relate concept instances associated with top-level viewing instances, viewing instances that are associated with viewing concepts. Lifted relationships are lifted along "member" relationships between viewing instances in the hierarchy, allowing for relationships between, for example, lower-level language concept instances (e.g., Java fields or methods) to be reflected as relationships between higher-level language concept instance (e.g., Java packages or classes).

Figure 38:
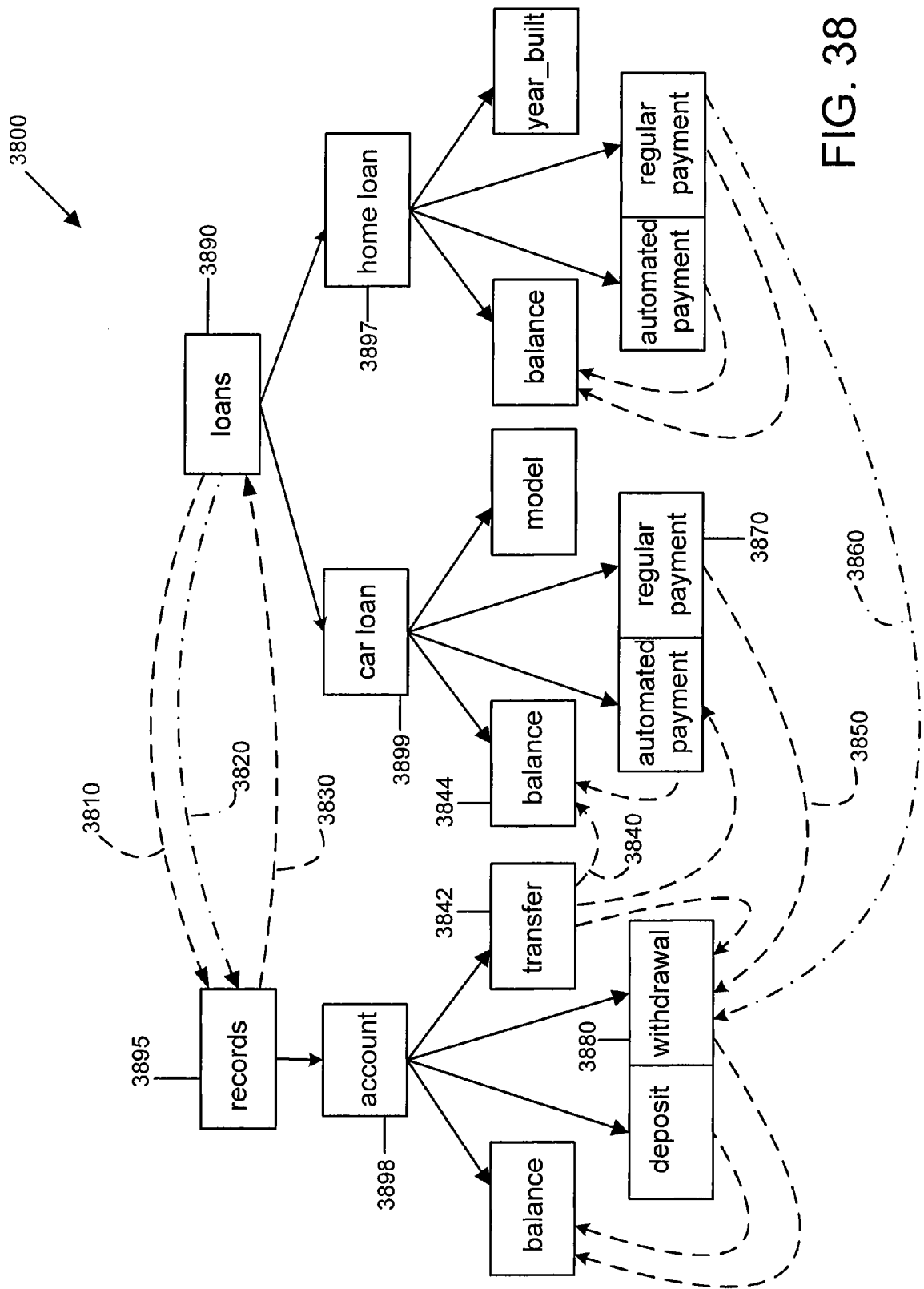
FIG. 38 depicts the exemplary viewing instances hierarchy of FIG. 37 with lifted relationships.

For example, FIG. 38 depicts an exemplary viewing instances hierarchy 3800, similar to that of FIG. 37, with added lifted relationships 3810, 3820 and 3830. The lifted "calls" relationship 3810 between viewing instance "loans" 3890 and viewing instance "records" 3895 is associated with the lower-level "calls" relationship 3850 between viewing instance "loans.carloan.regular.payment" 3870 and viewing instance "records.account.withdrawal" 3880. Similarly, lifted relationships 3820 and 3830 are associated with lower-level relationships 3860 and 3840 respectively. The dot-dash line pattern of relationship 3860 indicates that this relationship is of a different relationship type than the other relationships, represented by a dashed line pattern. Lifted relationships are added to the set of viewing instances relationships. The lower-level relationships (e.g., relationships 3840, 3850 and 3860) can either be kept in the set of viewing instances relationships or replaced by the lifted relationships.

Lifted lower-level relationships comprise relationships that relate a viewing instance that is a descendant of a top-level viewing instance to another top-level viewing instance or a descendent of another top-level viewing instance. Top-level viewing instances are usually instances of the viewing concepts, such as concept instances "records" 3895 and "loans" 3890, which are instances of the viewing concept "Java package." If sub-concepts of viewing instances have been identified as viewing concepts, top-level viewing instances may comprise viewing instances that reside below the top level of the viewing instances hierarchy. For example, if concept "java class" is a viewing concept, then instance "account" 3898 is a top-level viewing instance.

Top-level viewing instances may further comprise instances of viewing sub-concepts. For example, if "Java package" is a viewing concept and the top most-level concept instances in the viewing instance hierarchy are instances of the "Java class" concept, which is a sub-concept of the "Java package" viewing concept, then the "Java class" concept instances are the top-level viewing instances. Relationships 3840, 3850 and 3860 are lifted in the exemplary hierarchy 3800 because they relate a viewing instance that is a descendant of top-level viewing instance "loans" 3890 to a viewing instance that is a descendant of top-level viewing instance "records" 3895. Viewing instances "loans" 3890 and "records" 3895 are top-level instances because they are instances of the viewing concept "Java package."

Alternatively, relationships can be lifted to relate viewing instances other than top-level viewing instances. For example, in a viewing instance hierarchy with "Java package" as the viewing concept, low-level relationships associated with Java methods and fields can be lifted to relationships between Java classes in addition to or instead of relationships between Java packages. In the exemplary hierarchy 3800, the relationship 3840 between viewing instance "transfer" 3842 and viewing instance "balance" 3844 can be lifted to a relationship between concept instance "car loan" 3899 and "account" 3898.

Lifted relationships allow low-level relationships to be represented in a layered view that excludes viewing instances not associated with the viewing concepts. For example, referring to FIG. 38, if "Java package" is the viewing concept of hierarchy 3800, a package layered view of the recovered architecture will comprise viewing instances "records" 3895 and "loans" 3890. Although viewing instances "records" 3895 and "loans" 3890 are not directly related, descendants of instances "records" 3895 and "loans" 3890 are related and these lower-level relationships can be represented in a package layered view as relationships between viewing instances "records" 3895 and "loans" 3890 by liften relationships 3810, 3820 and 3830.

EXAMPLE 42

Exemplary System for Assigning Viewing Instance Layer Indices

Figure 39:
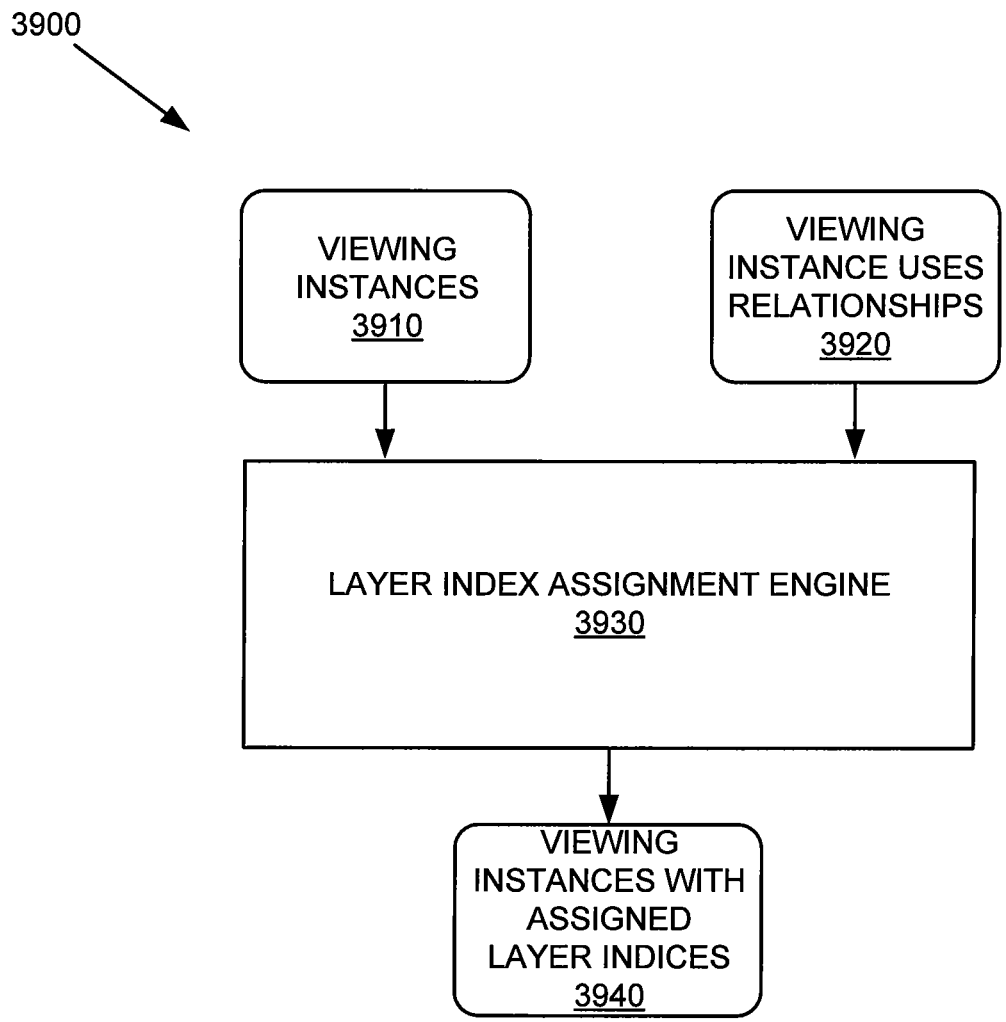
FIG. 39 is a block diagram of an exemplary system for assigning layer indices to viewing instances.

FIG. 39 is a block diagram of an exemplary system 3900 for assigning layer indices to viewing instances for use in rendering layered views of recovered architectures of a software system. The system 3900 comprises a layer index assignment engine 3930 that receives viewing instances 3910 and viewing instances relationships 3920 and generates viewing instances with assigned layer indices 3940.

EXAMPLE 43

Exemplary Method of Assigning Viewing Instance Layer Indices

Figure 40:
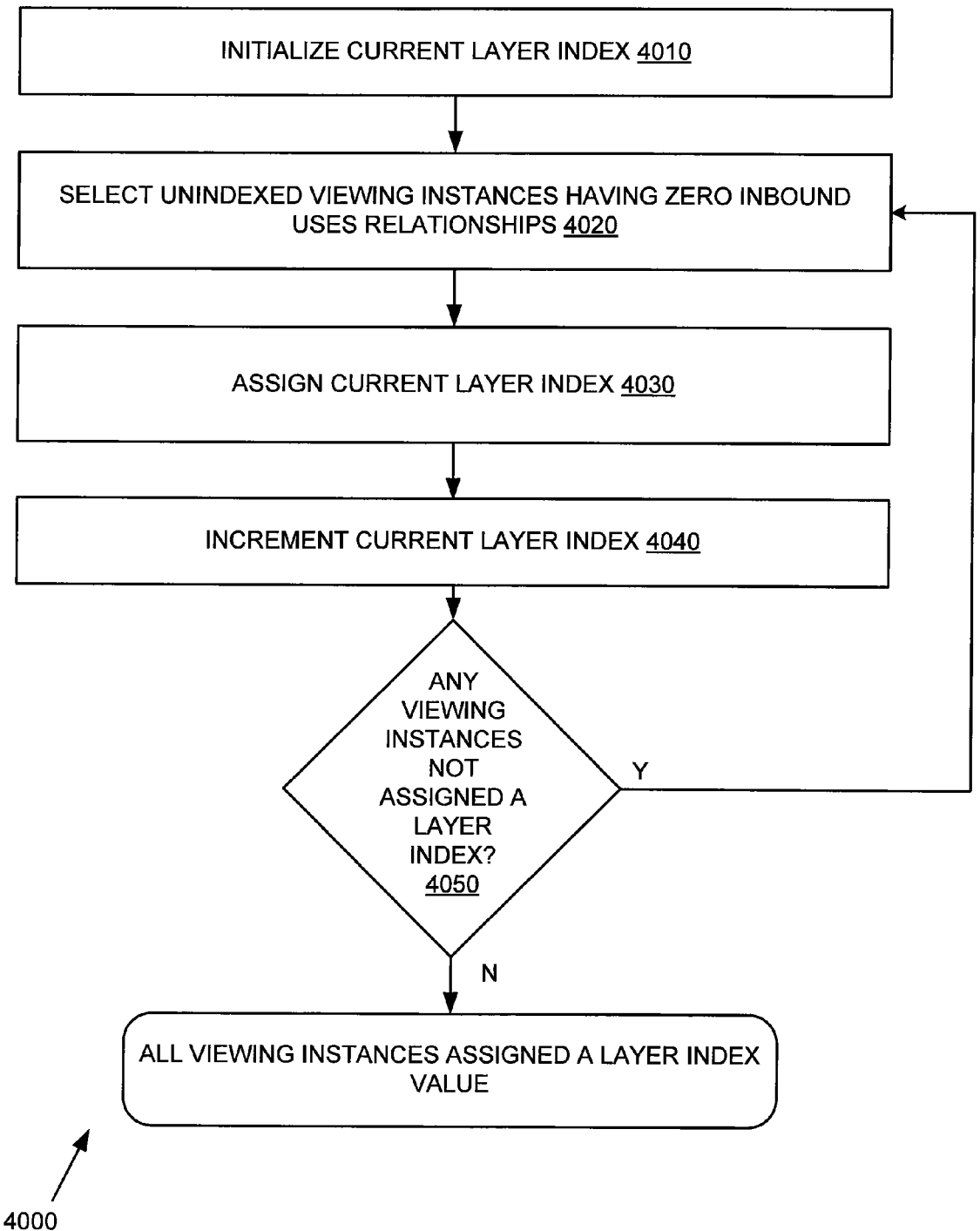
FIG. 40 is a block diagram of an exemplary method of assigning layer indices to viewing instances.

FIG. 40 is a block diagram of an exemplary method 4000 of assigning layer indices to viewing instances for use in generating and rendering layered views of recovered software system architectures. A layer index value indicates at which layer in a viewed hierarchy a viewing instance is to be represented. At 4010, a current layer index is initialized. At 4020, unindexed viewing instances having no direct or lifted inbound uses relationships associated with other unindexed viewing instances are selected or identified. Unindexed viewing instances are viewing instances not assigned a layer index value. A "uses" relationship is an inbound uses relationships of the concept instance that is the "used" (e.g., referenced to, called) instance in the relationship and is an outbound uses relationship of the concept instance that is the "uses" (e.g., referencing, calling) instance in the relationship. For example, relationships 3850 and 3860 of FIG. 38 are inbound uses relationships of concept instance "withdrawal" 3880.

At 4030, the current layer index is assigned to the unindexed viewing instances having zero inbound uses relationships associated with at least one other unindexed viewing instance. A viewing instance can be assigned a layer index value in various fashions. For example, an appropriate parameter in a relational database table entry can be set (e.g., parameter "LAYER_INDEX" in table 'schema.element' defined by statements 2010 in FIG. 20). Alternatively, the layer index can be assigned by setting an appropriate field or flag, in a data structure of various other formats either along with or separate from the viewing instances. Viewing instances having neither inbound nor outbound uses relationships, such as viewing instances "home loan" 3897 in FIG. 38, can be designated as misfit viewing instances.

At 4040, the current layer index is incremented. Alternatively, the current layer index can be decremented or otherwise be assigned successive values. At 4050, if unindexed viewing instances have not been assigned a layer index value, the method 4000 returns to 4020.

Prior to the execution of method 4000, none of the viewing instances have an assigned layer index value. If multiple architectures are recovered for a software system, a concept instance can be a viewing instance for more than one recovered architectures, and have an assigned layer index value for each recovered architecture.

Alternatively, the method 4000 can employ a layering dataset that is initialized with the viewing instances and viewing instances uses relationships at the beginning of the method 4000. In this alternative, the identification of viewing instances having zero inbound relationships and the assignment of the layer index values to viewing instances in 4020 and 4030 respectively, involves checking the viewing instances and associated relationships contained in the layering dataset. After the current layer index has been assigned to viewing instances at 4030 those viewing instances and their associated relationships are removed from the layering dataset. The method 4000 repeats 4020, 4030, 4040 and 4050 until the layering dataset is empty. The layering dataset can be any type of data structure (e.g., a relational database table).

EXAMPLE 44

Figure 41:
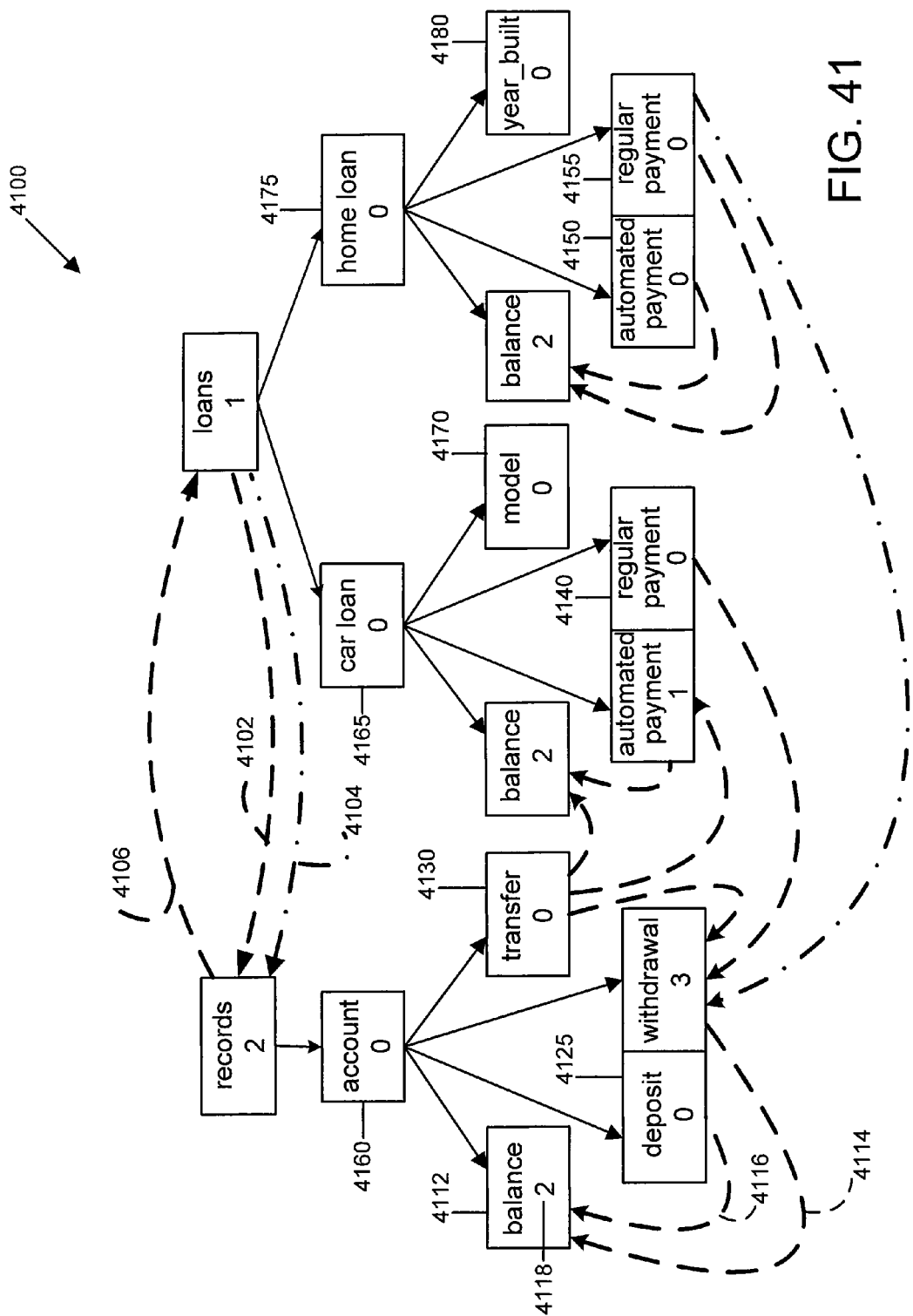
FIG. 41 depicts the exemplary viewing instances hierarchy of FIG. 37 after layer index values have been assigned to a first set of viewing instances using the exemplary method of FIG. 40.

Exemplary Application of the Method of Assigning Viewing Instance Layer Index Values FIG. 41 depicts an exemplary viewing instances hierarchy 4100 based on the viewing instances of FIG. 36 after layer index values has been assigned to a first set of viewing instances using the method 4000. The viewing instances hierarchy 4100 includes lifted relationships 4102, 4104 and 4106. Initially, no viewing instances have an assigned layer index value. The number of inbound uses relationships for unindexed viewing instances are calculated. For example, instance "balance" 4112 has two inbound uses relationships, relationships 4114 and 4116, as indicated by inbound relationship count 4118. Viewing instances having neither inbound nor outbound uses relationships (e.g., viewing instances 4160, 4165, 4170, 4175 and 4180) are removed from the set of viewing instances prior to executing method 4000 and can be identified as misfit viewing instances. Alternatively, misfit viewing instances can be identified as part of the method 4000 and prior to the assignment of a layer index value to a viewing instance.

In this example, viewing instances 4125, 4130, 4140, 4150 and 4155 have only outbound "uses" relationships but no inbound "uses" relationships and are assigned the initialized current layer index value. The current layer index value can be initialized to any value (e.g., 0, 1, I, II, "first," "primary," "A") and can be incremented or decremented by any amount or otherwise assigned successive values (e.g., "first," "second," "third"). In this example, viewing instances 4125, 4130, 4140, 4150 and 4155 are assigned an initial current layer index value of one and the layer index is incremented by one.

Figure 42:
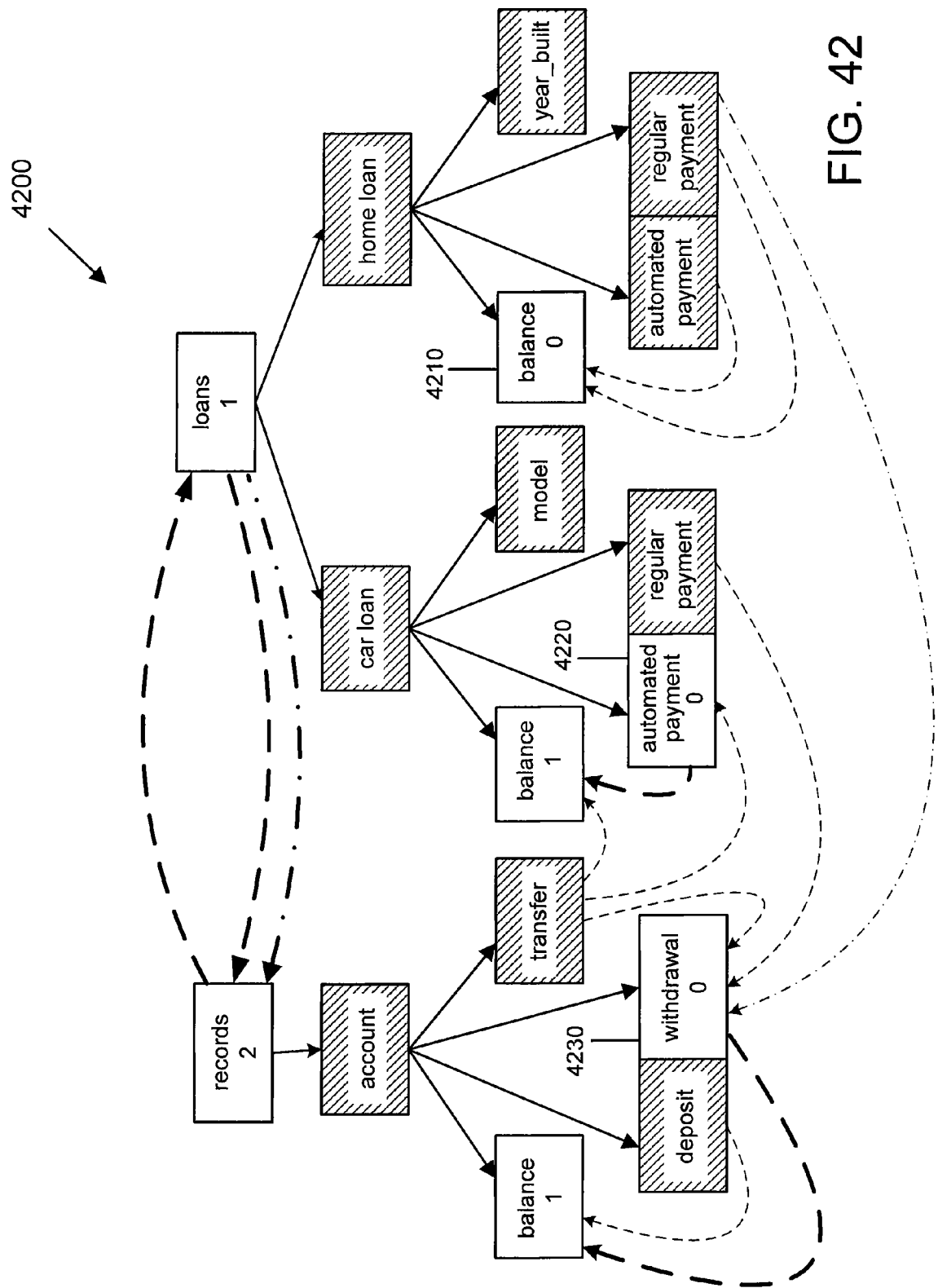
FIG. 42 depicts the exemplary viewing instances hierarchy of FIG. 37 after layer index values have been assigned to a second set of viewing instances using the exemplary method of FIG. 40.

FIG. 42 shows the viewing instance hierarchy of FIG. 41 after a second set of viewing instances has been assigned a layer index value. Misfit viewing instances 4160, 4165, 4170, 4175 and 4180 and viewing instances 4125, 4130, 4140, 4150 and 4155 along with relationships associated with these instances are removed from consideration in the identification of viewing instances that can be assigned a layer index value. Viewing instances removed from consideration in the identification of viewing instances that can be assigned a layer index value are indicated by a hatched box and the removed relationships are indicated with a lighter line weight in FIGS. 42-44. With misfit viewing instances, the viewing instances assigned a layer index values and associated relationships removed, unindexed viewing instances 4210, 4220 and 4230 are identified as having zero inbound uses relationships. Thus, viewing instances 4210, 4220 and 4230 are assigned a layer index value of two, the current layer index value in a second iteration of 4020.

Figure 43:
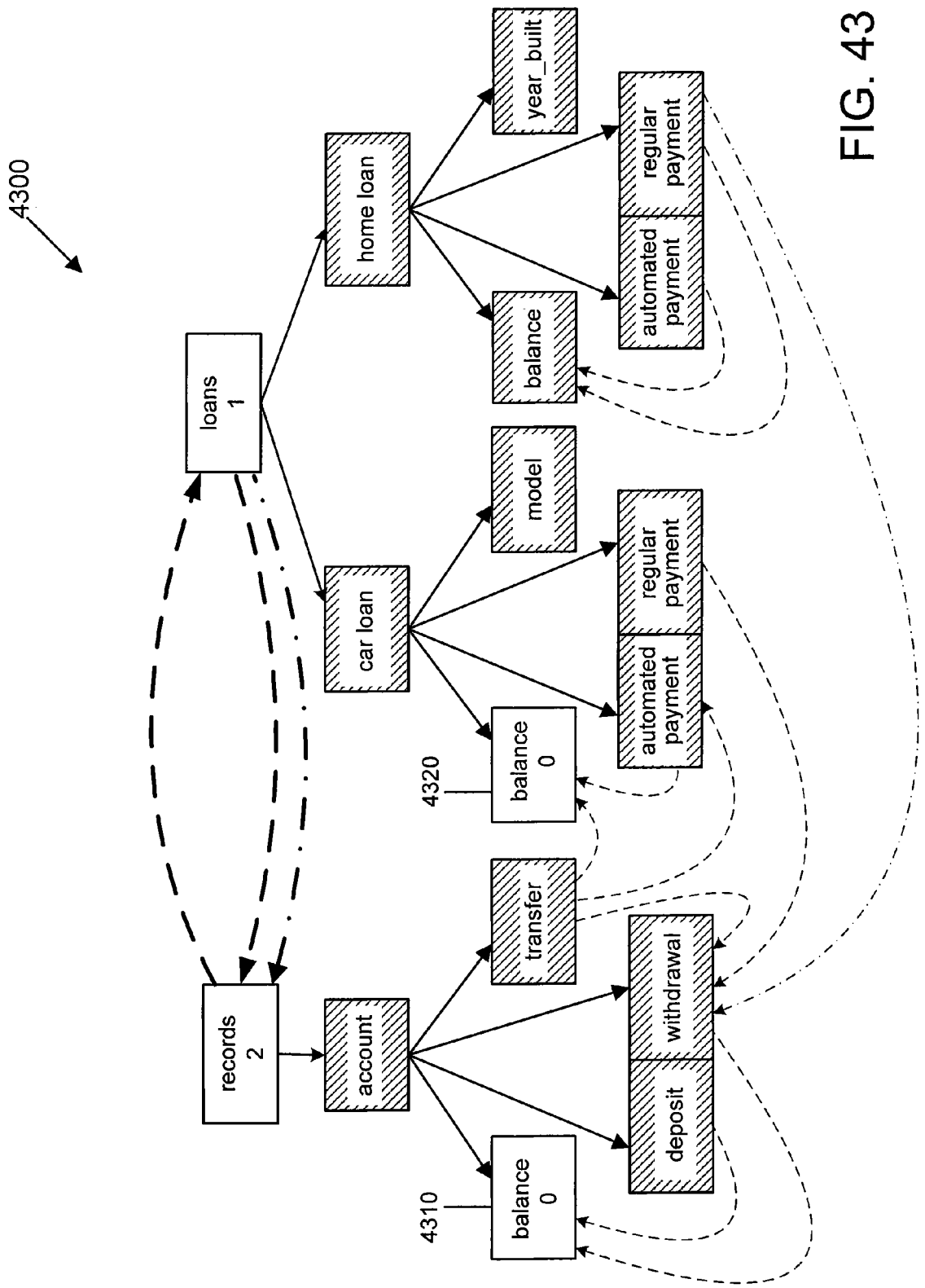
FIG. 43 depicts the exemplary viewing instances hierarchy of FIG. 37 after layer index values have been assigned to a third set of viewing instances using the exemplary method of FIG. 40.
Figure 44:
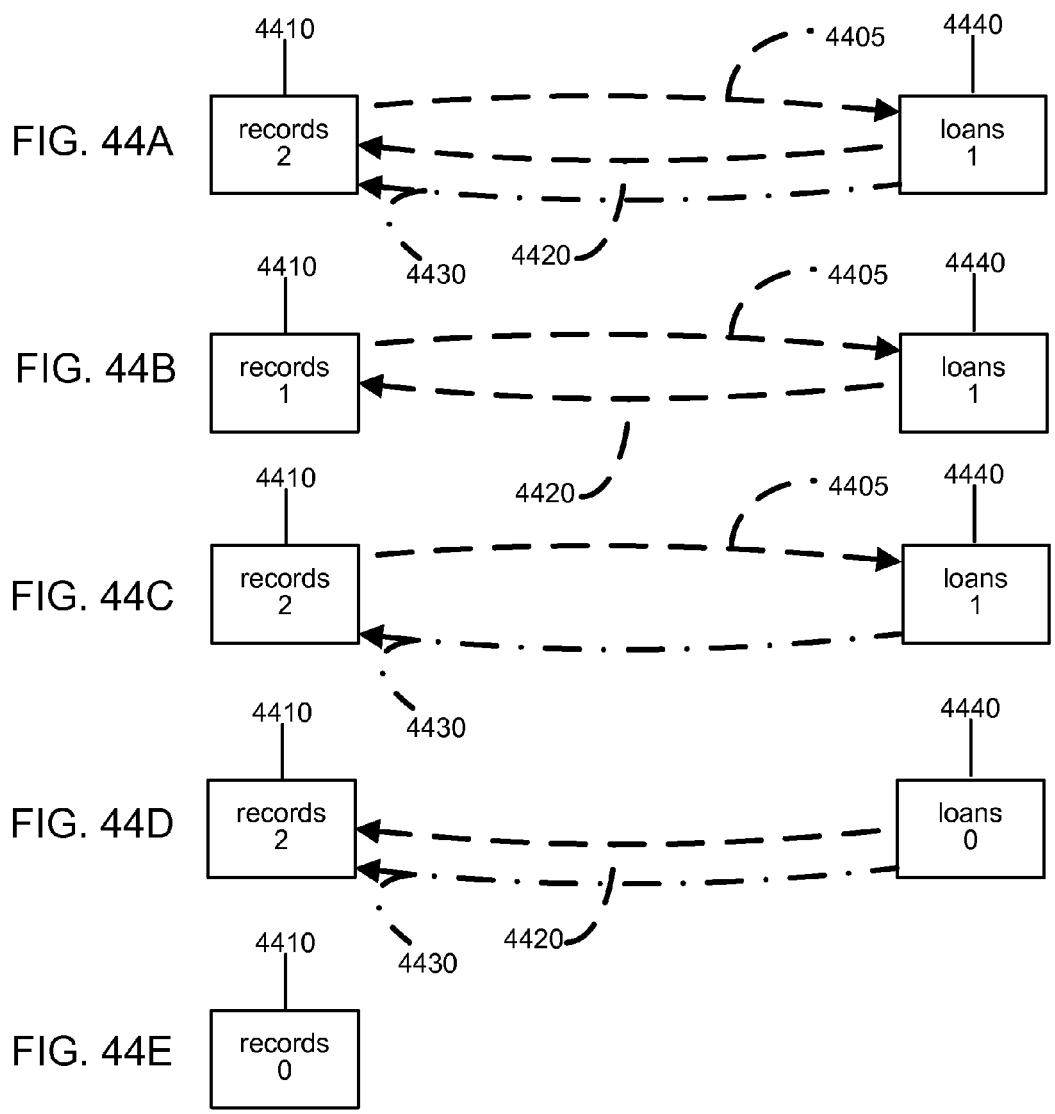
FIG. 44A depicts the exemplary viewing instances hierarchy of FIG. 37 after layer index values have been assigned to a fourth set of viewing instances using the exemplary method of FIG. 40.
FIG. 44B depicts the removal of a first relationship as part of the exemplary method of breaking a cycle condition of FIG. 45.
FIG. 44C depicts the removal of a second relationship as part of the method of breaking a cycle condition of FIG. 45.
FIG. 44D depicts the removal of a third relationship as part of the method of breaking a cycle condition of FIG. 45.
FIG. 44E depicts the exemplary viewing instances hierarchy of FIG. 37 after layer index values have been assigned to a fifth set of viewing instances using the exemplary method of FIG. 40.

FIG. 43 shows the viewing instance hierarchy of FIG. 41 after a third set of viewing instances has been assigned a layer index value. The second set of viewing instances assigned a layer index value and their associated instances are removed from consideration as shown. Unindexed viewing instances 4210 and 4220 are identified as having zero inbound uses relationships and are assigned a layer index value of three.

In a viewing instance hierarchy, a dependency cycle condition can exist among one or more concept instances wherein, for a given iteration of 4020, the unindexed viewing instances have at least one inbound uses relationship. For example, FIG. 44A depicts a cycle condition existing between viewing instances "records" 4410 and viewing instances "loans" 4440. That is, instances "records" 4410 and "loans" 4440 refer to each other.

A cycle condition can be broken according to the methods described herein, allowing layer index values to be assigned to the remaining unindexed viewing instances. For example, FIG. 44D depicts the viewing instances of FIG. 44A with the cycle condition broken by the removal of relationship 4405. With the removal of relationship 4405, instance "loans" 4440 has zero inbound uses relationships and is assigned a layer index value of four. FIG. 44E shows the viewing instances hierarchy of FIG. 40 after a final assignment of layer index values, with instance "records" 4410 having zero inbound uses relationships and assigned a layer index value of five. With all viewing instances assigned a layer index value, the method 4000 terminates.

The layer indices assigned to the viewing instances represent a recovered "uses" hierarchy of a software system. A viewing instance in a layer of the recovered hierarchy uses or refers to at least one viewing instances in a lower layer of the recovered hierarchy. Thus, viewing instances that do not use or reference any other viewing instance reside at the lowest layer in the recovered hierarchy and viewing instances that are related to other viewing instances by one or more "uses" relationships belong to higher layers in the recovered "uses" hierarchy.

EXAMPLE 45

Exemplary Misfit Viewing Instances

Viewing instances that have no "uses" relationships (e.g., viewing instances 4160, 4165, 4170, 4175 and 4180 of FIG. 41) can be designated misfit viewing instances. Because the layered view of a recovered architecture is based on "uses" relationships, misfit viewing instances can be excluded from the layered view of the recovered architecture. Misfit viewing instances can be represented in the visualization of the recovered architecture external to the layered view, or otherwise reported as viewing instances belonging the set of viewing instances associated with the viewing concepts used to recover a software system architecture.

Viewing instances can be indicated as misfit viewing instances in various fashions. For example, the layer index of a misfit viewing instance can be set to a dedicated value (e.g., −1, 999) or an additional parameter can be added to a viewing instances relational database table containing viewing instances (e.g., a parameter MISFIT can be added to the table "schema.element" of FIG. 20). Alternatively, misfit viewing instances can be removed from the set of viewing instances considered in the method 4000.

The identification of misfit viewing instances provides useful feedback to software system designers. Misfit viewing instances can indicate the presence of software system infrastructure that is not being utilized by the system. This unused infrastructure can be leveraged in future changes or enhancements to the system or removed from the software system entirely to reduce the amount of code that needs to be maintained or to reduce the resources needed to store the system.

EXAMPLE 46

Exemplary Method of Breaking a Cycle Condition

In any of the examples herein, a dependency cycle condition can exist between one or more viewing instances wherein the viewing instances refer to each other by one or more of "uses" relationships. For example, in a two-instance cycle, instances A and B can refer to each other; in a three-instance cycle, instance A can refer to instance B, instance B can refer to instance C, and instance C can refer back to instance A.

Figure 45:
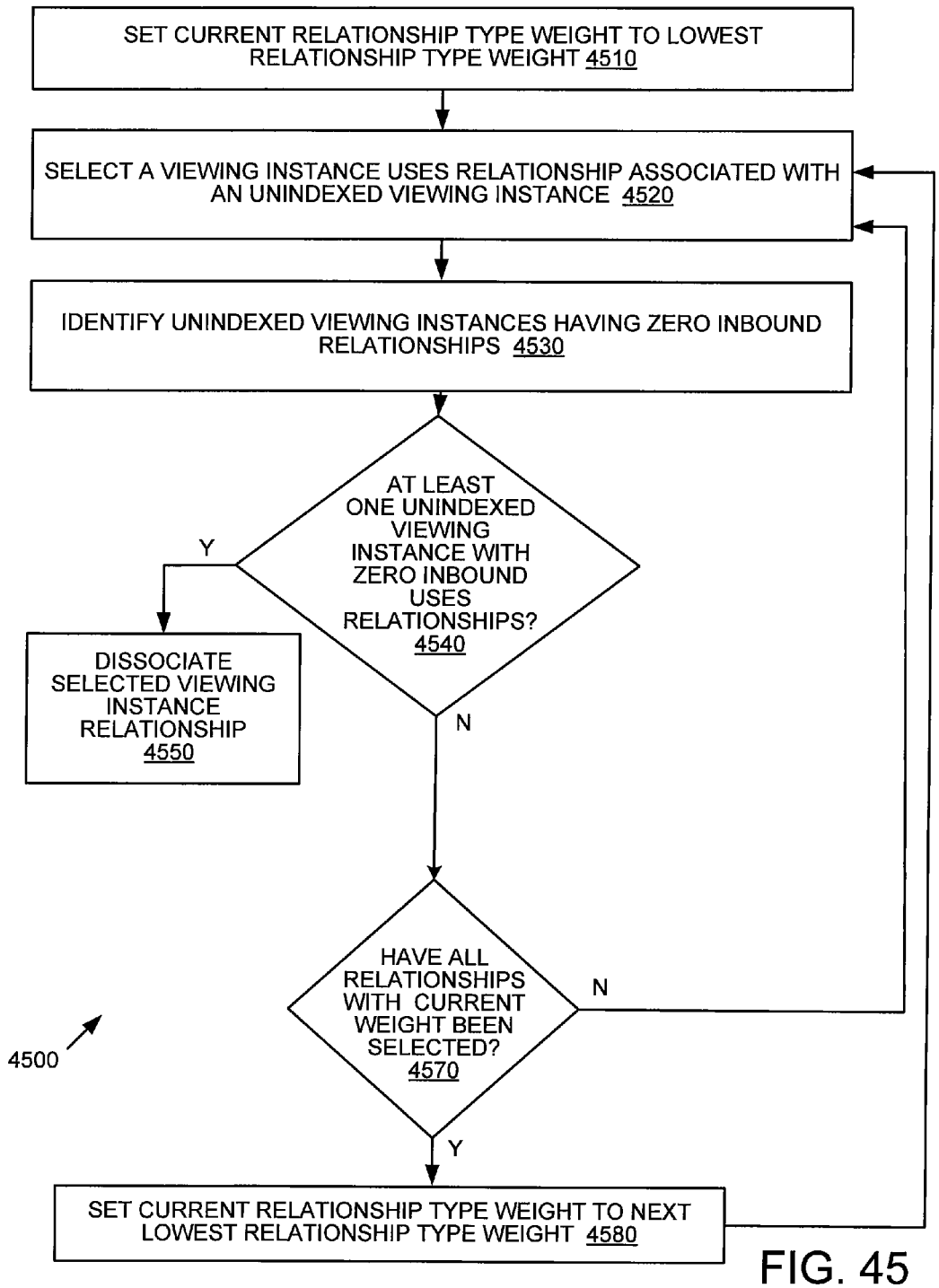
FIG. 45 is a block diagram of an exemplary method of breaking a dependency cycle condition.

FIG. 45 is a block diagram of an exemplary method 4500 of breaking a cycle condition. The method 4500 can be part of a method of assigning layer index values to viewing concepts (e.g., method 3500 of FIG. 35). At 4510, a current relationship type weight is set to the lowest relationship type weight among the relationships types in the set of viewing instances uses relationships. At 4520, a viewing instances uses relationship of a relationship type having a weight equal to the current relationship type weight is selected from the set of viewing instances uses relationships associated with unindexed viewing instances. The order in which relationships having a common relationship type weight are selected can be the order in which the relationships are identified by a layer index value assignment method, a random order or an order determined by other criteria.

At 4530, unindexed viewing instances having zero inbound uses relationships associated with unindexed viewing instances are identified. If, at 4540, at least one unindexed viewing instance has zero inbound uses relationships, the cycle condition is broken and, at 4550, the selected viewing instances uses relationship is dissociated from the viewing instances related by the selected viewing instances uses relationship. At 4570, the method 4500 determines whether all viewing instances uses relationships with relationship type weight equal to the current relationship type weight and associated with unindexed viewing instances have been selected at least once. If such relationships have not been selected, then the method 4500 returns to 4520. Otherwise, at 4580, the current relationship type weight is set to the next lowest relationship type weight for the relationship types associated with the set of viewing instances uses relationships associated with unindexed viewing instances. If all of the relationships in the set of viewing concept uses relationships associated with unindexed viewing instances have been selected at least once and the cycle condition remains, the method 4500 can return an indication that the cycle condition remains. Alternatively, the method 4500 can select relationships in order by decreasing relationship type weights. Method 4500 can be called multiple times during the assignment of layer index values to a set of viewing instances as multiple cycle conditions can exist among the viewing instances identified during the recovery of an architecture.

FIGS. 44B-44D depict the successive selection of individual viewing concept instances uses relationships to break the cycle condition of FIG. 44A according to the method 4500. In FIG. 44A, relationships 4405 and 4420 of a first relationship type (represented by a dashed line pattern) and relationship 4430 of a second relationship type (represented by a dash-dot line pattern) create a cycle condition between viewing instances "records" 4440 and "loans" 4410. If the weight of the second relationship type is less than the weight of the first relationship type, relationship 4430 is the first relationships selected from the set of viewing instances uses relationships in FIG. 44A (e.g., the set of viewing instances uses relationships associated with unindexed viewing concepts). With relationship 4430 selected, both viewing instances "loans" and "records" have one inbound uses relationship as depicted in FIG. 44B. Thus, the cycle condition persists. Because relationship 4430 is the only relationship having the lowest relationship type weight, the current relationship type weight is increased to the next lowest relationship type weight, the relationship type weight associated with relationships 4405 and 4420.

FIG. 44C depicts the selection of relationship 4420 from the set of viewing instances uses relationships depicted in FIG. 44A. Again, the cycle condition remains as both instances "loans" and "records" have one inbound "uses" relationship. FIG. 44D depicts the selection of relationship 4405 from the set of viewing instances uses relationships. With relationship 4405 selected, the cycle condition is broken as instance "loans" 4460 has zero inbound relationships. With the cycle condition broken, the method 4500 terminates and relationship 4405 is dissociated from viewing instances 4410 and 4440.

EXAMPLE 47

Exemplary Relationship Type Weights

In any of the examples described herein, relationship types can be assigned weights that can be used, for example, to break a cycle condition between one or more concept instances as part of a method of assigning layer index values to viewing instances. The relative weights assigned to relationship types are based in part on the underlying rules of the formal programming languages in which the software system artifacts are written. For example, for a set of "uses" relationships within the Java programming language, the relative relationship type weights, W(R), for the various relationships can be: W(SuperClassAccess)>W(SuperInterfaceAccess)> W(InterfaceMethodInvocation)>W(ConstructorInvocation)>(InstanceMethodInvocation)>W(TypeUseAccess)>W (StaticMethodInvocation). Relationship types of different formal programming languages can have the same weight (e.g., W(Java-TypeUseAccess)=W(C++_InstanceMethodInvocation)). The relationship type weights can be user-specified or automatically determined and can be modified as needed or desired.

EXAMPLE 48

Exemplary System for Visualizing a Software System Architecture

Figure 46:
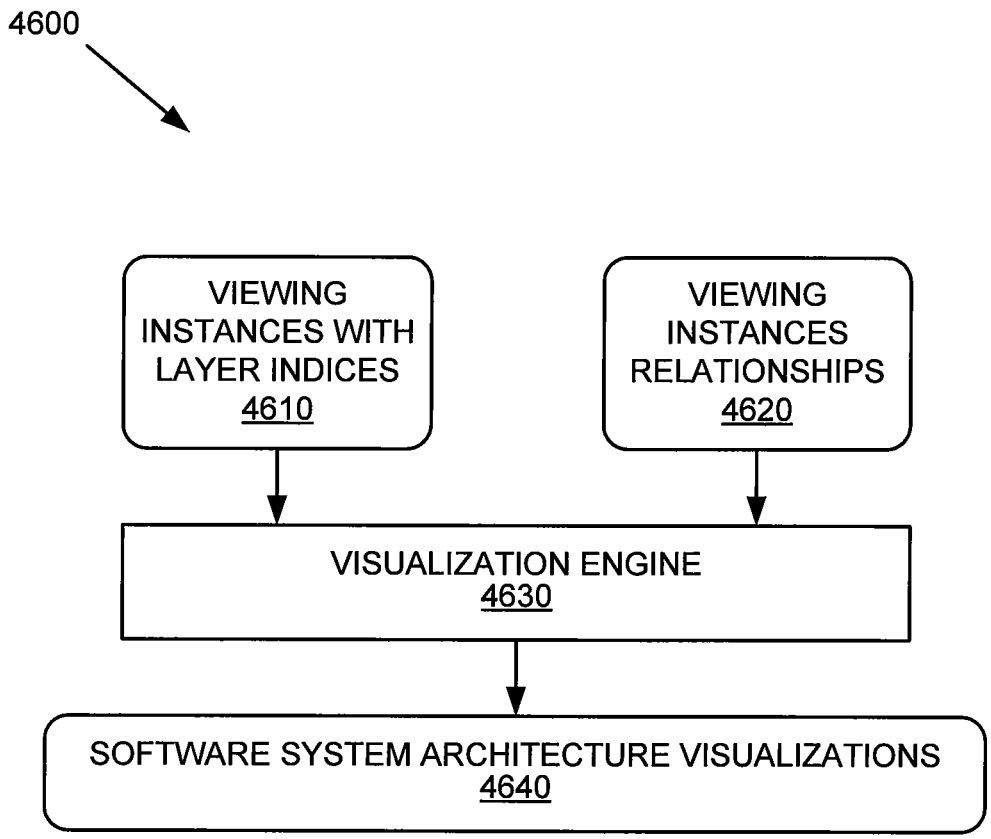
FIG. 46 is a block diagram of an exemplary system for visualizing a software system architecture.

FIG. 46 is a block diagram of an exemplary system 4600 for visualizing an architecture of a software system. The exemplary system 4600 comprises a visualization engine 4630 that receives an architecture comprising viewing instances with layer indices 4610 and viewing instances relationships 4620 and generates a visualization 4640 of the architecture. The viewing instances 4610 and relationships 4620 can represent an architecture recovered from identified software system facts of a software system as described herein or generated in another fashion (e.g., user-defined architecture). The viewing instances relationships can be of any relationship type (e.g., "uses" relationships) or any of combination of relationship types described herein.

The visualization engine 4630 can render the visualization 4640 on various output devices (e.g., computer terminal or monitor, projector, printer, plotter) and can store a representation of the visualization in various formats (e.g., PDF (Portable Document Format), JPEG (Joint Photographic Experts Group) format, TIFF (Tagged Image File Format)). The visualization can be stored in local memory (e.g., ROM, RAM, non-volatile memory) or on computer-readable media (e.g., hard drives, diskettes, flash drives, optical drives, DVDs, CD-ROMs) for immediate or future retrieval. The representations can be stored in one or more knowledge repositories as described herein or in one or more other data structures.

If the visualization is presented to an output device operating as part of an interactive computer environment, the visualization engine 4630 can generate successive architectural views in response to user input. For example, a user can select one or more viewing instances for further inquiry, for example, to receive additional information on the selected instances (e.g. source artifact name, artifact revision date, number and/or type of relationships associated with the selected instances). Selection of viewing instances for further investigation or inclusion in the layered view can be derived from user input captured by an interactive user interface or by a query of the viewing instances or viewing instances relationships. Such a query can be performed by, for example, the query language PredQL as described herein.

EXAMPLE 49

Exemplary Method of Generating Visualizations of Software System Architectures

Figure 47:
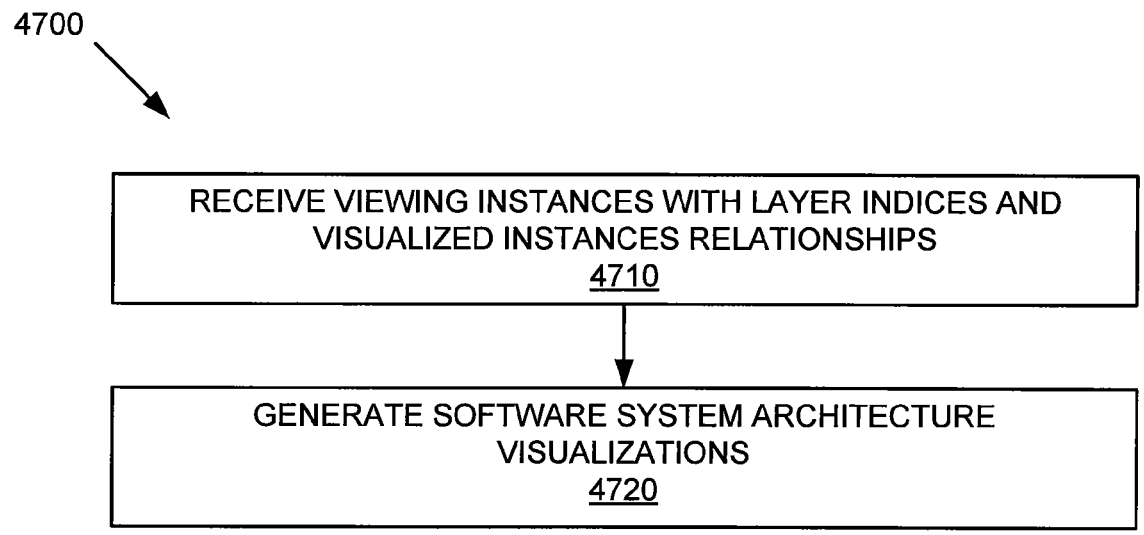
FIG. 47 is a block diagram of an exemplary method of generating visualizations of software system architectures.

FIG. 47 is a block diagram of an exemplary method 4700 of generating visualizations of software system architectures. At

4710, viewing instances with layer indices and viewing instances relationships associated with a software system are received. At 4720, visualizations of the software system architecture are generated.

A software system architecture visualization comprises a layered view of the architecture and can further comprise misfit viewing instances, as described herein. The layered view of the architecture comprises the viewing instances associated with the viewing concepts arranged in a layered, or "brick", fashion according to the viewing instance layer index values. The layered view can further comprise viewing instances associated with viewing sub-concepts or viewing instances that are descendants associated with the viewing concepts or viewing sub-concepts.

A layer has an associated layer index value and contains representations of the viewing instances having a layer index value matching the layer index value of the layer. The viewing instance representations are arranged along a shared horizontal or vertical axis. A cell index value is calculated for the viewing concepts in a layer to determine the order in which the viewing instances representations are rendered. The viewing instances in a layer can be ordered logically (e.g., alphabetically, by number of associated relationships) or in a random manner.

The layers can be arranged vertically or horizontally in the layered view and in either ascending or decreasing order by layer index value. The layered view can comprise representations of the viewing instances relationships. If the visualization does not include representations of the viewing instances relationships, the method 4700 can exclude receiving viewing instances relationships at 4710.

EXAMPLE 50

Exemplary Layered View of a Software System Architecture

Figure 48:
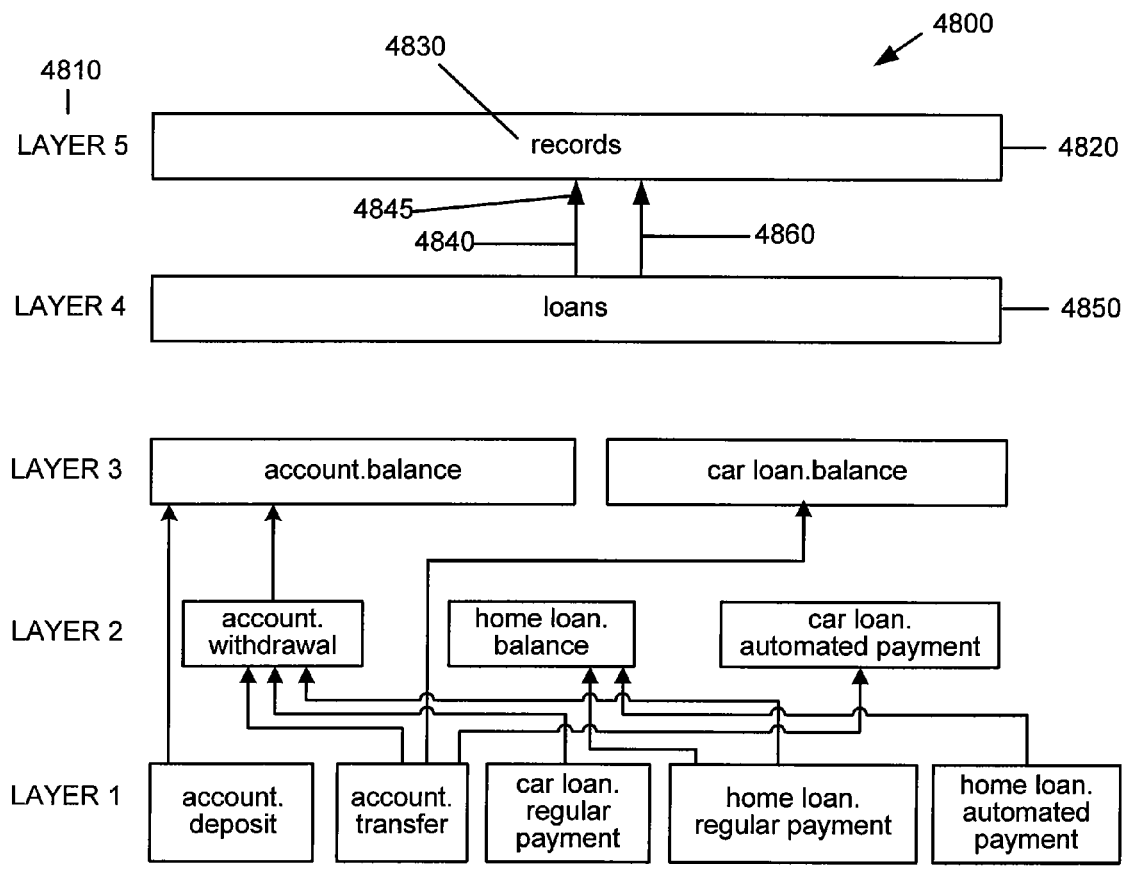
FIG. 48 is an exemplary layered view of an architecture recovered from the viewing concept hierarchy of FIG. 37.

FIG. 48 is an exemplary layered view 4800 of a recovered architecture based on the viewing concept hierarchy of FIG. 37. The view 4800 comprises viewing instances arranged in horizontal layers, a "brick" layout, and connected by lines representing "uses" relationships between the viewing concepts (e.g., lines 4840, 4860). A layer can be a very coarse grouping of classes, packages, subsystems, etc. that have a cohesive responsibility for an aspect of the system (e.g., user interface, application logic, domain objects, error logging). The generated layered views can represent both strict layered architectures and relaxed-layered architectures. In a strict layered architecture, a layer can call upon, or is allowed to use, the services of the layer immediately below it. In a relaxed layered architecture, a higher layer is allowed to call upon any lower layer.

In the example, the view 4800 includes layer labels (e.g. label 4810) comprising the layer index value for the respective layer. The viewing concepts are represented by a bounded box including the name of the viewing instance. The viewing instance relationships are represented by lines with an arrowhead at one end of the line to indicate which viewing instance is the target term of the relationship. For example, the lines in layered view 4800 represent "uses" relationships and an arrowhead 4845 indicates which concept instance is the "used" instance in the relationship. In the example, line 4840 represents the "uses" relationship between instance "loans" 4850 and instance "records" 4820. The arrowhead indicates that instance "records" 4820 is used by instance "loans" 4850. Multiple relationships between a pair of viewing instances can be represented by a single line or multiple lines. For example, lines 4860 and 4840 indicates that instances "loans" 4850 and "records" 4820 are related by two different "uses" sub-relationships.

Alternatively, variations of the layered view 4800 can be generated. For example, the layered view could exclude representations of the viewing instances uses relationships. In such an example, relationship data for the viewing instances could be presented by selecting one or more of the viewing instances. In another example, misfit viewing instances could be included in the layered view (e.g., in the bottom level in the hierarchy and as not having any "uses" relationships connecting the misfit viewing instances to other viewing instances). In another example, the layered view could indicate viewing instances associated with cycle conditions encountered during architecture recovery. Many other layered view variations are possible, including those previously described herein (e.g., vertical layers, layers arranged by ascending layer index value).

Figure 49:
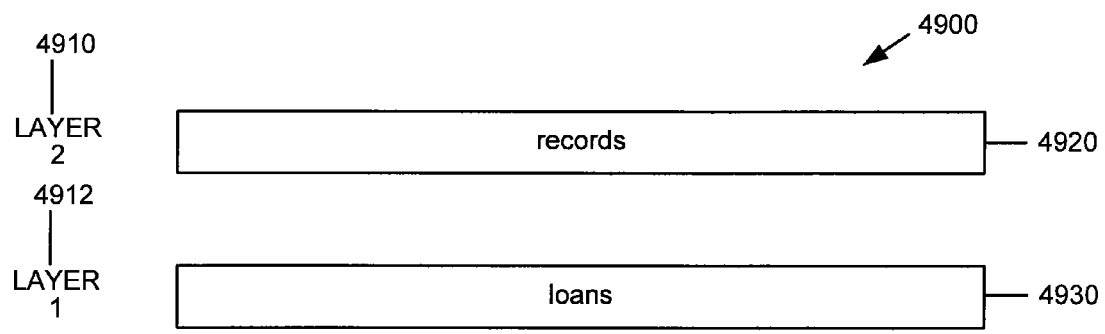
FIG. 49 is an exemplary package layered view of an architecture recovered from the viewing concept hierarchy of FIG. 37 showing Java package viewing instances.

In the example of FIG. 48, the layered view 4800 includes viewing instances associated with the viewing concepts and viewing sub-concepts as well as descendants of these viewing instances. Layered views can exclude viewing instances that are not associated with the viewing concepts. FIG. 49 is an exemplary package layered view 4900 based on the viewing concept hierarchy of FIG. 37 showing representations 4920 and 4930 of viewing instances "records" and "loans" associated with concept "Java package," the sole viewing concept used to derive the viewing concept hierarchy of FIG. 37. For a layered view showing fewer layers than exist in a recovered architecture (as determined by the maximum assigned layer index value), the layer labels can be adjusted to reflect the number of layers in the layered view. For example, the layer labels "LAYER 5" 4810 and "LAYER 4" 4812 in FIG. 48 have been adjusted to "LAYER 2" 4910 and "LAYER 1" 4912 in FIG. 49.

Figure 50:
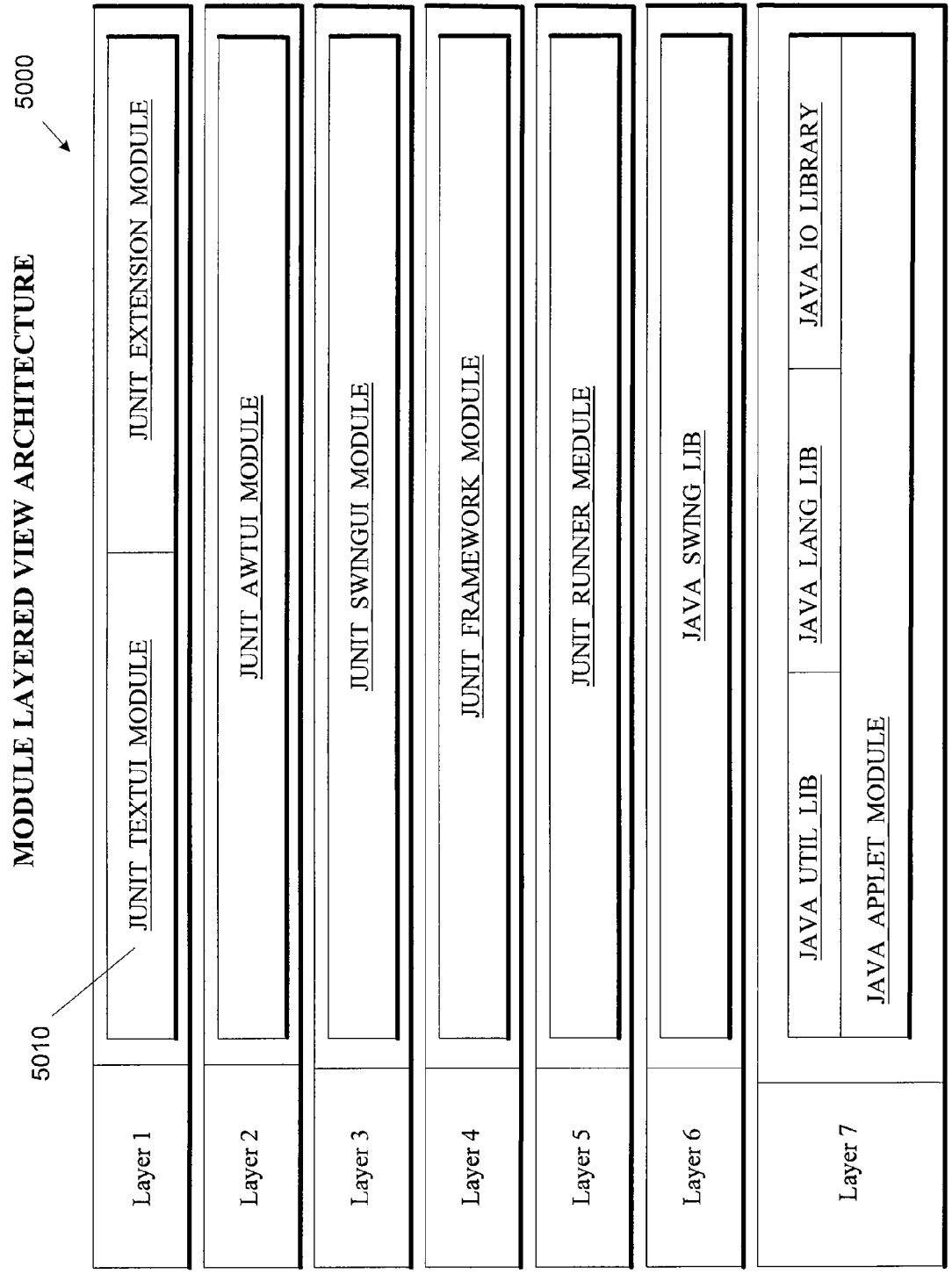
FIG. 50 is a screen shot of an exemplary module layered view of a recovered architecture generated by a concept-oriented software engineering system.
Figure 51:
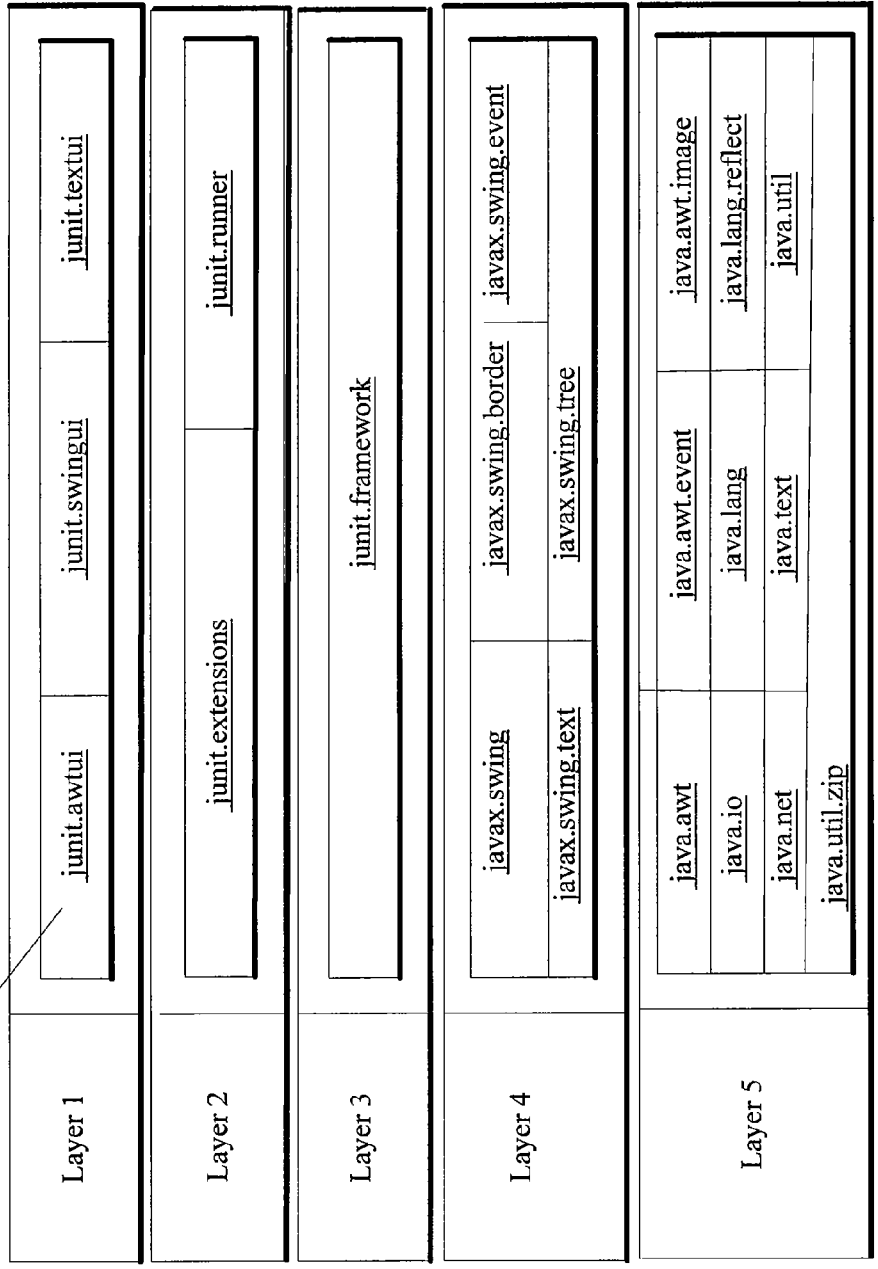
FIG. 51 is a screen shot of an exemplary class layered view of a recovered architecture generated by a concept-oriented software engineering system.

FIGS. 49 and 50 show exemplary layered views 4900 and 5000 of architectures recovered by a general-purpose computer and rendered using the methods described herein. FIGS. 49 and 50 represent two different architecture of a single software system. These two architectures could have been extracted independently of each other, with viewing concept "Java package" selected as the viewing concept for a first recovered architecture and "Java class" selected as the viewing concept for a second recovered architecture. FIG. 49 is a module layered view of the software system comprising viewing instances that are modules that were defined, for example, in a module definition file (e.g., "JUNIT_TEXTUI_MODULE" 4910). Similarly, FIG. 50 is a class layered view comprising viewing instances (e.g., "junit.awtui" 5010) associated with the viewing concept "Java class." In the examples, the name of the viewing concepts are hyperlinks that can provide additional information about the viewing concept, such as relationship information, when selected by a user.

EXAMPLE 51

Figure 52:
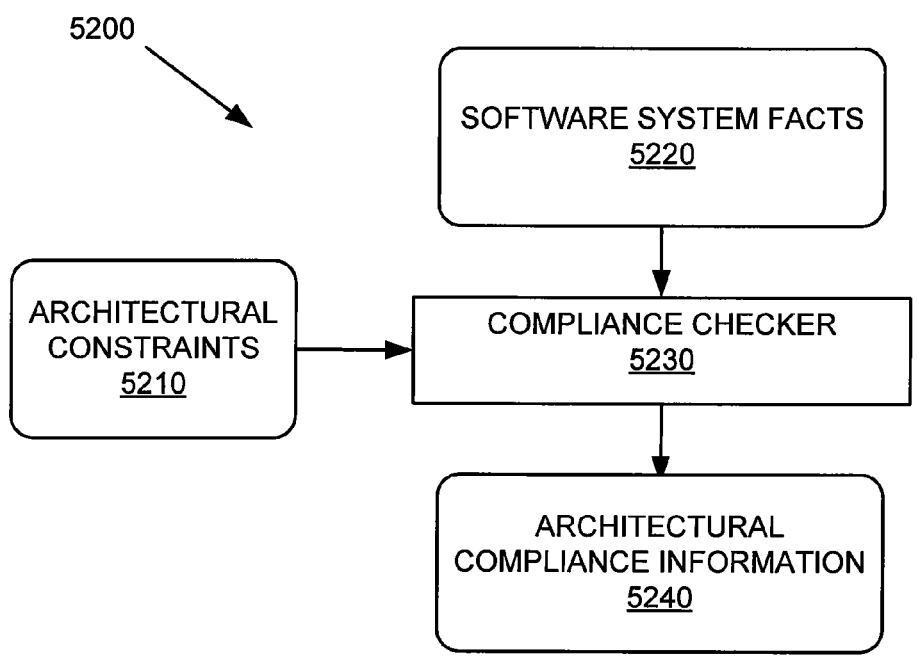
FIG. 52 is a block diagram of an exemplary system for checking compliance of a software system with architectural constraints.

Exemplary System for Checking Compliance of a Software System with Architectural Constraints FIG. 52 is an exemplary system 5200 for checking compliance of a software system with architectural constraints. The system 5200 comprises a compliance checker 5230 that receives software system facts 5220, checks the facts 5220 for compliance with architectural constraints 5210 and generates architectural compliance information 5240. The compliance checker 5230 can be part of a concept-oriented software system such as the system 100 in FIG. 1 or an independent system. The compliance checker 5230 can include a constraint analyzer and a violation reporting engine. The software system facts 5220 can comprise software system concepts, concept instances and relationships extracted and identified from a software system using the methods described herein.

EXAMPLE 52

Exemplary Architectural Constraints

In any of the examples described herein, architectural constraints comprise design rules or guidelines that reflect, for example, design practices for enhancing system usability and maintenance or embodying preferred, optimal or software system design techniques. For example, the architectural constraint that C++ or Java classes must be used or referenced by at least one other component of the software system reduces software maintenance efforts by reducing the computer code to be maintained.

EXAMPLE 53

Figure 53:
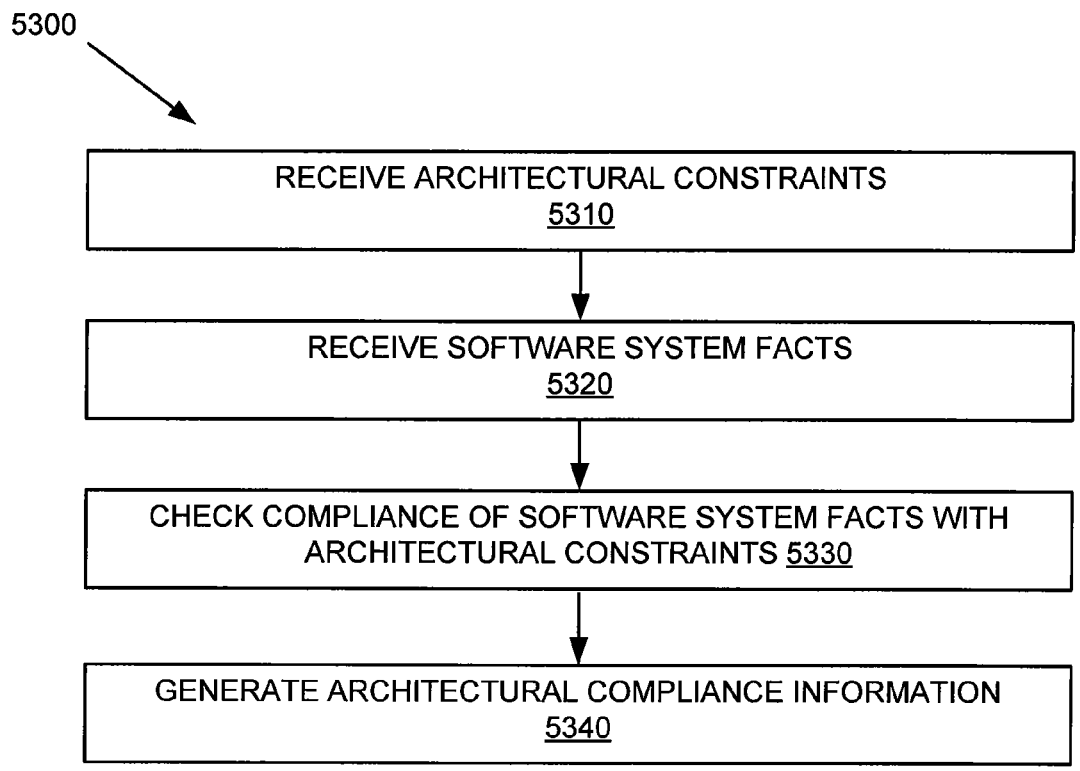
FIG. 53 is a block diagram of an exemplary method of checking compliance of a software system with architectural constraints.

Exemplary Method of Checking Architectural Compliance of a Software System with Architectural Constraints FIG. 53 is an exemplary method 5300 of checking compliance of a software system with architectural constraints. At 5310, architectural constraints are received. At 5320, software system facts are received. At 5330, the software system facts are checked for compliance against the architectural constraints. At 5340, architectural compliance information is reported.

The architectural constraints comprise architectural or design guidelines, rules or other constraints and can be based on natural language artifacts (e.g., design manuals, planning documents) generated during the software system lifecycle. The architectural constraints can be expressed in Link Definition Language (LDL) statements that query the software system facts to determine compliance.

Figure 54:
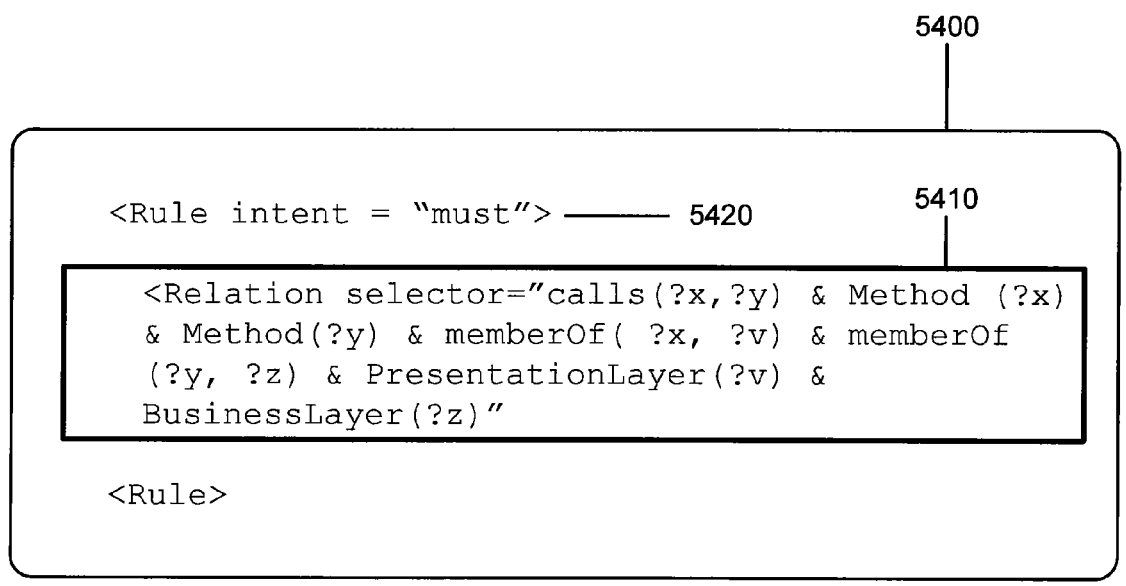
FIG. 54 shows an exemplary architectural constraint expressing using Link Definition Language statements.

The architectural constraints can be based on software system architectures recovered using the methods described herein. For example, FIG. 54 shows exemplary LDL statements 5400 expressing the architectural constraint that a call by a "method" instance belonging to a "PresentationLayer" concept must be made to a "method" instance belonging to a "BusinessLayer" concept. The "PresentationLayer" and "BusinessLayer" are explicitly defined concepts based on the layer indices assigned to viewing instances during architecture recovery. For example, the "Presentation Layer" concept can be defined as all "method" viewing instances having a specified layer index value.

The architectural compliance information 5240 can comprise, for example, identification of individual software system facts that do not comply with an architectural constraint, compliance metrics (e.g., the percentage of software system facts subject to a constraint that are or are not in compliance) or historical compliance information (i.e., architectural drift of the software system over time).

EXAMPLE 54

Exemplary Link Definition Language Statements for Checking Architectural Compliance FIG. 54 shows an exemplary architectural constraint expressed using Link Definition Language statements 5400.

LDL statement 5410 specifies the relationship that is the subject of the exemplary architectural constraint, that calls by "method" instances belonging to the "PresentationLayer" concept must be made to "method" instances belonging to the "BusinessLayer" concept. The variables ?x, ?y, ?z, ?v in LDL statement 5410 allow for restrictions set by one predicate to be carried over to other predicates. For example, the common use of the "?x" variable in the "calls," "Method" and "memberOf" predicates force all instances that call other instances, a restriction placed on "?x" by the "calls(?x,?y)" predicate, to be an instance of the "Method" concept and be a member of another instance, restrictions placed on "?x" by the "Method (?x)" and "memberOf(?x,?v)" predicates, respectively.

LDL statement 5420 specifies, by the "rule intent" keyword "must," that the specified relationship must be followed by the software system that is checked for compliance. Other rule intent keywords (e.g., "must not," "may") can specify alternative manners for how the existence or absence of the specified relationship of the architectural constraint in the set of software system facts is to be handled.

In the example, the "must" architectural constraint can direct the LDL interpreter (e.g., Link Processor) to query a set of software system facts for relationships that comply with the rule and provide (e.g., store, display on an output device) the complying relationships as part of the architectural compliance information. Relationships that do not comply with the constraint can be provided alternatively or in conjunction with the complying relationships.

Non-complying relationships can comprise relationships that meet all but one or more predicates in the specified relationship expression (e.g., LDL statement 5410). For example, a relationship that does not comply with the architectural constraint expressed in LDL statements 5400 could be a "method" instance that belongs to the "PresentationLayer" concept and calls a "method" instance, that does not belong to the "BusinessLayer" concept (i.e., the "memberOf (?y, ?z)" and "BusinessLayer(?z)" predicates of LDL statement 5410 are not satisfied). Non-compliant relationships can be identified by satisfying all but various sets of predicates in the specified relationship. In the example, relationships can be identified as non-complying if a calling "method" instance does not call a concept instance (i.e., predicate "calls(?x,?y)" is not satisfied) and/or if the calling instance does not call another "method" instance (i.e., predicate "method(?y)" is not satisfied).

Other architectural constraint types can be handled in a similar fashion. For example, a "must not" architectural constraint can direct the LDL interpreter to report relationships in the software system facts that satisfy the specified relationship (i.e., fail to comply with the constraint).

EXAMPLE 55

Exemplary Software System Change Impact Analysis

Figure 55:
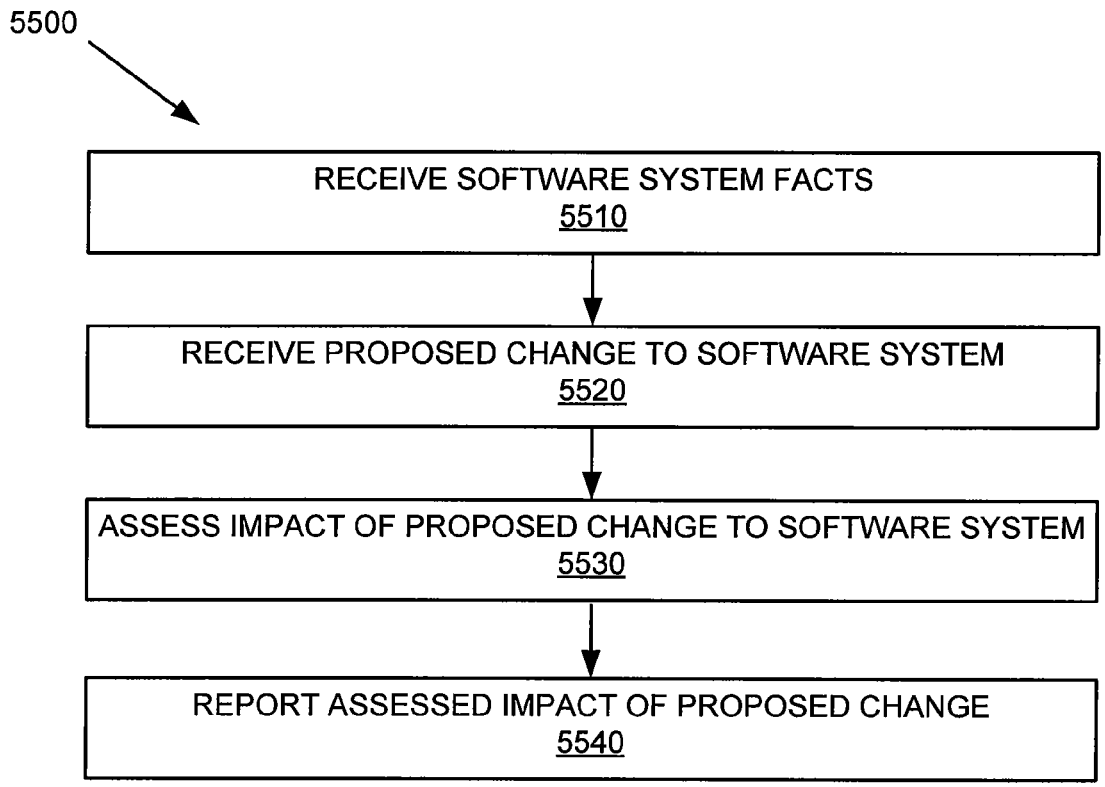
FIG. 55 is a block diagram of an exemplary method of assessing the impact of a proposed change to a software system.

FIG. 55 is an exemplary method 5500 of assessing the impact of a proposed change to a software system. At 5510, software system facts are received. At 5520, a proposed change to the software system is received. At 5530, the impact of the proposed change to the software system is assessed. At 5540, the impact assessment of the proposed change to the software system is reported.

The proposed change can be a change to one or more concept instances, artifacts and/or concepts of a software system. For example, a proposed change could comprise an artifact being rewritten in a different language, altering a data structure (e.g., adding or removing fields and/or methods to a C++ or Java class) or adding an attribute to a concept. The impact assessment of the proposed change can comprise querying the software system to find software system facts related to the software system facts subject to the proposed change. The queries can be expressed in LDL statements that operate on software system facts that can be stored, for example, in a knowledge repository.

For example, to assess the impact of a proposed modification to a C++ method, the software system facts can be queried to identify the "uses" relationships that relate concept instances or concepts to the concept instance containing the C++ method that is proposed to be modified. Similarly, the software system facts can be queried to identify instances of a concept for which the addition of a set of attributes is contemplated. The impact assessment report of a proposed change can comprise a list of the software system facts related to the software system fact that is the subject of the proposed change, a list of the various language that the related software system facts are written in and/or an estimation of resources (e.g., engineering man-hours) needed to implement the change.

EXAMPLE 56

Exemplary Advantages

Using the technologies described herein, it is possible to formally model software system concepts, instances of these concepts and relationships between the concepts and concept instances in a manner that address the issues of concept scatter, semantic references and diversity of stakeholder vocabularies and provides for the modeling of relationships between concept instances extracted from different artifacts. Such a more accurate modeling of the relationships within a software system provides, for example, more accurate estimations of the impact of proposed changes to the artifacts comprising a software system.

The technologies described herein also enable traceability analysis between business process definitions, use-cases, programming language elements, XML elements, and test-cases. Service oriented architecture (SOA) is a recent recommended architectural style for enabling integration of applications both within an enterprise and with its partners and suppliers. SOA defines a new concept called "services." The technologies described herein can accommodate this new concept and permit traceability and impact analysis on services with the remaining concepts in the repository.

The ability to accurately represent and process cross-artifact links between elements within elements in multiple language artifacts can be used to preserve software system integrity during maintenance. The integrity of a software system is broken when one end of a cross-artifact link is modified or changed in response to some change request or bug report within an enterprise information technology application, but the other end of the link is not modified because the user making the change was unaware of the existence of such a link. The technologies described herein can be used to automatically detect and report such inconsistencies based on the cross-artifact link relations such that significant cost and effort savings can be realized in the maintenance of large-scale software systems.

Software system architecture layering between modules can be automatically recovered using the technologies described herein. Because recovered architectures are automatically generated and based on the software system artifacts comprising a software system, they can be more complete and comprehensive than architectures generated manually. The recovered architectures assist software system stakeholders in understanding and comprehending a software and can provide information and documentation about a system where very little (or none) was previously available.

Using the methods described herein, architectural compliance of a software system encoded in numerous artifacts written in various formal programming languages can be automatically checked, providing a more robust solution than offered by manual compliance checking.

EXAMPLE 57

Exemplary Additional Embodiments

In additional embodiments, a computer-implemented method comprises receiving a plurality of concept instances comprising a first concept instance extracted from a first software system artifact of a software system and a second concept instance extracted from a second software system artifact of a software system. The first software system artifact and the second software system artifact are associated with a first formal language and a second formal language respectively The method further comprises identifying one or more relationships comprising a relationship between the first concept instance and the second concept instance or between at least one of the first concept instance or the second concept instance and at least one identified concept associated with the software system. The method further comprises storing the one or more relationships in one or more repositories.

One or more formal language parsers can perform the extracting. The first formal language and the second formal language can be formal programming languages, the one or more formal language parsers can be formal programming language parsers, and the first formal language and the second formal language can be associated with a first formal programming language parser and a second formal programming language parser, respectively.

The at least one concept can be extracted from a software system concept artifact of the software system, wherein the concept artifact can be associated with a formal concept language. The identifying at least one concept can be performed by at least one formal concept language parser and the formal concept language can be associated with the formal concept language parser. The one or more formal language parsers can perform the identifying relationships. The identified concept can be a domain concept, a language concept or an intentional concept.

In additional embodiments, a data structure encoded on one or more computer-readable storage media comprises one or more concepts associated with a software system, one or more relationship types and for respective of the relationship types, one or more role definitions. The data structure can further comprise one or more concept instances associated with the at least one concept and one or more relationships based on the one or more concepts and/or the one or more concept instances. The data structure can be a relationship database and the relational database can be organized according to a schema defined by a relational database management system.

In additional embodiments, a computer-implemented method identifies one or more relationships comprising a relationship among one or more first concepts extracted from a first software system artifact of a software system or between one of the one or more first concepts and a second concept extracted from a second software system artifact of a software system and stores a representation of the one or more relationships in one or more repositories.

The method can further comprise identifying the first concept and the second concept, extracting at least the one or more first concepts and the second concept from the first software system artifact and the second software system artifact, respectively, and storing the one or more first concepts and the second concept in the one or more repositories. The first software system artifact and the second software system artifact can be associated with a first formal language and a second formal language, respectively. The first software system artifact and the second software system artifact can be associated with the same formal language.

EXAMPLE 58

Exemplary Computing Environment

Figure 56:
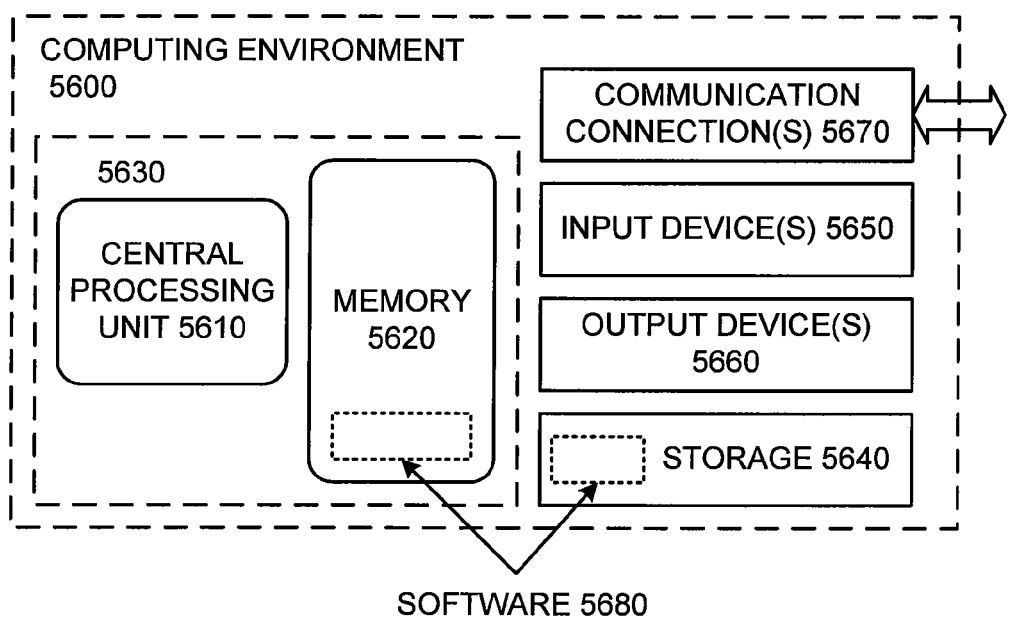
FIG. 56 is a block diagram of an exemplary suitable computing environment for implementing any of the technologies described herein.

FIG. 56 illustrates a generalized example of a suitable computing environment 5600 in which the described techniques can be implemented. The computing environment 5600 is not intended to suggest any limitation as to scope of use or functionality, as the technologies can be implemented in diverse general-purpose or special-purpose computing environments. A mainframe environment can be different from that shown, but can also implement the technologies and can also have computer-readable media, one or more processors, and the like.

With reference to FIG. 56, the computing environment 5600 includes at least one processing unit 5610 and memory 5620. In FIG. 56, this basic configuration 5630 is included within a dashed line. The processing unit 5610 executes computer-executable instructions and can be a real or a virtual processor. In a multi-processing system, multiple processing units execute computer-executable instructions to increase processing power. The memory 5620 can be volatile memory (e.g., registers, cache, RAM), non-volatile memory (e.g., ROM, FPGA, PAL, CPLD, EEPROM, flash memory, etc.), or some combination of the two. The memory 5620 can store software 5680 implementing any of the technologies described herein.

A computing environment can have additional features. For example, the computing environment 5600 includes storage 5640, one or more input devices 5650, one or more output devices 5660, and one or more communication connections 5670. An interconnection mechanism (not shown) such as a bus, controller, or network interconnects the components of the computing environment 5600. Typically, operating system software (not shown) provides an operating environment for other software executing in the computing environment 5600, and coordinates activities of the components of the computing environment 5600.

The storage 5640 can be removable or non-removable, and includes magnetic disks, magnetic tapes or cassettes, CD-ROMs, CD-RWs, DVDs, or any other computer-readable media which can be used to store information and which can be accessed within the computing environment 5600. The storage 5640 can store 5680 containing instructions for any of the technologies described herein.

The input device(s) 5650 can be a touch input device such as a keyboard, mouse, pen, or trackball, a voice input device, a scanning device, or another device that provides input to the computing environment 5600. For audio, the input device(s) 5650 can be a sound card or similar device that accepts audio input in analog or digital form, or a CD-ROM reader that provides audio samples to the computing environment. The output device(s) 5660 can be a display, printer, speaker, CD-writer, or another device that provides output from the computing environment 5600.

The communication connection(s) 5670 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic or other carrier, and can be configured for communication via a local area network (LAN) or a wide area network such as the Internet.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer-readable media.

The techniques herein can be described in the general context of computer-executable instructions, such as those included in program modules or described as comprising an "engine" of a system, being executed in a computing environment on a target real or virtual processor. Generally, program modules include routines, programs, libraries, objects, classes, components, data structures, etc., that perform particular tasks or implement particular abstract data types. The functionality of the program modules can be combined or split between program modules as desired in various embodiments. Computer-executable instructions for program modules can be executed within a local or distributed computing environment.

Methods in Computer-Readable Media

Any of the methods described herein can be implemented by computer-executable instructions in one or more computer-readable media (e.g., computer-readable storage media or other tangible media). Such instructions can cause a computer to perform the described method. The technologies described herein can be implemented in a variety of programming languages. A module can comprise one or more computer-executed instructions in one Alternatives The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of these claims.

We claim:

1. A computer-implemented method comprising:
receiving a plurality of concept instances comprising a first concept instance extracted from a first software system artifact of a software system and a second concept instance extracted from a second software system artifact of the software system, wherein the first software system artifact and the second software system artifact are associated with a first formal language and a second formal language respectively, and the first concept instance and the second concept instance are specific instantiations of at least one identified concept associated with the software system;
identifying one or more relationships comprising a cross-artifact relationship between the first concept instance and the second concept instance or a relationship between at least one of the first concept instance or the second concept instance and at least one identified concept associated with the software system; and
storing at least one of the one or more relationships comprising the cross-artifact relationship between the first concept instance and the second concept instance in one or more repositories, wherein the cross-artifact relationship specifies a relationship type that relates the identified concept to the first concept instance and the second concept instance.

2. The method of claim 1, further comprising:
identifying the at least one identified concept associated with the software system;
extracting at least the first concept instance and the second concept instance from the first software system artifact and the second software system artifact, respectively; and
storing the at least one identified concept associated with the software system, the first concept instance and the second concept instance in the one or more repositories.

3. The method of claim 1, wherein the plurality of concept instances further comprises a third concept instance extracted from a third software system artifact associated with the first formal language and the one or more relationships further comprise at least one relationship between the first concept instance and the third concept instance, the method further comprising:
extracting at least the third concept instance from the third software system artifact; and
storing the third second concept instance in the one or more repositories.

4. The method of claim 1, wherein the identified one or more relationships are between the first concept instance and the second concept instance.

5. The method of claim 1, wherein the identified one or more relationships comprise relationships between the first concept instance and the at least one identified concept.

6. The method of claim 1, wherein the plurality of concept instances further comprises a third concept instance extracted from the first software system artifact and the one or more relationships further comprise at least one relationship between the first concept instance and the third concept instance.

7. The method of claim 6, further comprising:
extracting at least the third concept instance from the first software system artifact; and
storing the third second concept instance in the one or more repositories.

8. The method of claim 1, wherein at least one of the one or more relationships has an associated relationship type.

9. The method of claim 8, wherein the relationship type is selected from a group of base relationship types consisting of an instance relationship type, an extends relationship type, a member relationship type, a uses relationship type, a conforms relationship type, a represents relationship type, a realizes relationship type, a representational variant relationship type, a represented by relationship type, a realized relationship type and a subsumes relationship type.

10. The method of claim 9, wherein the relationship type is selected from one or more extended relationship types defined as composites of relationship types within the group of base relationship types.

11. The method of claim 8, wherein the relationship type has one or more terms, respective of the terms having an associated role indicating permissible concepts and/or concept instances that may be used for the respective term.

12. The method of claim 11, further comprising storing the relationship type and the roles associated with the one or more terms of the relationship type.

13. The method of claim 11, further comprising updating at least one of the one or more relationships, the at least one identified concept, one of the roles associated with the one or more terms of the relationship type or the relationship type.

14. The method of claim 11, wherein the at least one of the one or more relationships has m terms and the relationship type has n terms, where m<n, the method further comprising adding a term to the at least one of the one or more relationships.

15. A computer-implemented method, comprising:
receiving at least one cross-artifact relationship definition;
identifying at least one cross-artifact relationship between a first concept instance extracted from a first software system artifact of a software system and a second concept instance extracted from a second software system artifact of a software system, the identification based on the at least one cross-artifact relationship definition, wherein the first concept instance and the second concept instance are specific instantiations of at least one identified concept associated with the software system; and
storing the at least one cross-artifact relationship in one or more repositories, wherein the at least one cross-artifact relationship specifies a relationship type that relates the identified concept to the first concept instance and the second concept instance.

16. The method of claim 15, wherein the first concept instance has at least one attribute, the second concept instance has at least one attribute, and the at least one cross-artifact relationship comprises at least one attribute of the first concept instance or of the second concept instance, a relationship type and expressions describing the first concept instance and/or the second concept instance.

17. The method of claim 15, wherein the first concept instance has at least one attribute, the second concept instance has at least one attribute, and the at least one cross-artifact relationship relates the first concept instance to at least one attribute of the second concept instance, the at least one attribute of the second concept instance used by or referred to by the first concept instance.

18. The method of claim 15, wherein the first concept instance and the second concept instance comprise one or more attributes and the at least one cross-artifact relationship relates a first concept instance attribute to a second concept instance attribute, the related attributes having the same value.

19. The method of claim 15, wherein the at least one cross-artifact relationship definition is expressed using link definition language statements interpretable by a link processor.

20. The method of claim 15, further comprising updating the at least one cross-artifact relationship.

21. The method of claim 15, wherein the first concept instance and the second concept instance are identified by querying the one or more repositories using one or more query languages.

22. One or more non-transitory computer-readable storage media storing a data structure, the data structure comprising:
one or more concepts associated with a software system;
one or more relationship types, respective of the relationship types having one or more terms;
for respective of the relationship types, one or more role definitions associated with the one or more terms of the respective relationship type, respective of the role definitions defining the permissible concepts and/or concept instances that can represent the term associated with the respective role definition for the respective relationship type;
and one or more relationships based on the one or more concepts and/or the one or more concept instances, the one or more relationships comprising a cross-artifact relationship between a first concept instance of the one or more concept instances and a second concept instance of the one or more concept instances, wherein the cross-artifact relationship specifies a relationship type of the one or more relationship types that relates a concept of the one or more concepts to the first concept instance and the second concept instance.

23. The one or more non-transitory computer-readable storage media of claim 22, the data structure further comprising:
one or more concept instances associated with the at least one or more concepts.

24. The one or more non-transitory computer-readable storage media of claim 22, wherein at least one of the one or more relationship types has an arity, n, greater than two and the at least one relationship type is represented in the data structure as n−1 associated relationships.

25. The one or more non-transitory computer-readable storage media of claim 24, wherein respective of the associated relationships have an associated co-relationship identifier.

26. The one or more non-transitory computer-readable storage media of claim 22, wherein at least one of the one or more relationships are associated with one of the one or more relationship types, and respective of the at least one relationships have a number of terms less than or equal to the number of terms associated with the associated relationship type.

27. The one or more non-transitory computer-readable storage media of claim 22, wherein the data structure further comprises:
one or more pluralities of viewing concept instances, the pluralities of viewing concepts instances representing recovered architectures of the software system, respective of the viewing concept instances of the one or more viewing concept instances pluralities having a layer index;
and one or more pluralities of viewing concept instances relationships, respective of the viewing concept instances relationships pluralities associated with one of the one or more viewing concept instances pluralities.

28. A computer-implemented method comprising:
receiving a plurality of concept instances comprising a first concept instance extracted from a first software system artifact of a software system and a second concept instance extracted from a second software system artifact of a software system, wherein the first software system artifact and the second software system artifact are associated with a first formal language and a second formal language respectively;
identifying one or more relationships comprising a cross-artifact relationship between the first concept instance and the second concept instance or a relationship between at least one of the first concept instance or the second concept instance and at least one identified concept associated with the software system or a relationship between an intentional concept of a software system and the at least one identified concept of the software system or a relationship between the internal concept and the first concept instance, at least one of the one or more relationships having an associated relationship type, the associated relationship type having one or more terms, respective of the terms having an associated role indicating permissible concepts and/or concept instances that may be used for the respective term, wherein the cross-artifact relationship specifies the relationship type that relates the at least one identified concept to the first concept instance and the second concept instance; and
identifying the at least one concept associated with the software system and the intentional concept of the software system;
extracting at least the first concept instance and the second concept instance from the first software system artifact and the second software system artifact, respectively;
storing the at least one concept associated with the software system, the first concept instance and the second concept instance, the intentional concept, the one or more relationships, the relationship type and the roles associated with the one or more terms of the relationship type in one or more repositories.

29. At least one non-transitory computer-readable storage medium storing computer-executable instructions for causing a computer system programmed thereby to performed a method comprising:
receiving a plurality of concept instances comprising a first concept instance extracted from a first software system artifact of a software system and a second concept instance extracted from a second software system artifact of a software system, wherein the first software system artifact and the second software system artifact are associated with a first formal programming language and a second formal programming language respectively, and the first concept instance and the second concept instance are specific instantiations of at least one identified concept associated with the software system;
identifying one or more relationships comprising a cross-artifact relationship between the first concept instance and the second concept instance or a relationship between at least one of the first concept instance or the second concept instance and at least one identified concept associated with the software system;
and storing at least one of the one or more relationships comprising a the cross-artifact relationship between the first concept instance and the second concept instance in one or more repositories, wherein the cross-artifact relationship specifies a relationship type that relates the identified concept to the first concept instance and the second concept instance, the relationship type having one or more terms, at least one term of the one or more terms having an associated role indicating the first concept instance as being permissible for the at least one term of the one or more terms.

30. A computer, comprising:

at least one processor; and memory storing computer-executable instructions defining:

a programming module configured to receive a plurality of concept instances comprising a first concept instance extracted from a first software system artifact of a software system and a second concept instance extracted from a second software system artifact of a software system, wherein the first software system artifact and the second software system artifact are associated with a first formal language and a second formal language respectively, and the first concept instance and the second concept instance are specific instantiations of at least one identified concept associated with the software system;

a programming module configured to identify one or more relationships comprising a cross-artifact relationship between the first concept instance and the second concept instance or a relationship between at least one of the first concept instance or the second concept instance and at least one identified concept associated with the software system; and a programming module configured to store at least one of the one or more relationships comprising the cross-artifact relationship between the first concept instance and the second concept instance in one or more repositories, wherein the cross-artifact relationship specifies a relationship type that relates the identified concept to the first concept instance and the second concept instance.

* * * * *